US006476943B1

(12) United States Patent
Yertoprakhov

(10) Patent No.: US 6,476,943 B1
(45) Date of Patent: Nov. 5, 2002

(54) DISTANCE MEASUREMENT APPARATUS

(75) Inventor: Victor Yertoprakhov, Novosibirsk (RU)

(73) Assignee: Virtual Pro, Inc., San Ramon, CA (US)

( * ) Notice: Subject to any disclaimer, the term of this patent is extended or adjusted under 35 U.S.C. 154(b) by 0 days.

(21) Appl. No.: 09/256,641

(22) Filed: Feb. 23, 1999

(51) Int. Cl.[7] .............................................. G02B 5/32
(52) U.S. Cl. ............................ 359/15; 356/3; 356/4; 356/614; 250/201.9
(58) Field of Search ................. 356/3, 4, 5

(56) References Cited

U.S. PATENT DOCUMENTS

| | | | |
|---|---|---|---|
| 3,714,435 A | 1/1973 | Bestenreiner et al. | 250/83.3 H |
| 4,880,286 A | 11/1989 | Ih | 350/1.1 |
| 4,986,653 A | 1/1991 | Yokokura et al. | 356/5 |
| 5,119,214 A | 6/1992 | Nishii et al. | 359/7 |
| 5,121,231 A | 6/1992 | Jenkins et al. | 359/7 |
| 5,200,792 A | 4/1993 | Tajima et al. | 356/1 |
| 5,214,483 A | 5/1993 | McDowell et al. | 356/5 |
| 5,317,374 A * | 5/1994 | Lister | 356/3 |
| 5,436,763 A | 7/1995 | Chen et al. | 359/565 |
| 5,497,254 A | 3/1996 | Amako et al. | 359/53 |
| 5,537,543 A | 7/1996 | Liu et al. | 359/15 |
| 5,538,674 A | 7/1996 | Nisper et al. | 264/1.31 |
| 5,608,664 A | 3/1997 | Mori | 364/822 |
| 5,668,648 A | 9/1997 | Saito et al. | 359/9 |
| 5,682,214 A | 10/1997 | Amako et al. | 349/74 |
| 5,691,808 A | 11/1997 | Nourrcier, Jr. et al. | 356/5.01 |
| 5,754,281 A | 5/1998 | Maeda | 356/3.08 |
| 5,773,816 A | 6/1998 | Grodevant | 250/214 R |
| 5,808,759 A | 9/1998 | Okamori et al. | 359/15 |
| 5,821,780 A | 10/1998 | Hasegawa | 327/63 |
| 5,834,954 A | 11/1998 | Tihanyi | 327/77 |

FOREIGN PATENT DOCUMENTS

| | | |
|---|---|---|
| SU | 700852 | 11/1979 |
| SU | 888712 A | 7/1980 |

OTHER PUBLICATIONS

Rochester Photonics Corp., "Diffractive Phase Elements," May 1995.
Rochester Photonics Corp., "Subwavelength Structured (SWS) Surfaces," May 1995.
Rochester Photonics Corp., "Diffractive/Refractive Achromats," May 1995.
Rochester Photonics Corp., "Standard Spot Arrays," Jun. 1997.
Rochester Photonics Corp., "Standard Microlens Arrays," Jun. 1997.
Rochester Photonics Corp., "Microlens Arrays," Jun. 1997.
Ready "Industrial Applications of Lasers." pp. 248–255, 256–277, 278–314, 559–589, (1997).
Displaytech, Inc. "Photonics Products 1997" (1997).

(List continued on next page.)

Primary Examiner—Cassandra Spyrou
Assistant Examiner—Fayez Assaf
(74) Attorney, Agent, or Firm—Knobbe, Martens, Olsen & Bear LLP

(57) ABSTRACT

The present invention relates generally to an optical element (OE) which can serve as an optical analogue to digital converter (OADC) and/or an optical digital to analogue converter (ODAC), and uses therefor. The OE can be usefully employed in a variety of applications to transform analogue information present in a light wave front into digital light signals and/or to transform digital information into analogue information in the form of the physical parameters of a light wave front.

42 Claims, 49 Drawing Sheets

OTHER PUBLICATIONS

Feldman et al., "Photonics Design and Solutions: Diffractive Optics Improve Product Design." (Reprinted from the Sep. 1995 issue of Photonics Spectra© Laurin Publishing Co., Inc.).

Frisk et al., "Imaging Technology: Spatial Light Modulators Help Machines 'See' Faster." (Reprinted from the Feb. 1997 issue of Photonics Spectra© Laurin Publishing Co., Inc.

Adam Erlich. "Micro–optical integration spurs mass production." (Reprinted from the Mar. 1998 edition of Laser Focus World Copyright 1998 by Penn Well.

http://www.lance.colostate.edu/optical/OCG/html/Projects/cancun94/ (Aug. 7, 1998).

http://www.lance.colostate.edu/optical/OCG/html/Projects/WHDS/spie96_chds_demo_page_5.html (Aug. 7, 1998).

http://www.sciam.com/askexpert/computers/computers2.htm (Aug. 3, 1998).

http://www.mel.go.jp/mainlab/joho/joh02e.html (Aug. 3, 1998).

http://www.byte.com/art/9604/sec7/art2.htm (Aug. 3, 1998).

Pepper et al., "Real–Time Holography, Innovative Adaptive Optics, and Compensated Optical Processors Using Spatial Light Modulators." 584–655. (1995).

Displaytech, Inc. "Displaytech, Inc. Application Note— SLM Device Description: 256×256 Ferroelectric Liquid Crystal Spatial Light Modulator," Feb. 1998. pp 1–8.

Callaghan et al. "Highly integrated, compact, optical correlators using FLC–VLSI spatial light modulators and diffractive optics." Jan. 1998. pp. 1–8.

Saleh, et al. "Fundamentals of Photonics" pp. 855–857 (1991).

* cited by examiner

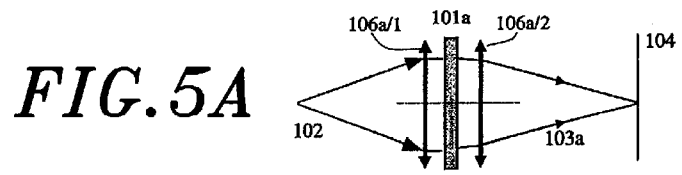
FIG.5A
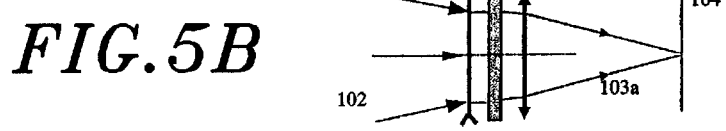
FIG.5B
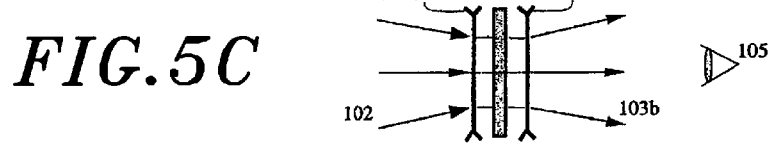
FIG.5C
FIG.5D
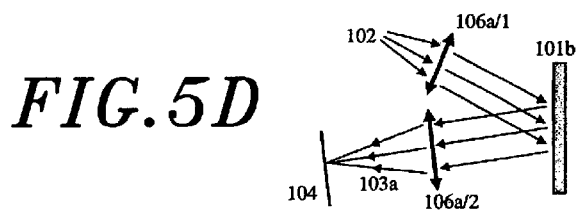
FIG.5E
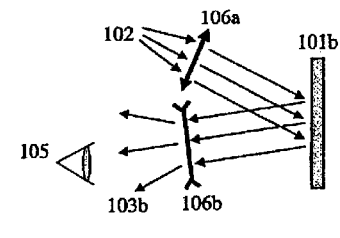
FIG.5F
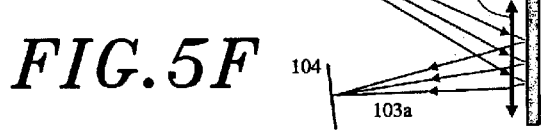
FIG.5G
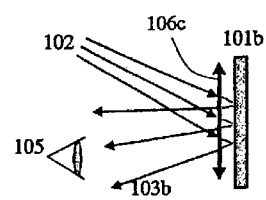

*FIG. 7A*      *FIG. 7C*
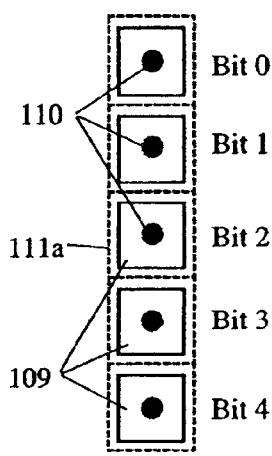
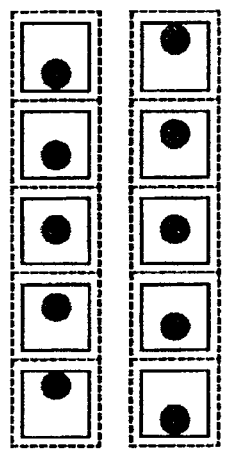
*FIG. 7B*      *FIG. 7D*
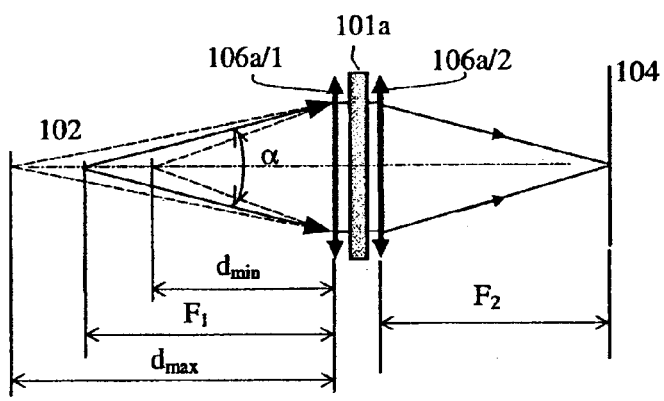
*FIG. 8*

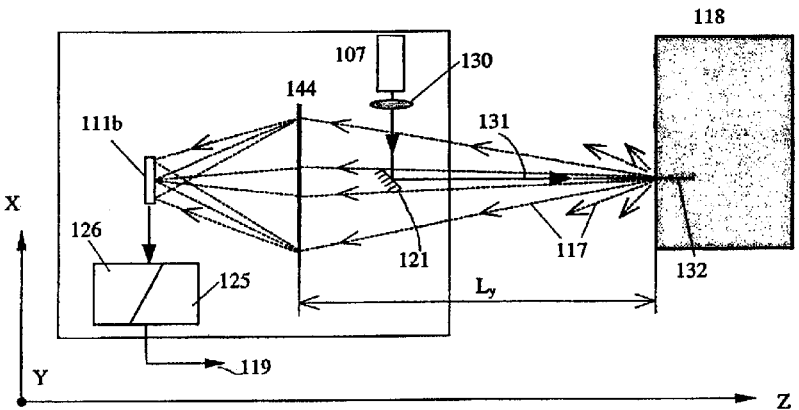
*FIG.22A*
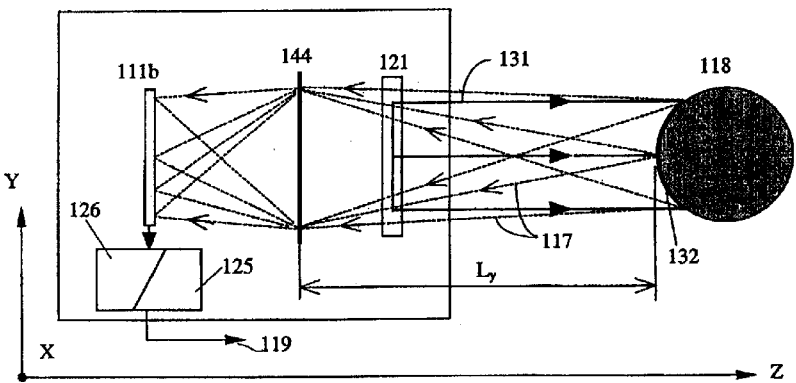
*FIG.22B*
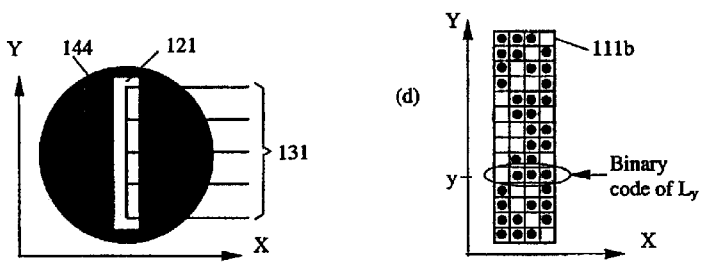
*FIG.22C*
*FIG.22D*

200
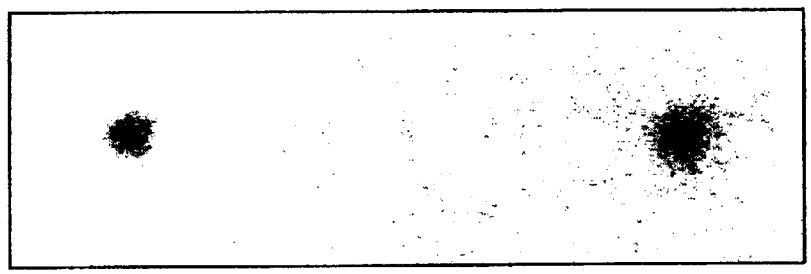
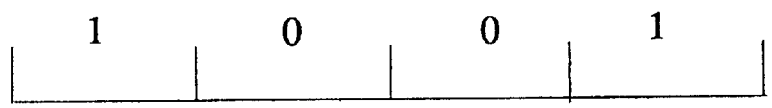
203
201
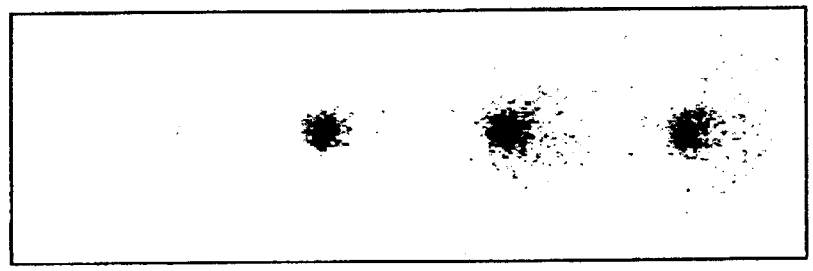
203
202
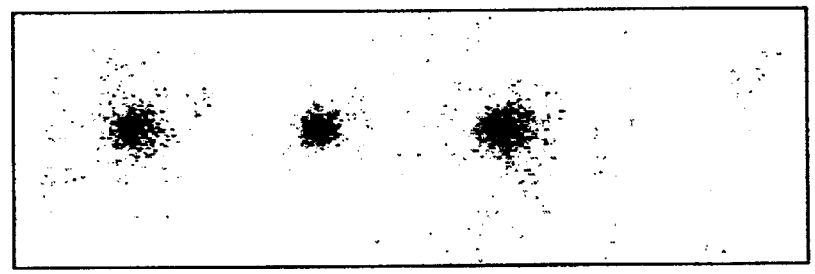
203
*FIG.24*

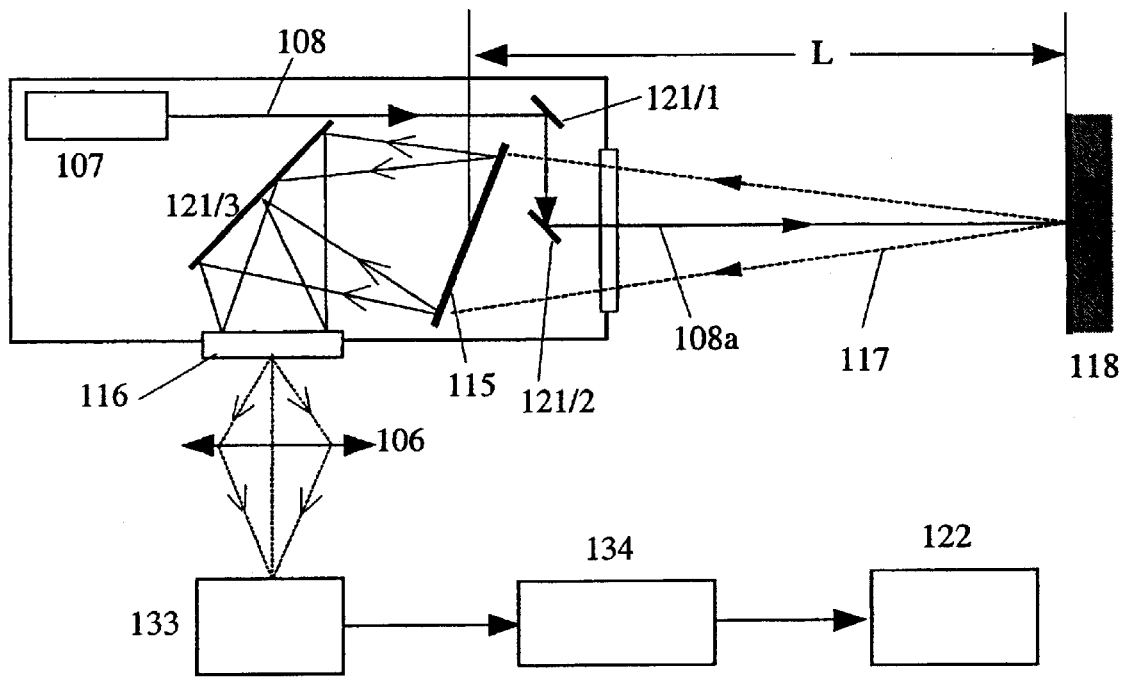
at $L_1$ = 90 mm  ← Image on glass window 116
1  0  0  1 ← binary digit
at $L_2$ = 100 mm  ← Image on glass window 116
0  1  1  1 ← binary digit
at $L_3$ = 120 mm  ← Image on glass window 116
1  1  1  0 ← binary digit
*FIG. 30*

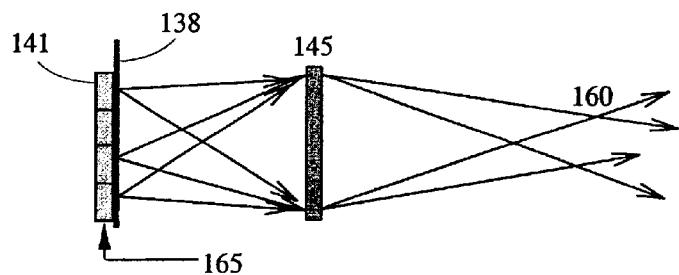
FIG. 36A
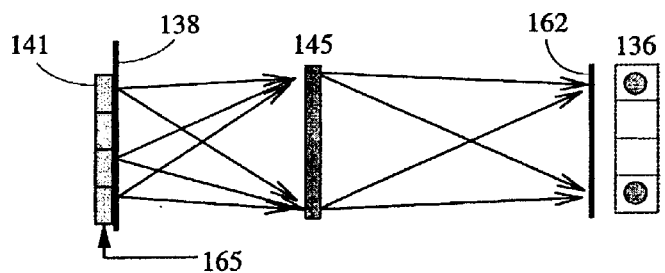
FIG. 36B
Fig. 36
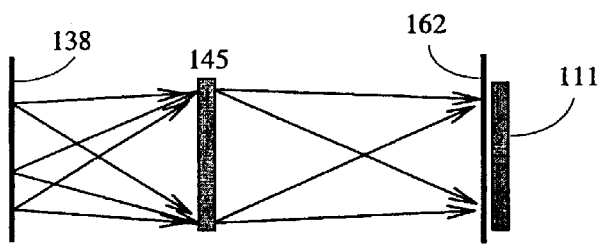
FIG. 37A
Fig. 37
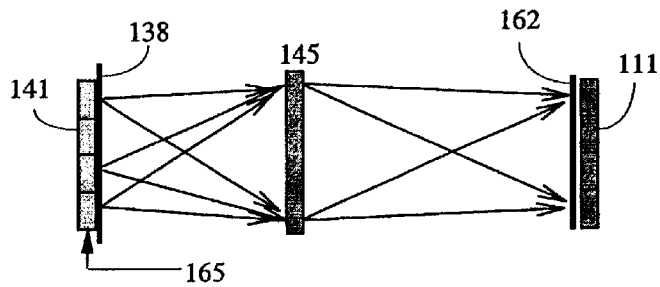
FIG. 38

*FIG.41*
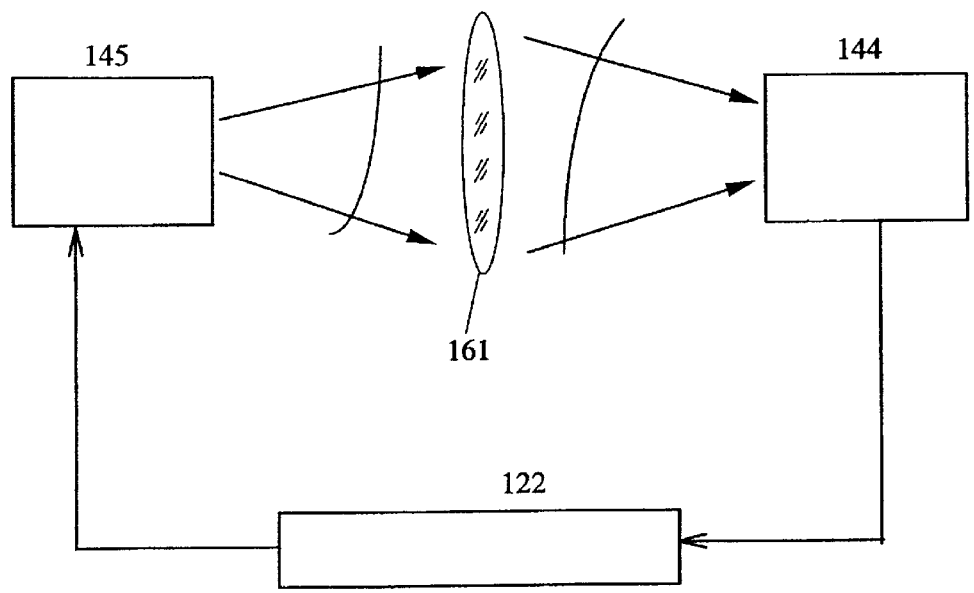
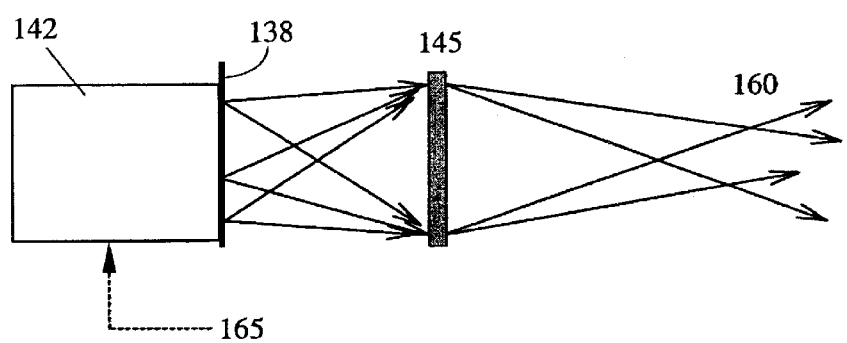
*FIG.42*

DISTANCE MEASUREMENT APPARATUS

1. BACKGROUND OF THE INVENTION

1.1 Field of the Invention

The present invention relates generally to an optical element (OE) which can serve as an optical analogue to digital converter (OADC) and/or an optical digital to analogue converter (ODAC), and uses therefor. The OE can be usefully employed in a variety of applications to transform analogue information present in a light wave front into digital light signals and/or to transform digital information into analogue information in the form of the physical parameters of a light wave front.

1.2 Description of the Related Art

A discussion of art related to the present invention follows.

1.2.1 Interferometry

An interferometer is an instrument used to make measurements of beams of light. Interferometers measure properties such as length, surface irregularities, and index of refraction. The interferometer operates by dividing a beam of light into multiple beams traveling unequal paths. When these beams interfere with each other, an interference pattern is formed.

The interference pattern appears as a series of light and dark bands referred to as interference fringes. Information derived from fringe measurements can be used to make precise wavelength determinations to measure minute distances and thickness, to study spectrum lines, and to determine refractive indices of transparent materials.

A classic example of an interferometer is the Twyman-Green interferometer (a modification of the Michelson interferometer), which is used for testing optical elements such as lenses and prisms. The Twyman-Green interferometer uses a point source of monochromatic light at the focus of a quality lens. When the light is directed toward a perfect prism, it returns to a viewing point exactly as it was from the source, resulting in a uniform field of illumination; however, imperfections in the prism glass distort the wave front. Similarly, when the light is directed toward a lens backed by a convex mirror, it passes through the lens, strikes the mirror, and retraces its path through the lens to a viewing point. Imperfections in the lens result in visually observable fringe distortions.

Interferometers have the capacity to transform a light wave front, which varies according to the radius of the curvature of the wave front, into a series of light rings. The direction vector of the distribution of the wave front is, in effect, coded to the period and inclination of the stripes of the interferometer picture. See, for example, Max Born et al., *Principles of Optics*, (1968). The rings of the interferometer pattern are strictly related to the physical parameters of the incoming wave front. However, to the inventor's knowledge, no one to date has used an interferometer to transform the information contained in a wave front into an optical digital image, such as an image consisting of a series of light spots.

1.2.2 Holography

Holography is a means of creating a unique photographic recording called a hologram. The recording appears to the naked eye as an unrecognizable pattern of stripes and whorls. However, when the hologram is illuminated by coherent light (e.g., a laser beam), the hologram projects a three-dimensional image of the recorded object.

While ordinary photographs record variations in the intensity (and sometimes color) of light reflected and scattered from an object, a hologram is a recording of both the intensity and phase of the light from the object. Holography depends on the effects of interferometry and diffraction to configure three-dimensional images.

A standard hologram is recorded as follows: A beam of coherent laser light is directed onto an object from a coherent light source. The beam is reflected, scattered, and diffracted by the physical features of the object and impacts on a photographic plate (this beam is referred to as the object beam). Simultaneously, part of the laser beam is split off as a reference beam and is reflected by a mirror onto the photographic plate.

The two parts of the laser beam-the reference and the object beams-meet on the plate and are recorded as interference fringes on the hologram. This pattern of fringes contains an optical record of the phase and amplitude of the light being reflected from the object.

To reconstruct the phase fronts of the object beam, the hologram must be illuminated by a beam which is similar to the beam used to construct the hologram. When the coherent light of the laser beam illuminates the hologram, most of the light from the laser passes through the film as a central beam. The fringes on the hologram act as a diffraction grating, bending or diffracting the remaining light to reverse the original condition of the coherent light waves that configured the hologram.

On the light source side of the hologram, a visually observable virtual image is formed. On the other side, a real image that can be photographed is formed. Both reconstituted images have a three-dimensional character because the hologram is a recording of both amplitude information and phase information. The phase information provides the three-dimensional characteristic of the image because it contains information regarding the contours of the object.

A common example of a hologram is the white-light hologram commonly used on a German visa. Such holograms permit an observer to view multiple images (typically about 10 images) depending on the angle from which the observer views the hologram.

Holograms are also commonly impressed on documents, such as credit cards, as a security measure, to display the control panels of aircraft on their windshields, and are used as an archival method for storage of experimental results, and to detect minute distortions in three-dimensional objects. See Laufer, Introduction to *Optics and Lasers in Engineering*, p. 204 (1996) (the entire disclosure of which is incorporated herein. by reference).

The present invention employs an OE, such as a specially recorded hologram, to transform varied incoming light into an output digital light code which can be visually observed and/or read by a photodetector and interpreted by a computer processor.

As will be discussed in greater detail below, the present invention also employs a variety of elements known in the art which can mimic the effects of a hologram, including for example, spatial light modulators and kinoforms. A kinoform is essentially a complex lens which operates on the phase of the incident light. The phase modulation of an object wave front is recorded as a surface-relief profile.

1.2.3 Use of Lasers in Distance Measurement

Lasers have been applied in a variety of ways to measure distance. Typical methods include interferometry, laser Doppler displacement, beam modulation telemetry, and pulse time of light.

Laser interferometers typically provide measurement of displacement from a starting position rather than a measurement of position. The instrument reading is typically set to zero as the initial position of the moving part, and the motion is then measured relative to this zero position. See Ready, *Industrial Applications of Lasers,* page 260 (1997) (the entire text of which is incorporated herein by reference).

Laser interferometry or distance measurement must be used in a controlled environment. Accordingly typical applications include setup of work holding fixtures for the production of aircraft engine components, checking out of the motion of machine tools, positioning operations, rack setup on boring mills, building vibration measurement, and measurement of strain in the earth. See Id. at pages 268 to 269.

Laser Doppler displacement distance measurement takes advantage of the Doppler shift of laser frequency effected when a stabilized laser is reflected from a moving surface. This frequency shift can be measured and converted to a measurement of surface displacement, i.e., the difference between a start position and position of an object.

Neither interferometric nor Doppler displacement methods can be used to measure large distances in uncontrolled environments. In particular, fluctuations of the density of the atmosphere over paths exceeding a few hundred feet make these methods impractical.

A common method of distance measurement used outdoors over long distances involves amplitude modulation of a laser beam and projection of the modulated beam toward a target. Distance is measured by comparing the phase of the modulated amplitude of returning light with the phase of the modulated amplitude of emitted light.

Pulse laser range finders are also commonly used to determine large distances. Commercial applications include generation of terrain maps, calibration of aircraft radar, and measurements of ranges of aircraft and ground vehicles. Pulse laser range finders emit a short pulse of laser light and measure the transit time for the pulse to reach a visible target, and for the reflected pulse to return to a receiver located near the laser.

The present invention employs an optical element, such as a hologram or kinoform, in a Range Finder to measure distance. The simplicity of the Range Finder of the present invention enables the production of low cost high quality Range Finders for a wide variety of uses, including measurement of microdistances, measurement in terms of meters and millimeters for construction and surveying, and measurement in terms of kilometers for large scale surveying and mapping applications.

1.2.4 Optical Computing

Digital signal processing and computing systems contain large numbers of interconnected gate switches and memory elements. In electronic systems the interconnections are made by use of conducting wires, coaxial cables, or conducting channels with semiconductor integrated circuits. Photonic interconnections may similarly be realized using optical wave guides with integrated optic couplers or fiber optic couplers and microlenses. Free space light beams may also be used for interconnections. Conventional optical components (mirrors, lenses, prisms, etc.) are used in numerous optical systems to establish optical interconnections, such as between points of the object and image planes of an imaging system. Computer processor-generated holograms, made of a large number of segments of phase gratings of different spatial frequencies and orientations, have also been used to configure high-density arrays of optical interconnections. A phase grating is a thin optical element having a complex amplitude transmittance. See Saleh et al. "Fundamentals of Photonics" pp. 855–857. (1991) (the entire disclosure of which is incorporated herein by reference.

Holograms are commonly used in optical switching and computing operations. Optical switches establish and release connections among transmission paths in a communication or signal processing system. (Id. p. 833). Holographic interconnection devices have been used to establish one-to-many or many-to-one interconnections (i.e., connecting one point to many points or vice versa). Id p. 859.

Optical elements can be fabricated by using computer processor-generated holography. This permits complex function to be encoded with the help of a binary function having only two values, such as 1 and 0 or 1 and −1. The binary image is printed on a mask with the help of a computer processor. The mask plays the role of the hologram. The binary image may also be printed by etching grooves in the substrate which modulates the phase of an incident coherent wave, a technology known as surface relief holography.

Optical interconnections may be implemented within microelectronics using electronic optical transducers (light sources) acting as transmitters that beam the electric signal to an optical electronic transducer (photodiodes) acting as receivers. A reflection hologram can be used as routing device to redirect the emitted light beams to the appropriate photodetectors. Id. pp. 860–861.

Digital electronic computer processors are made from large numbers of interconnected logic gate switches and memory elements. Numbers are represented in binary systems and mathematical operations such as addition, subtraction and multiplication are reduced to a set of logic operations. Instructions are encoded in the form of sequences of binary numbers. The binary numbers "0" and "1" are represented physically by two values of the electric potential. The system operation is controlled by a clock that governs the flow streams of binary digits in the form of electrical pulses. Interconnections between the gates and switches are typically local or via a bus into the operation is sequential (i.e., time is multiplexed).

A large number of points in two parallel planes can be optically connected by a large 3-dimensional network of free space global interconnections established using a custom-made hologram. For example, it is possible to have each of $10^4$ points in an input plane interconnected to all $10^4$ points of an output plane or each point of $10^6$ points in the input plane connected to an arbitrarily selected set of 100 points among $10^6$ points in the output plane.

The optical computer processor can be programmed or reconfigured by changing the interconnection hologram. Each gate can be connected locally or globally to a small or large number of other gates in accordance with a fixed wiring pattern representing, for example, arithmetic logic units, central processing units or instruction decoders. The machine can be programmed or reconfigured by changing the interconnection hologram. The gates typically are NOR gates. Each gate has two inputs and one output. The optical beam from each gate is directed by the hologram to the appropriate inputs of other gates. The electronic digital circuit is translated into a map of interconnections between the output and in points in the plane. The interconnection map is coded on a fixed computer processor-generated hologram. Data arrive in the form of a number of optical beams connected directly to appropriate gate inputs and a number of gates deliver the final output of the processor. The main technical difficulty preventing the creation of such a computer processor is the creation of large high-density arrays of fast optical gates that operate at sufficiently low switching energies and dissipate manageable powers.

Holograms are also used for simple operations in analogue optical processing.

However, while the foregoing operations in the optical computing field employ holograms to redirect beams of light, there is no direct correlation between the distribution of light in input plane and the distribution of light in the output plane, i.e. if any point in input plane is "turned off," other points in the input plane are connected via the hologram to the corresponding point in output plane, such that the distribution of light in the output plane is not changed. Thus, information is transformed based on the intensity of light of every point in input plane separately from another points. For example, if many-to-one interconnections are present, the intensity of light of each point of the input plane is duplicated in the output plane such that if half of the points of the input plane are "turned off" then a corresponding light point is still present in the output plane. In other words, interconnection holograms do not transform the distribution of light in input plane as a whole, instead interconnection holograms transform light of every point in input plane separately from other points in input plane.

There is, therefore, a crucial need in the art for a means for using parameters of light other than intensity for carrying information, such as the radius of the wave front and/or the direction vector of the wave front. There is also a need in the art for a means of transforming information present in the distribution of the intensity of light of all points in an input plane as a whole.

2. SUMMARY OF THE INVENTION

In one aspect, the present invention provides an optical element (OE) having the capacity to transform information excluding intensity contained in a light wave front into digital information in the form of light shapes, such as spots, lines, etc. The optical element can be, for example, a specially manufactured hologram, computer generated hologram, or kinoform. In various aspects of the invention the information is contained in the radius of curvature and/or direction vector of the wave front, and is preferably not contained solely in the intensity of the wave front.

In another aspect, the present invention provides an optical analogue-to-digital converter (OADC) employing the foregoing OE. In another aspect, the present invention provides an optical digital-to-analogue converter (ODAC) employing the foregoing OE. The OADC and ODAC of the present are useful, for example in optoelectronic computing applications.

It yet another aspect, the present invention provides an instrument for measuring distance (referred to herein as a "Range Finder") employing the OADC of the present invention.

Furthermore, the present invention provides a real-time holographic display unit employing the ODAC of the present invention.

Additionally, the present invention provides a device for measuring the parameters of light of wave fronts employing an OE of the present invention. Such a device can be useful, for example, in measuring the quality of optical elements, e.g., measuring wave aberrations of lenses and mirrors, and can be also used to replace or supplement a classical interferometric device.

Other objects and further scope of applicability of the present invention will become apparent from the detailed description given hereafter. It should be understood that the detailed description and specific examples, while indicating preferred embodiments of the invention, are given by way of illustration only, since various changes and modifications will become apparent to those skilled in the art from this detailed description.

3. BRIEF DESCRIPTION OF THE DRAWINGS

FIGS. 1a–b schematically illustrate the how the basic directions of light rays can be redirected by an Optical Element (OE) of the present invention for a transparent OE (FIG. 1a) and a reflecting OE (FIG. 1b).

FIGS. 2a–d schematically illustrate a configuration of an OADC according to the present invention using a transparent OE (FIGS. 2a, b) and reflected OE (FIGS. 2c, d).

FIGS. 3a–e schematically illustrate a sandwich configuration [lens+OE] of the OADC for a transparent OE (FIGS. 3a, b) and a reflected OE (FIGS. 3c, d, e).

FIGS. 4a–d schematically illustrate a sandwich configuration [OE+lens] of an OADC according to the present invention for a transparent OE (FIGS. 4a, b) and a reflected OE (FIGS. 4c, d).

FIG. 5 schematically illustrates a sandwich configuration [lens+OE+lens] of an OADC according to the present invention for a transparent OE (FIGS. 5a, b, c) and reflected OE (FIGS. 5d, e, f, g).

FIGS. 6a–c schematically illustrates the coordination of the angular aperture a of incoming light, the incoming aperture $\psi_{in}$ of the OE, the output aperture $\phi_{out}$ of the OE and the required angular aperture $\beta$ of the output light (output image).

FIGS. 7a–d schematically illustrates the displacement light spots of the optical digital image in a plane of a multi-element photodetector, caused by a wide spectral linewidth of the laser. FIG. 7a shows the desirable positions of the light spots of the optical digital image on the photodetector elements. FIG. 7b shows defocused light spots of the optical digital image caused by a wide spectral linewidth. FIG. 7c shows displaced (shifted) light spots of the optical digital image caused by a change of laser wavelength $\lambda \neq \lambda_1$. FIG. 7d shows light spots that are both shifted and defocused.

FIG. 8 schematically illustrates an arrangement of the various components of an OADC according to the present invention.

FIGS. 9a–e schematically illustrate various parameters of the linear multi-element photodetector, including a one dimensional (1D) optical digital image having 10 bits (FIG. 9a), a linear multielement photodetector (FIG. 9b), positions of the light spots on the linear photodetector (FIG. 9c), the distribution of light intensity I(x) of the optical digital image (FIG. 9d), and the output electrical signal $J_{rec}(t)$ from the photodetector (FIG. 9e).

FIGS. 10a–e schematically illustrate various parameters of the linear multi-element photodetector, including a one dimensional (1D) optical digital image (FIG. 11a), a linear multi-element photodetector (FIG. 10b), an arrangement of the optical digital image on the multi-element photodetector according to one embodiment of the present invention (FIG. 10c), the distribution of light intensity I(x) of the optical digital image (FIG. 10d), and the output electrical signal $J_{rec}(t)$ from the photodetector (FIG. 10e).

FIGS. 11a–c schematically illustrate various parameters of a matrix photodetector according to one embodiment of the present invention, including a two-dimensional (2D) optical digital image (FIG. 11a), an arrangement of the optical digital image on the matrix photodetector having 8×8 pixels (FIG. 11b), and an arrangement of the optical digital image on the matrix photodetector having 32×32 pixels (FIG. 11c).

FIG. 12 schematically illustrates the recordation of the hologram used as the OE prototype in the prototype OADC.

FIGS. 13a–c schematically illustrate the masks and basic lens raster configuration used to record the OE prototype hologram for use in the prototype OADC.

FIG. 14 schematically illustrates the configuration used to test the OE of the OADC prototypes.

FIGS. 15a–b schematically illustrate a basic configuration of a Range Finder according to the present invention where the direction of the laser beam does not coincide with vector $N_{in}$ of the OADC. FIG. 15b illustrates that angle γ between the vector $N_{in}$ of the OADC and the angle at which the laser beam impacts the object varies with the distance from the OE to the object.

FIG. 16 schematically illustrates a simple configuration of a Range Finder according to the present invention wherein the direction of laser beam coincides with vector $N_{in}$ of the OADC.

FIGS. 17a–c schematically illustrate two simple configurations of a Range Finder according to the present invention, employing a splitter (FIG. 17a), and a small mirror (FIG. 17b). The arrangement of the mirror is shown in FIG. 17c.

FIG. 18b shows a close-up view of the configuration of the laser path of the Range Finder shown in FIG. 18a.

FIGS. 22a–d show configurations of a Range Finder device according to the present invention for measuring the topography of three-dimensional (3D) objects, and the mirror and "light knife" (FIG. 22c) and the matrix photodetector (FIG. 22d) of such configuration.

Figure 23:
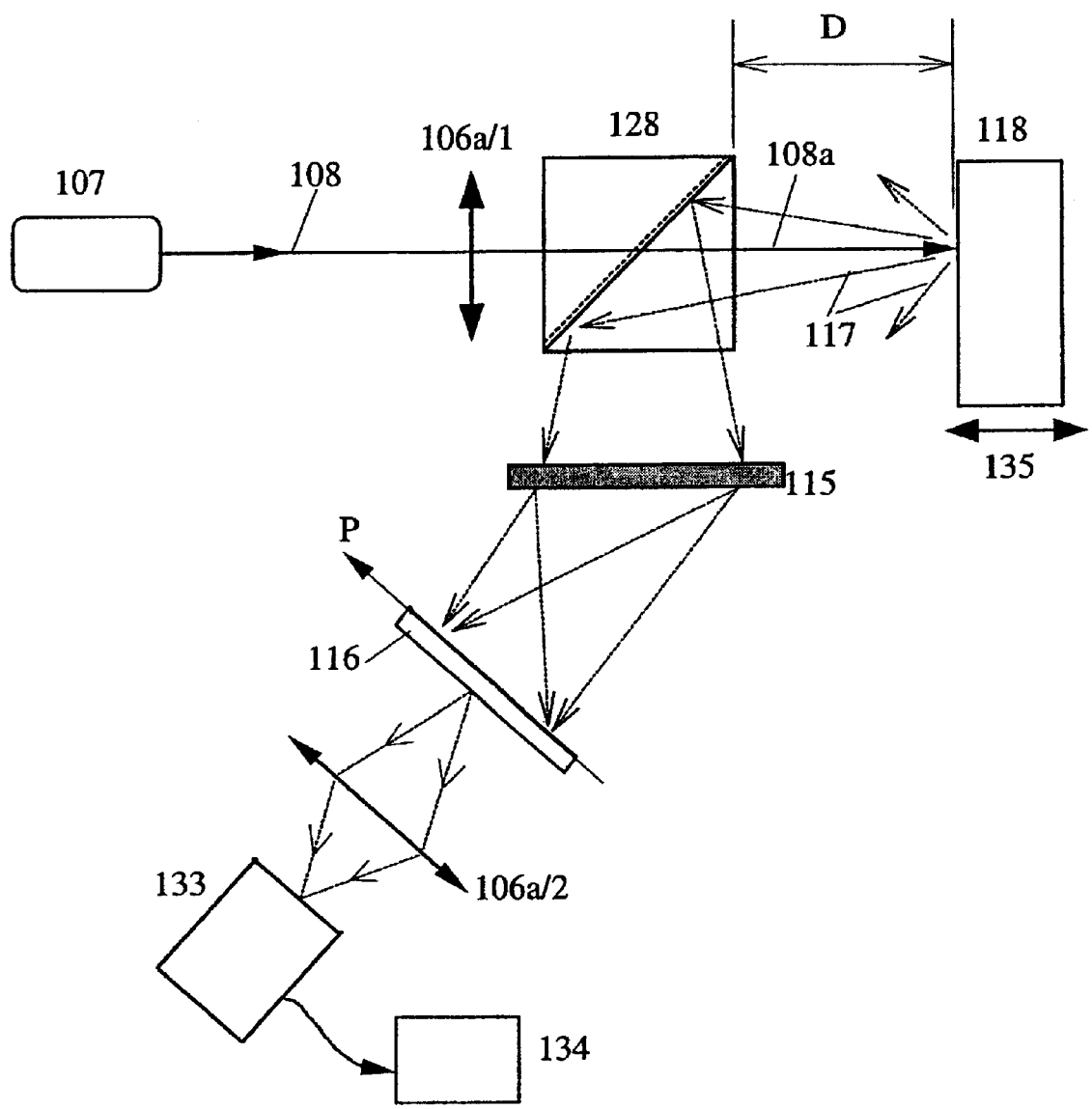

FIG. 23 schematically illustrates the configuration of the first prototype Range Finder according to the present invention.

FIG. 24 shows the optical digital images (negatives) which resulted from the initial testing of the prototype Range Finder of FIG. 23.

Figure 25:
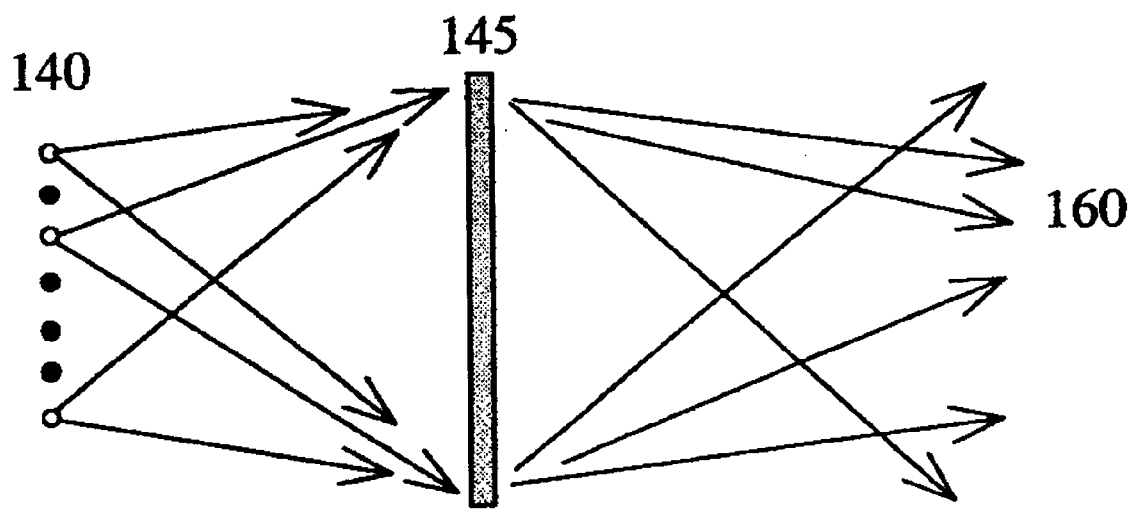

FIG. 25 schematically illustrates an ODAC configured to provide an analogue output.

Figure 26:
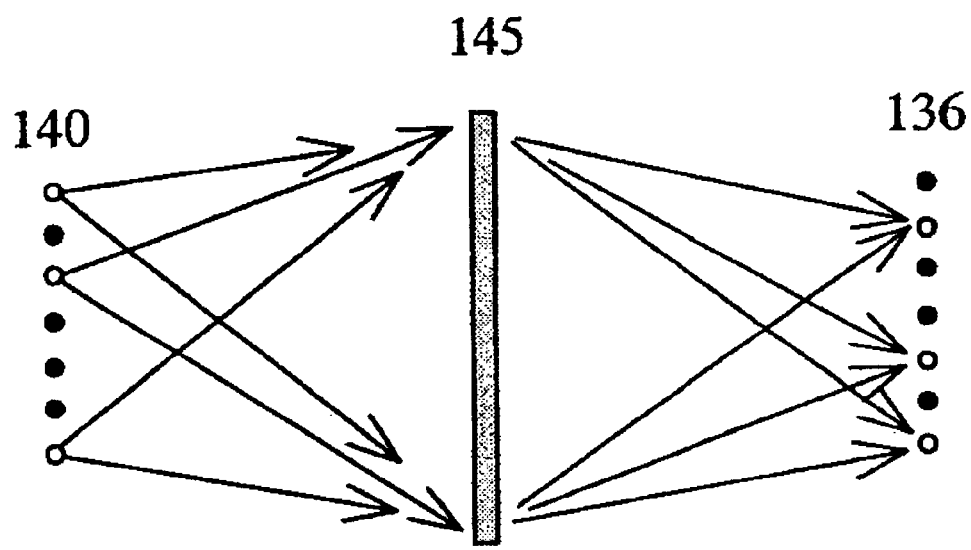

FIG. 26 schematically illustrates an ODAC configured to provide an output optical digital image from an input optical digital image.

Figure 27A:
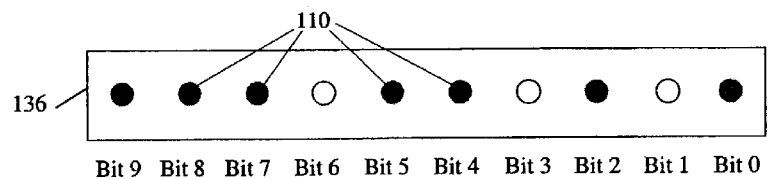
Figure 27B:
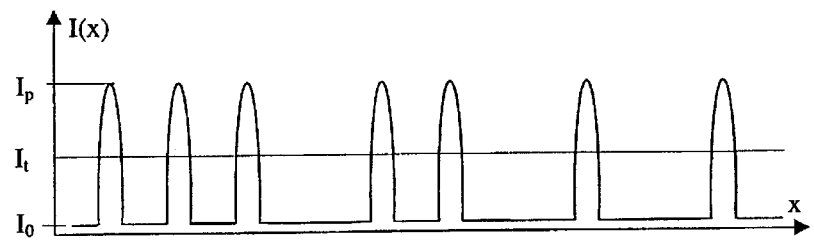
Figure 27C:
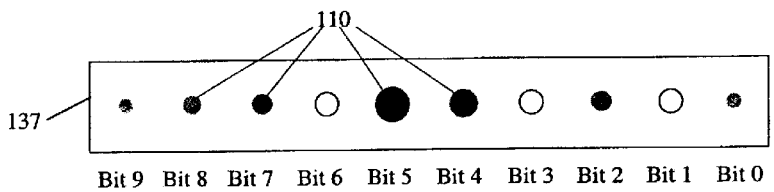
Figure 27D:
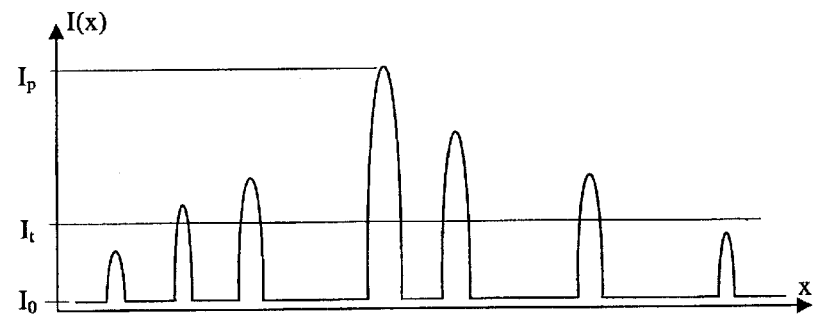

FIGS. 27a–b illustrate an optical digital image according to the present invention, while FIGS. 27c–d illustrate a quasi-digital image 137 of the prior art consisting of gray ones and zeros formed by a diffractive grating.

Figure 28:
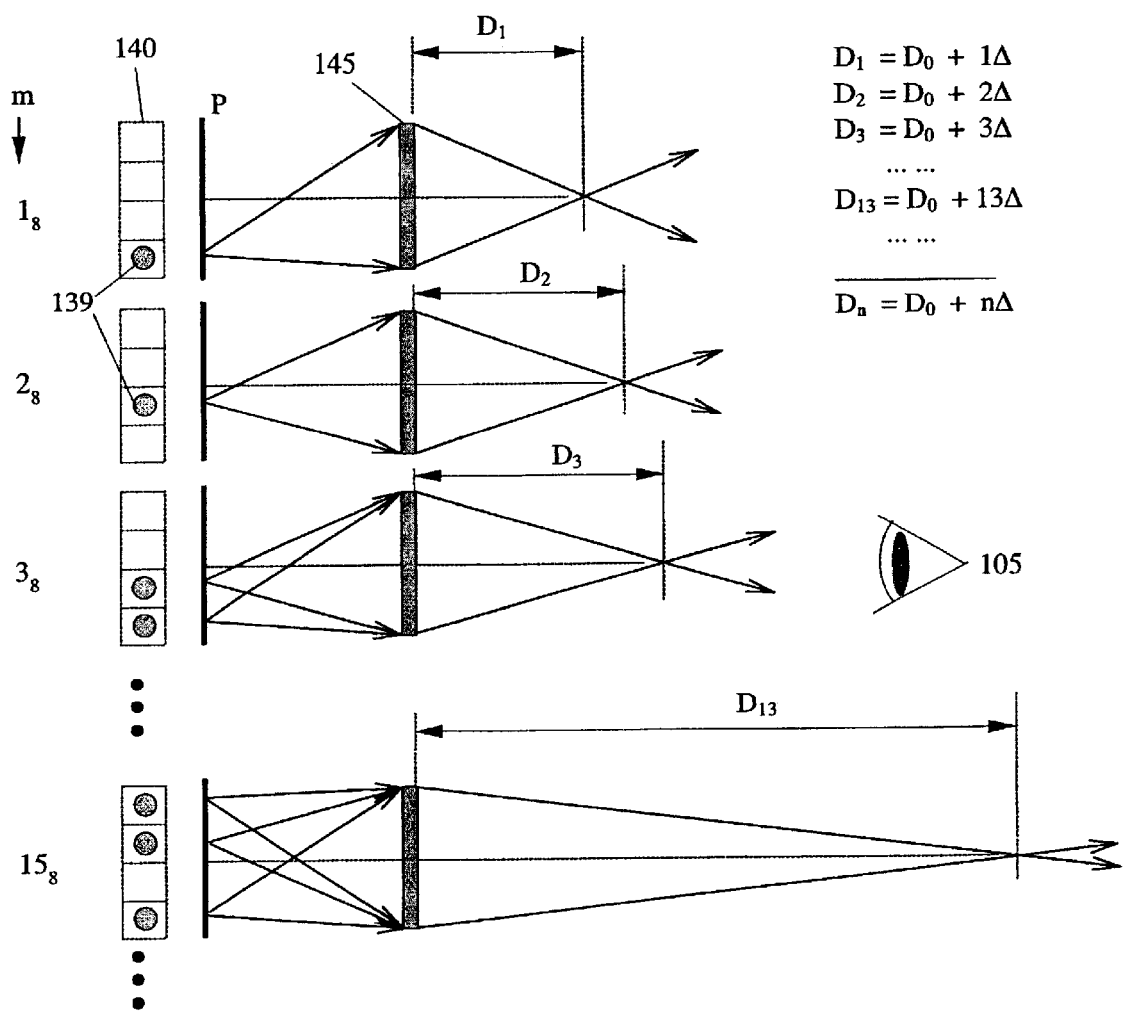

FIG. 28 shows a configuration of an ODAC of the present invention wherein various input optical digital images provide various output analogue images.

Figure 29:
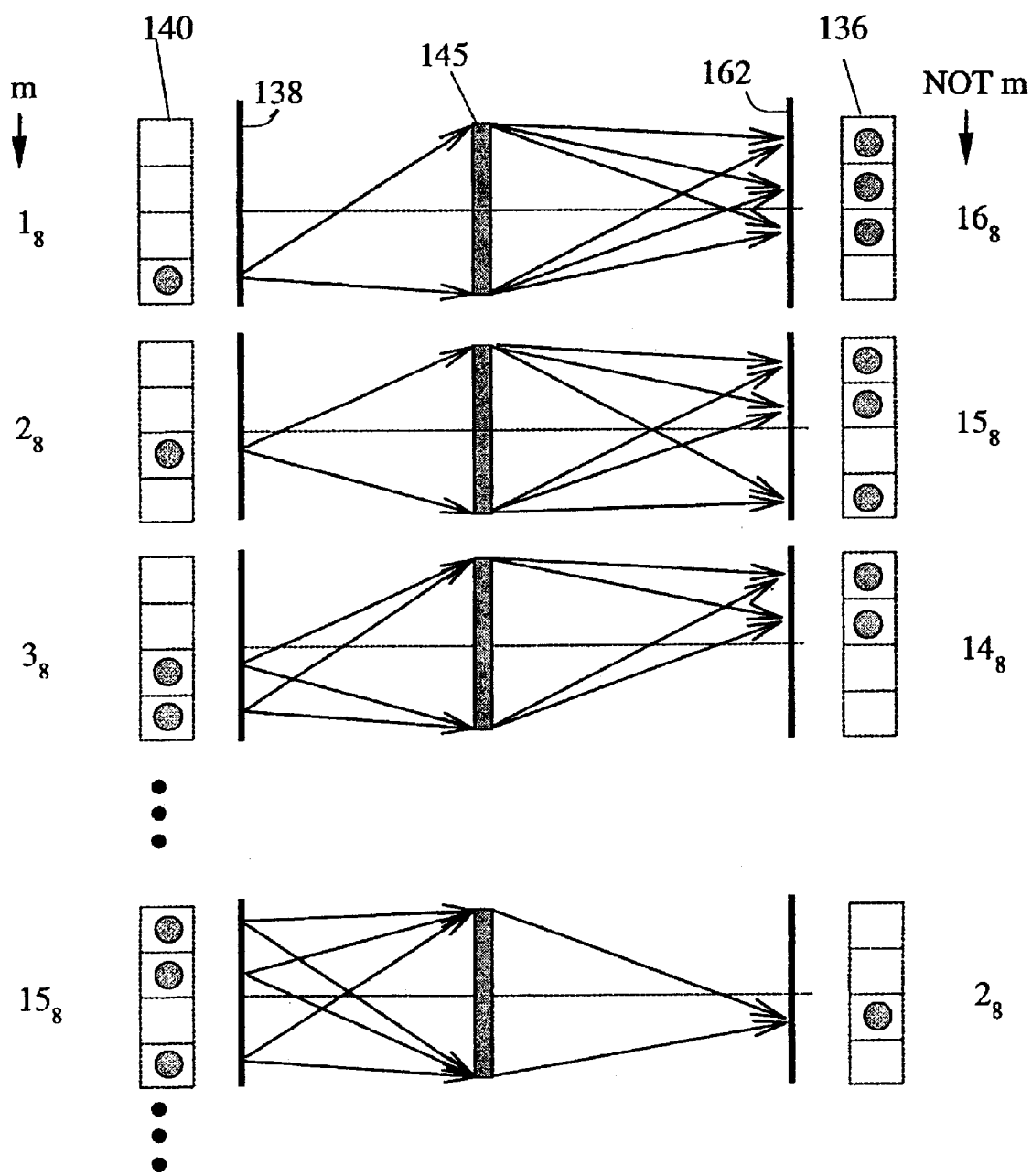

FIG. 29 shows the operation of an ODAC according to the present invention wherein the input image is an optical digital image and the output image is also an optical digital image.

FIG. 30 shows a prototype Range Finder according to the present invention.

FIGS. 31a–d show various configurations of the ODAC of the present invention without a lens, including a configuration using a transparent OE (FIGS. 31a,b), and a configuration using a reflected OE (FIGS. 30c,d).

Figure 32A:
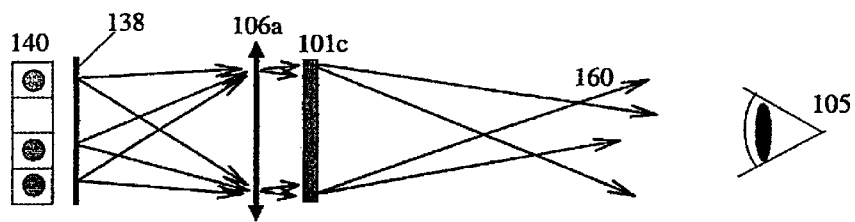
Figure 32B:
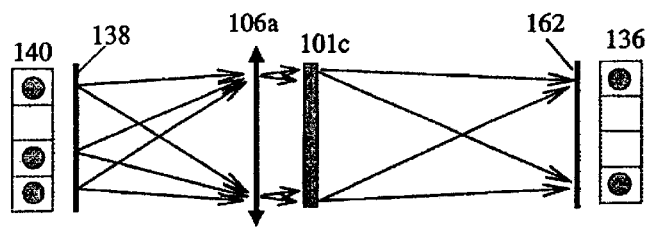
Figure 32C:
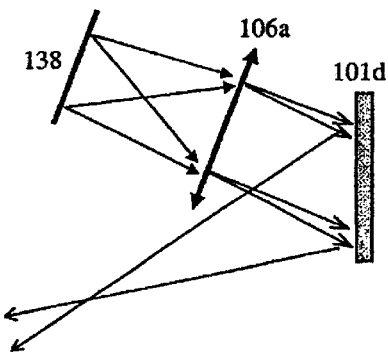
Figure 32D:
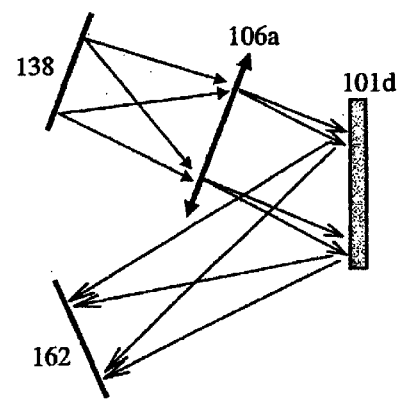

FIGS. 32a–d show an ODAC according to the present invention having a sandwich configuration [lens+OE], including configurations using a transparent OE (FIGS. 32a,b) and configurations using a reflected OE (FIGS. 32c,d).

Figure 33A:
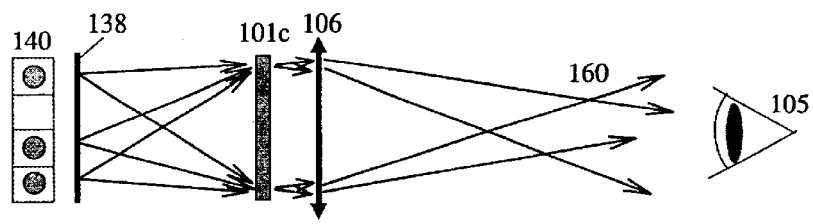
Figure 33B:
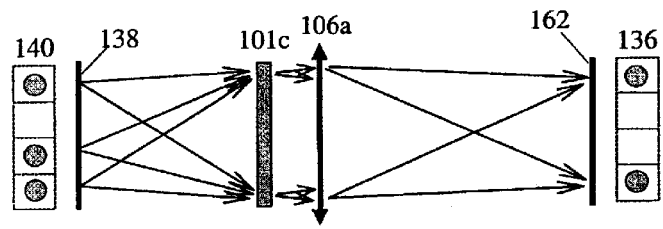
Figure 33C:
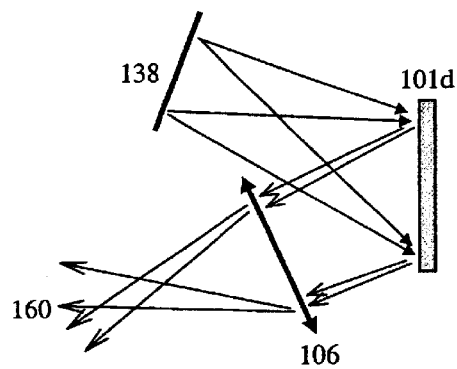
Figure 33D:
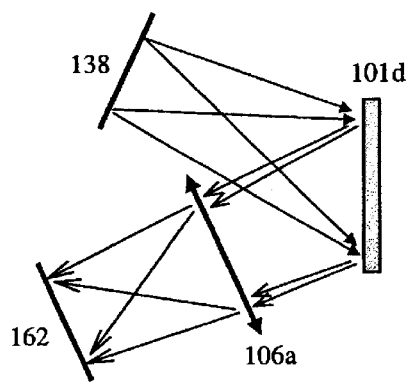

FIGS. 33a–d show an ODAC according to the present invention having a sandwich configuration [OE+lens], including configurations using a transparent OE (FIGS. 33a,b) and configurations using a reflected OE (FIGS. 33c,d).

Figure 34A:
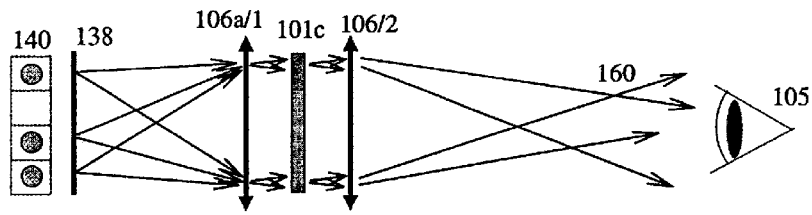
Figure 34B:
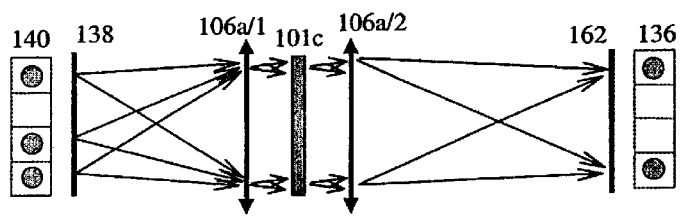
Figure 34C:
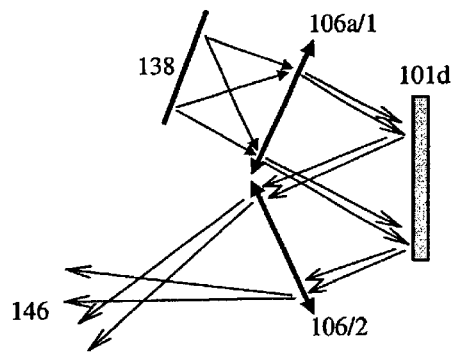
Figure 34D:
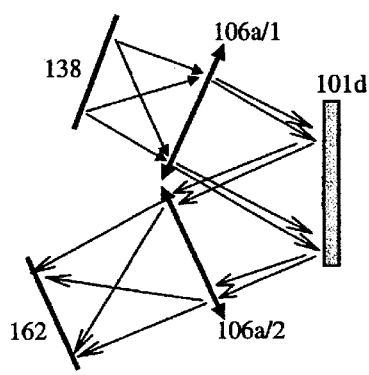

FIGS. 34a–d show an ODAC according to the present invention having a sandwich configuration [lens+OE+lens], including configurations using a transparent OE (FIGS. 34a–b) and configurations using a reflected OE (FIGS. 34c–d).

Figure 35A:
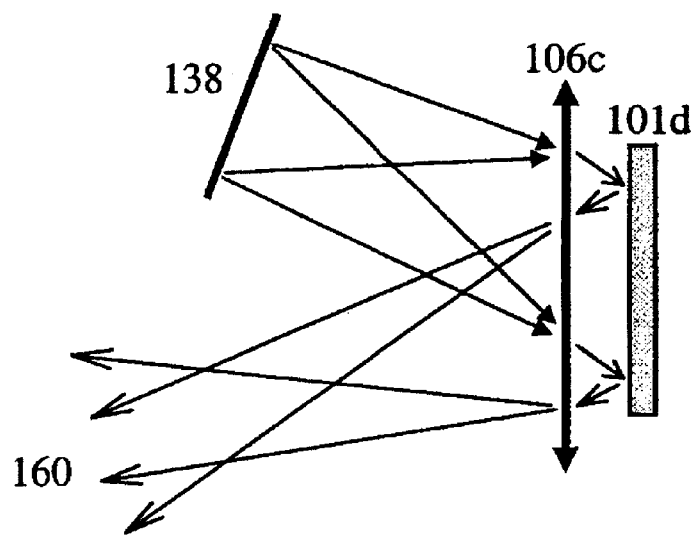
Figure 35B:
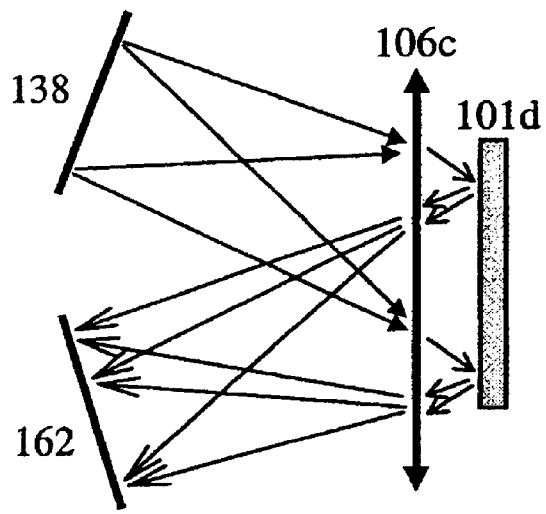

FIG. 35 shows a configuration of an ODAC according to the present invention having a sandwich configurations [lens+OE+lens], wherein a single lens is in essentially the same plane as the reflected OE.

FIGS. 36a–b show a configuration of an ODAC according to the present invention further comprising a Spatial Light Modulator (SLM) as an input light source.

FIG. 37 shows an ODAC of the present invention further including a multi-element photodetector in the plane of the output optical digital image.

FIG. 38 shows an ODAC of the present invention further comprising both an SLM as an input light modulating source and a multi-element photodetector.

Figure 39A:
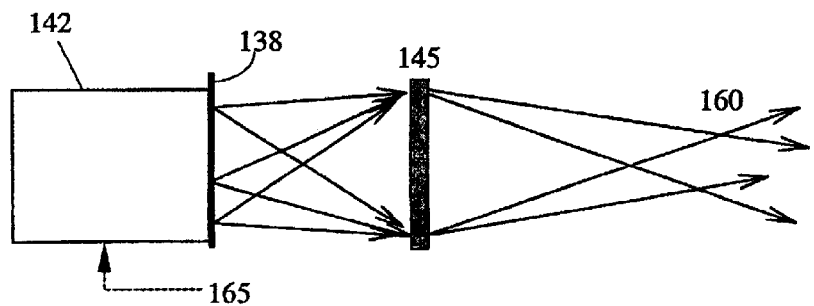
Figure 39B:
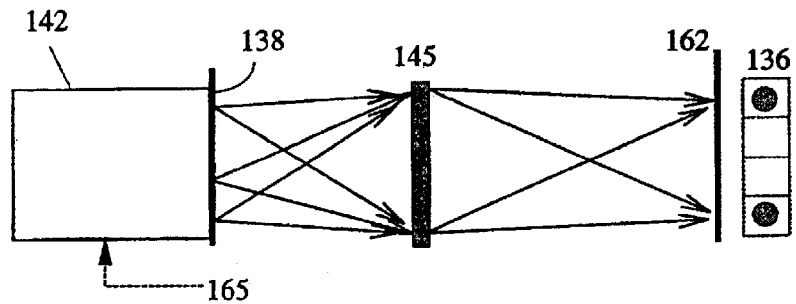

FIG. 39 shows an ODAC of the present invention further comprising a unit for the formation of the optical digital image.

Figure 40:
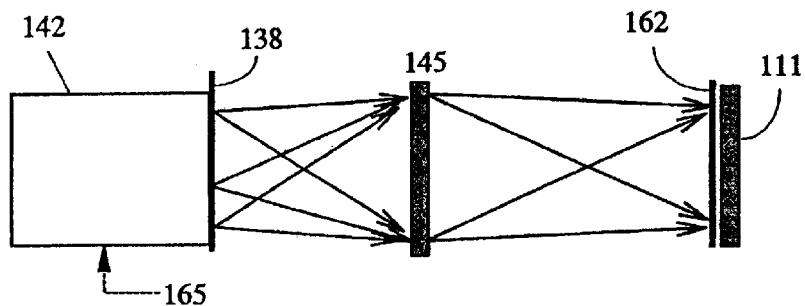

FIG. 40 shows and ODAC according to the present invention comprising both a unit for the formation of the optical digital image and a multi-element photodetector.

FIG. 41 schematically illustrates an optics testing unit employing an ODAC/OADC according to the present invention.

FIG. 42 schematically illustrates configurations of a 3-D holographic display unit according to the present invention.

Figure 43:
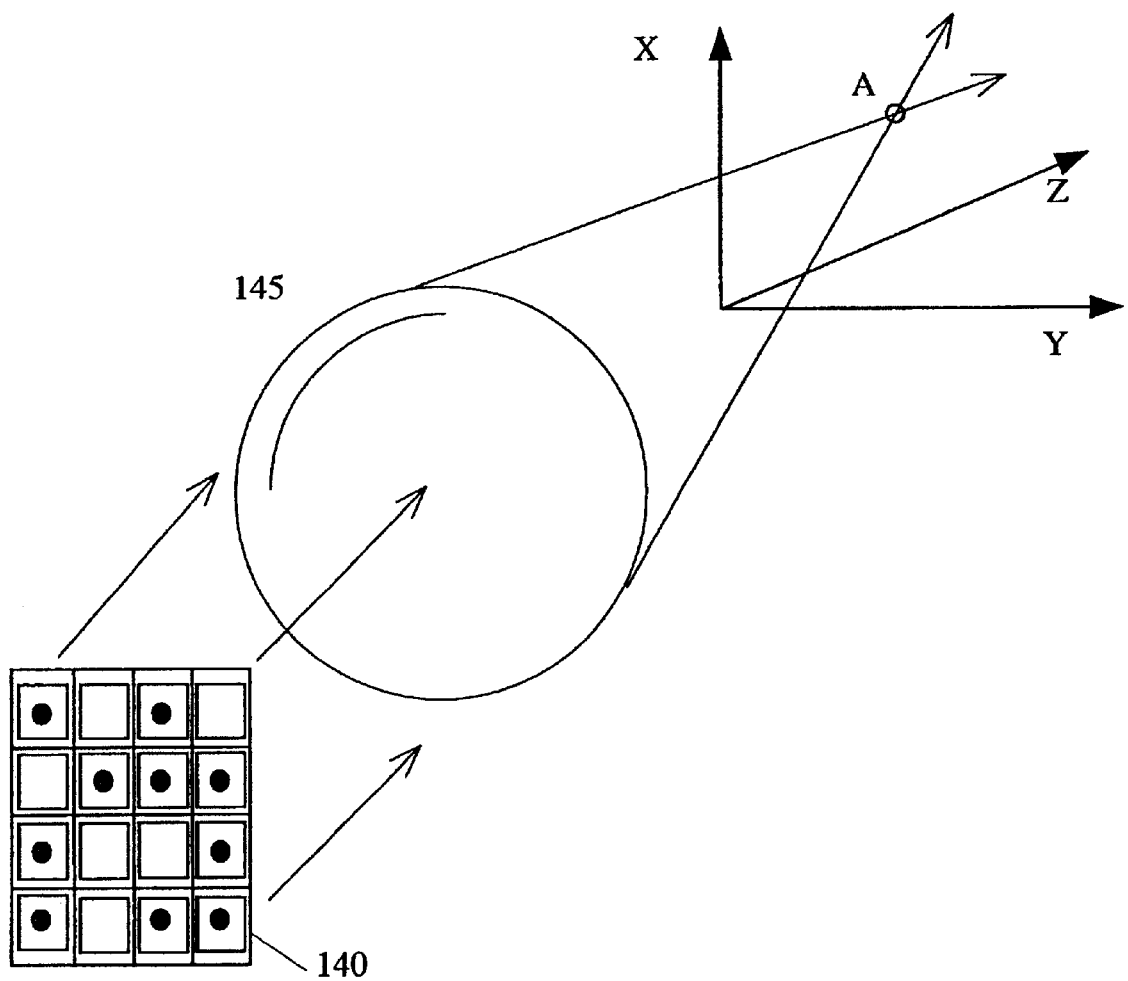

FIG. 43 schematically illustrates a process of formation of a dot image using an ODAC according to the present invention.

Figure 44:
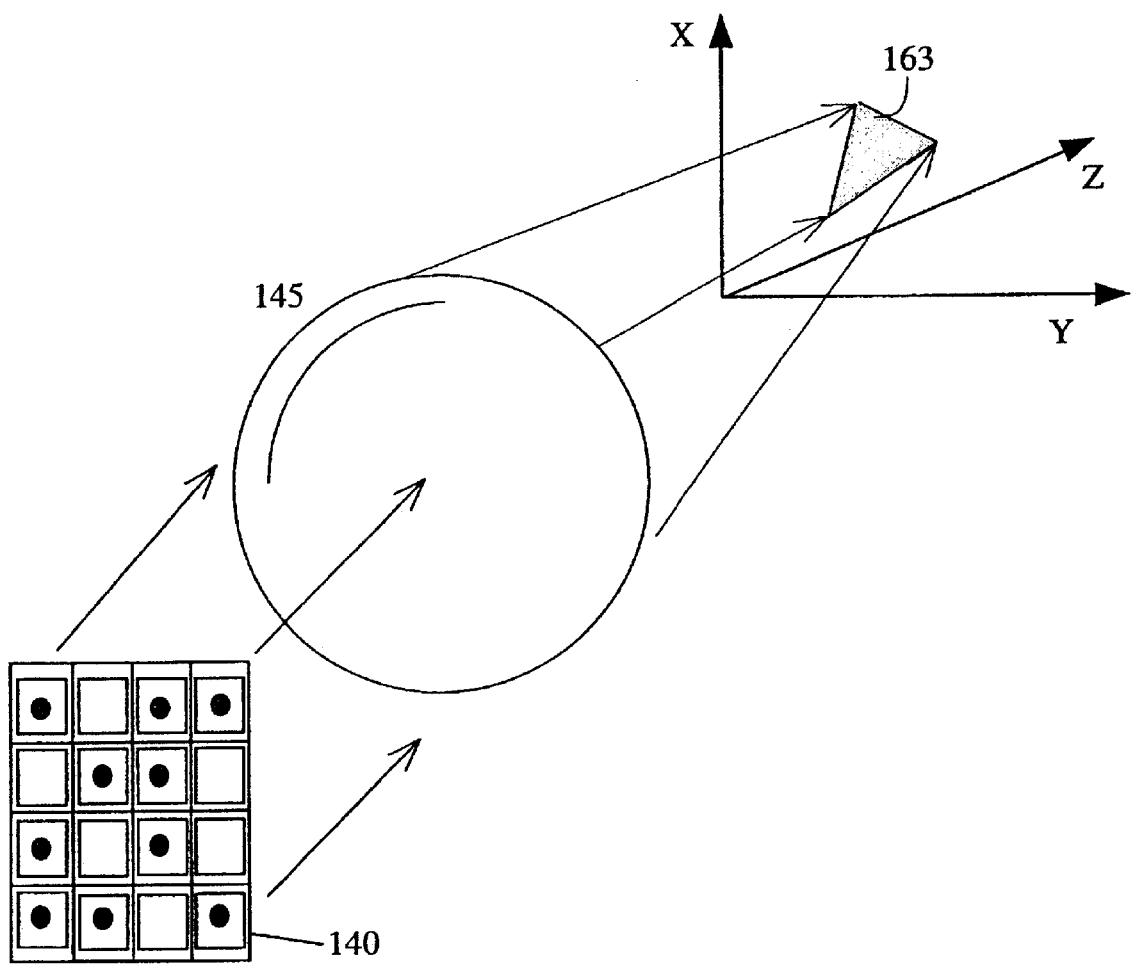

FIG. 44 schematically illustrates a process of formation of a side image using an ODAC according to the present invention.

Figure 45:
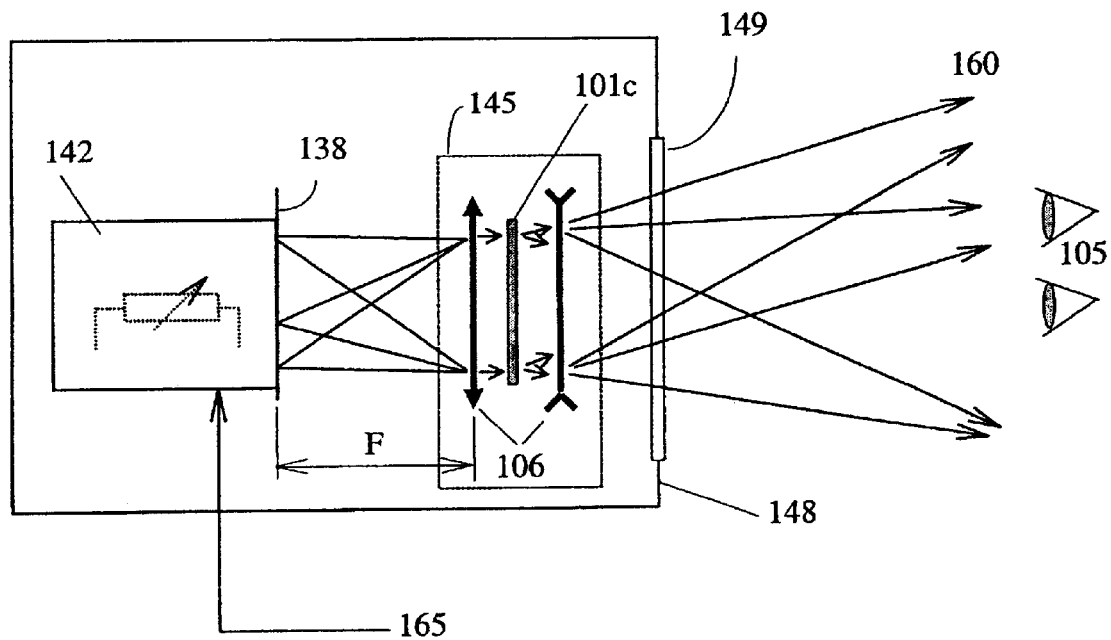

FIG. 45 schematically illustrates a simple configuration of a 3-D holographic display unit according to the present invention.

Figure 46:
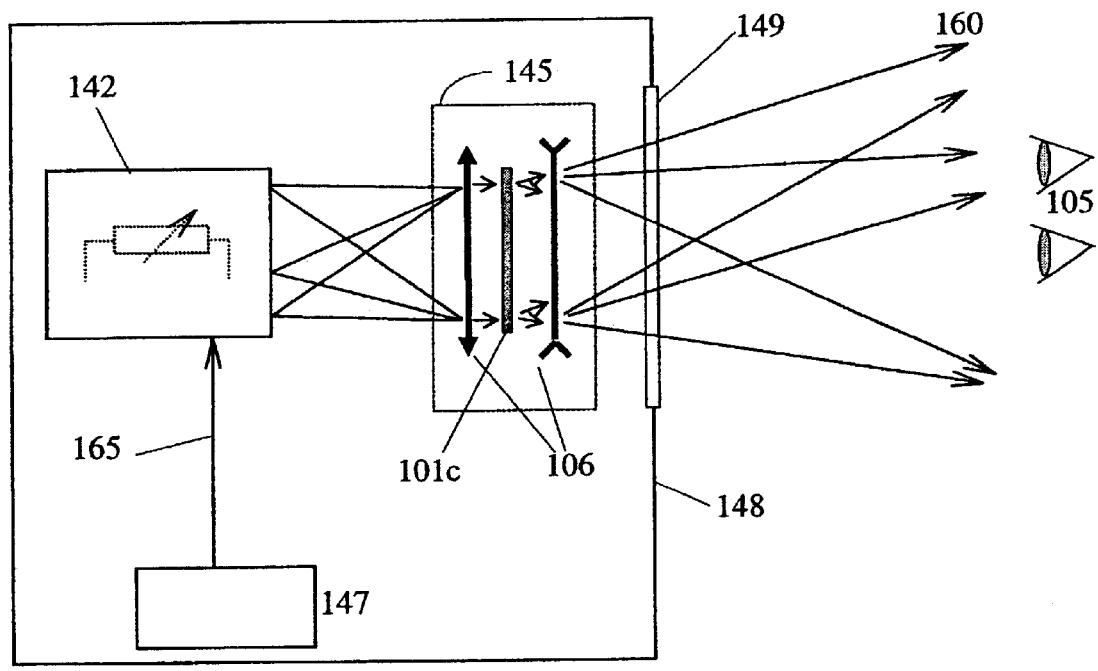

FIG. 46 schematically illustrates a configuration of a holographic display unit comprising ROM (CD-ROM) according to the present invention.

Figure 47:
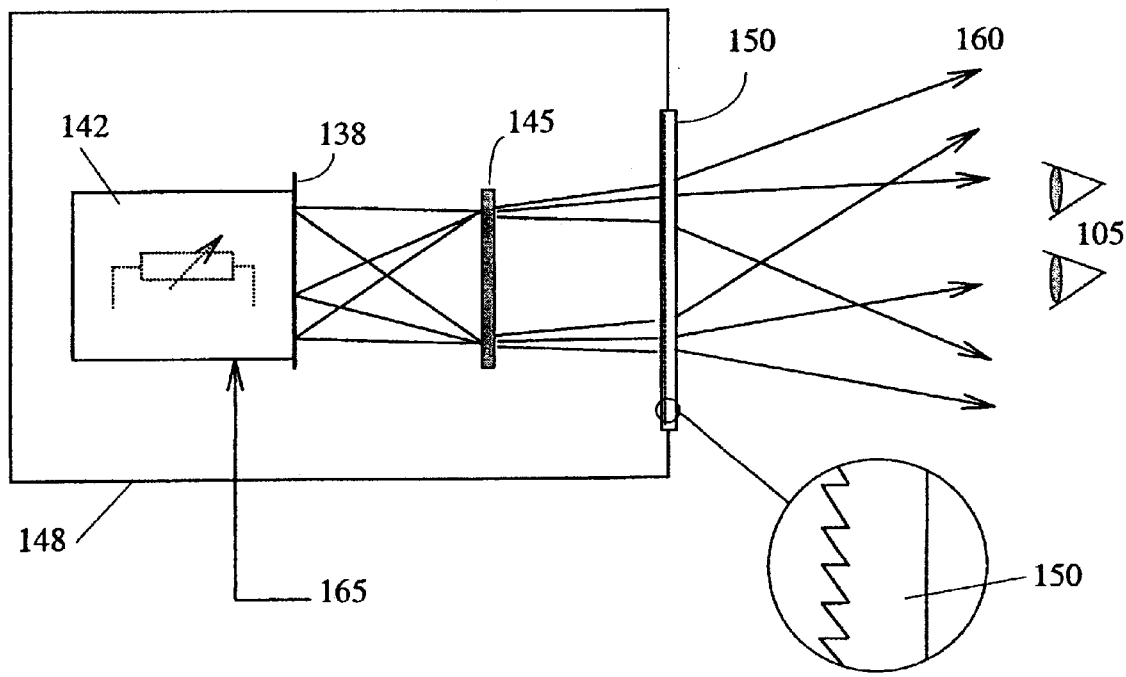

FIG. 47 schematically illustrates a preferred configuration of a holographic display unit according to the present invention.

Figure 48:
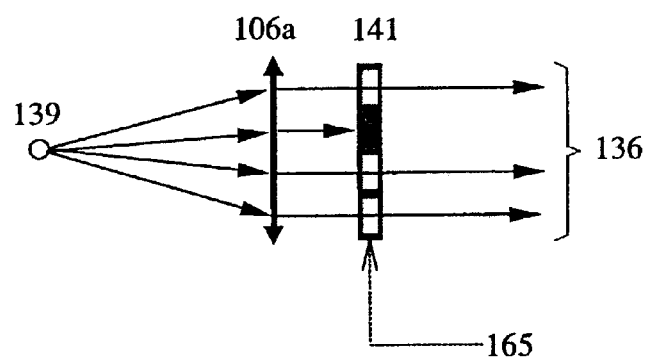

FIG. 48 illustrates a simple configuration of a unit for the formation of an optical digital image.

Figure 49:
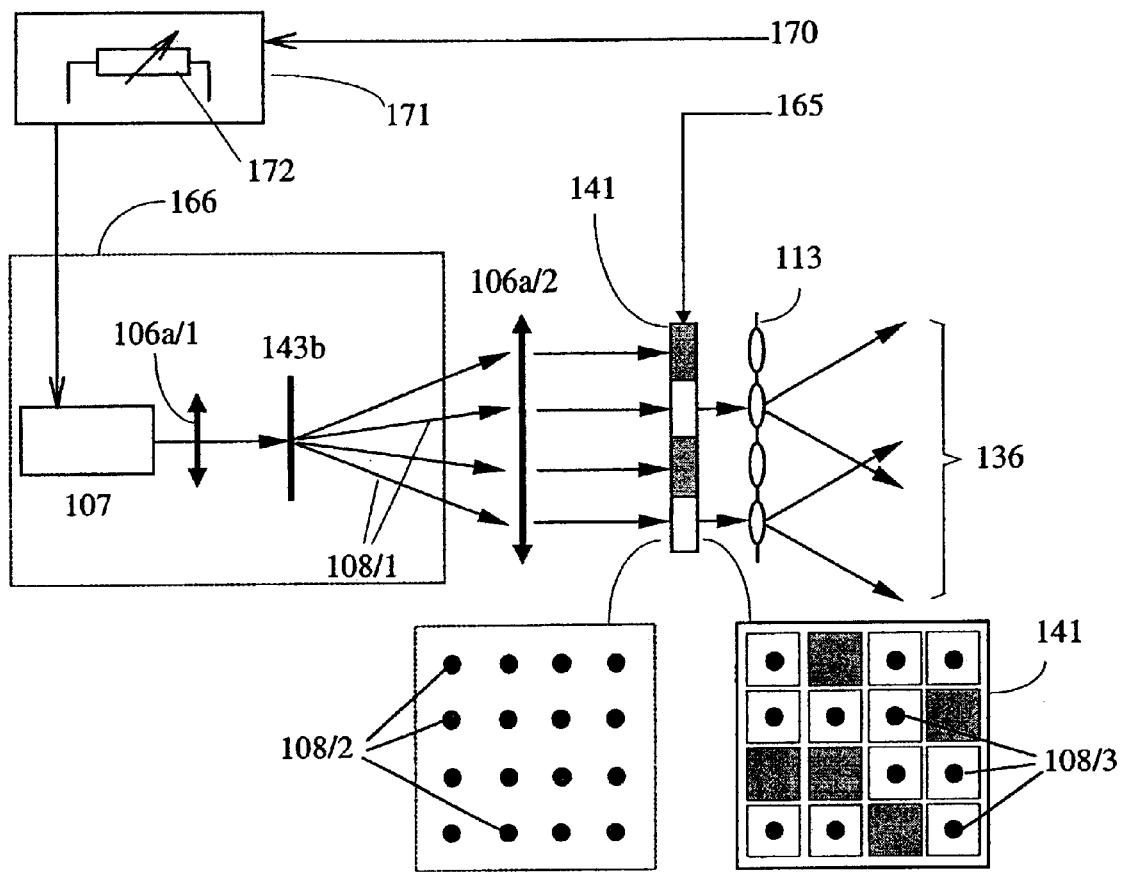

FIG. 49 schematically illustrates a configuration of a unit for the formation of the optical digital image comprising a transparent SLM.

Figure 50:
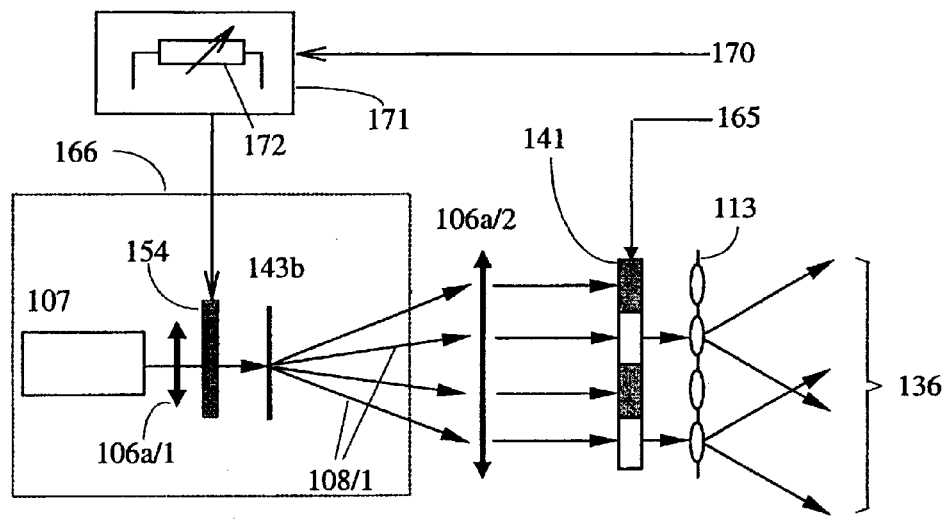

FIG. 50 schematically illustrates a configuration of a unit for the formation of the optical digital image according to the present invention further incorporating a shutter.

Figure 51:
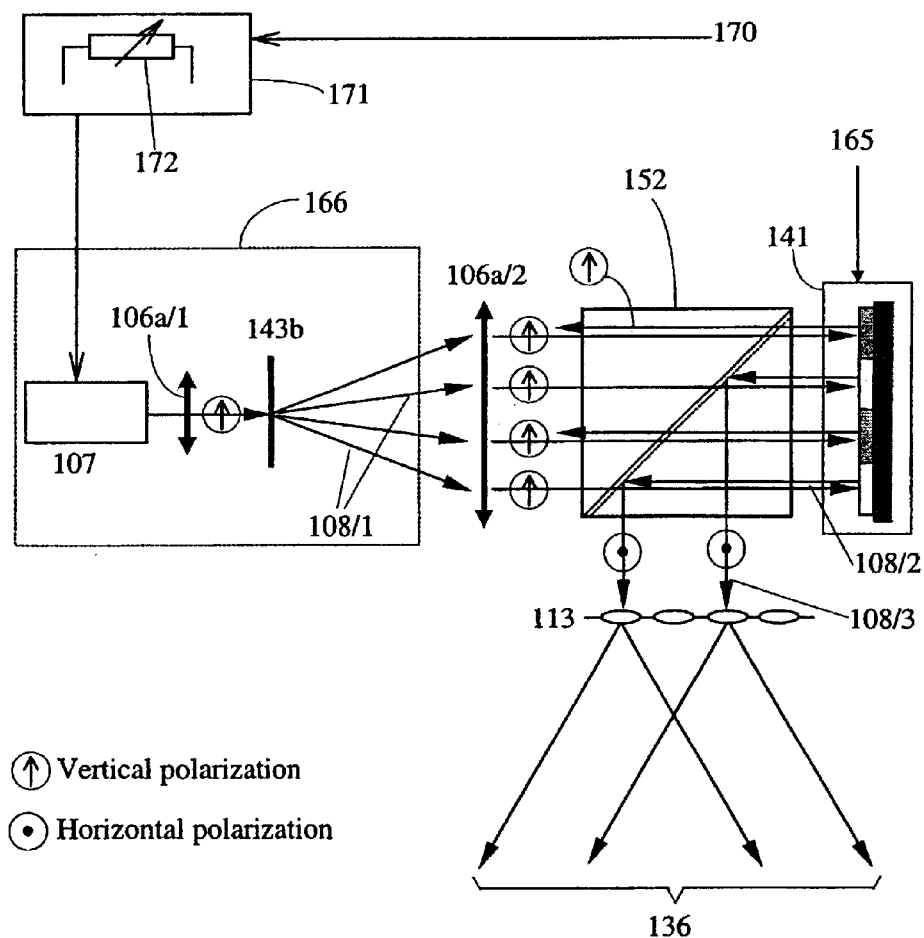
Figure 52:
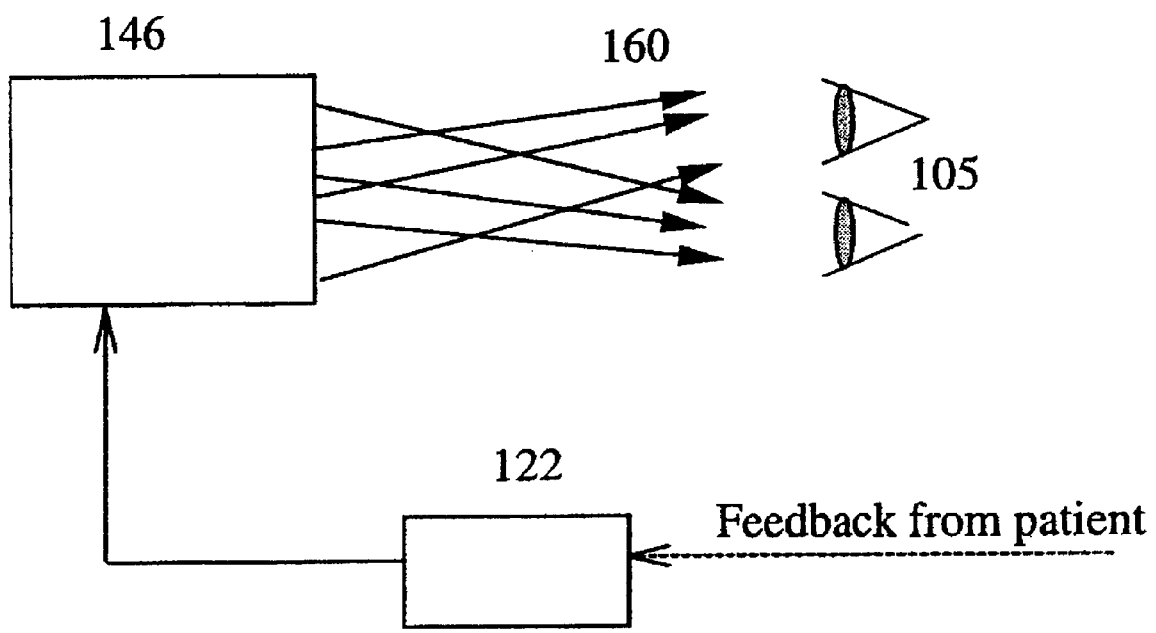

FIG. 51 schematically illustrates a unit for the formation of the optical digital image according to the present invention further comprising a reflecting SLM and a polarization cube. FIG. 52 schematically illustrates a 3-D vision testing system comprising an HDU of the present invention.

FIG. 52 shows a depth perception diagnostic apparatus employing an OE according to the present invention.

Figure 53:
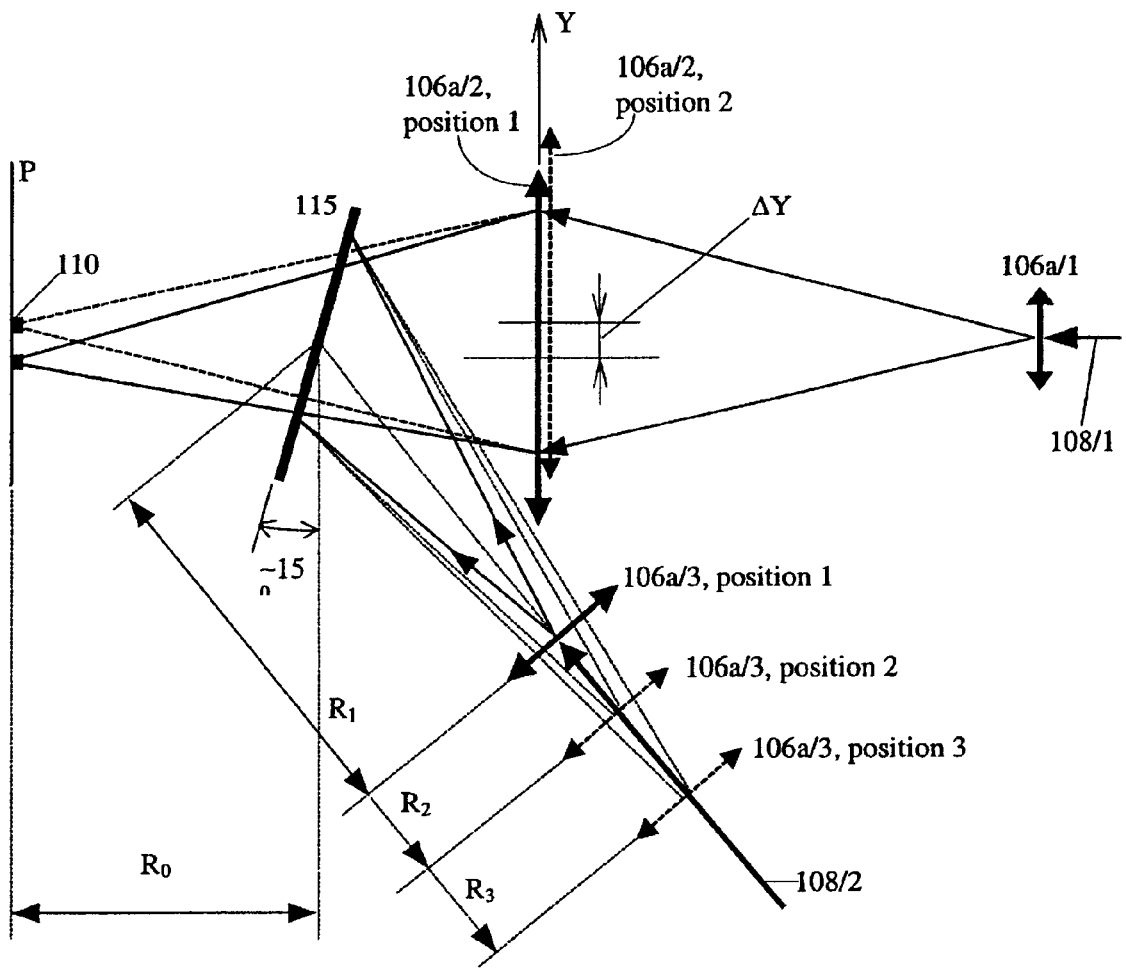

FIG. 53 schematically illustrates the recording of the hologram used as the OE prototype in the first prototype OADC.

Figure 54:
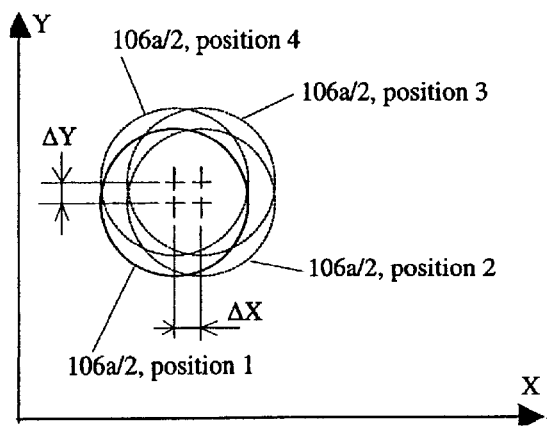

FIG. 54 schematically illustrates shifts of the lens during process of recording of the hologram according to FIG. 53. The lens may be placed at four positions.

Figure 55:
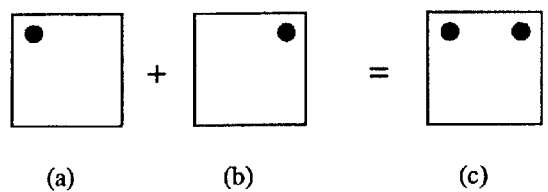

FIG. 55 illustrates the first step of the process of recording the hologram according to FIG. 53. The light spot was imaged in plane P as represented in FIG. 55$a$ at position 1 of the lens according to FIG. 54. The light spot was imaged in plane P as represented in FIG. 55$b$ at position 2 of the lens according to FIG. 54.

Figure 56:
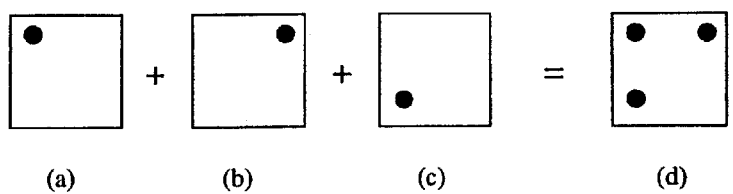

FIG. 56 illustrates the second step of the process of recording the hologram according to FIG. 53. The light spot was imaged in plane P as represented in FIG. 55$a$ at position 1 of the lens according to FIG. 54. The light spot was imaged in plane P as represented in FIG. 55$b$ at position 2 of the lens according to FIG. 54. The light spot was imaged in plane P as represented in FIG. 55$c$ at position 3 of the lens according to FIG. 54.

Figures 57, 58:
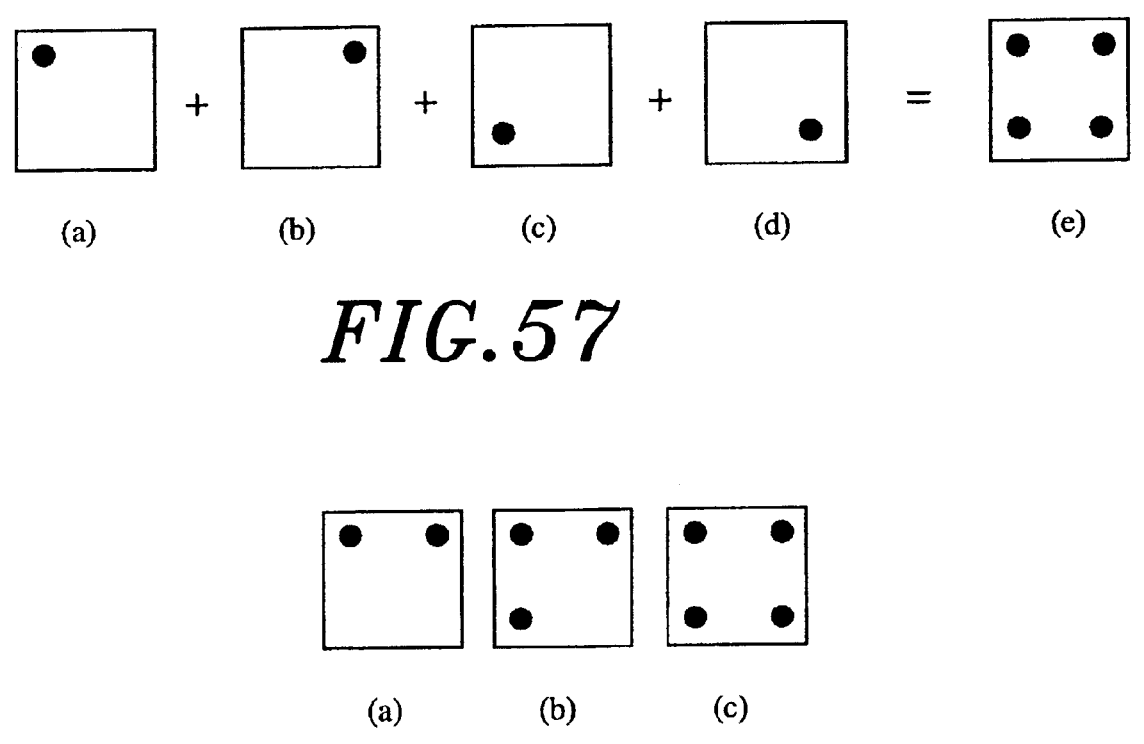

FIG. 57 illustrates the third step of the process of recording the hologram according to FIG. 53. The light spot was imaged in plane P as represented in FIG. 55$a$ at position 1 of the lens according to FIG. 54. The light spot was imaged in plane P as represented in FIG. 55$b$ at position 2 of the lens according to FIG. 54. The light spot was imaged in plane P as represented in FIG. 55$c$ at position 3 of the lens according to FIG. 54. The light spot was imaged in plane P as represented in FIG. 55$d$ at position 4 of the lens according to FIG. 54.

FIG. 58 illustrates the optical digital images (negatives) which resulted from experimental testing of the first OE prototype. The optical digital image shown on FIG. 58$a$ corresponds to position 1 of the lens 106 according to FIG. 14. The optical digital image shown on FIG. 58$b$ corresponds to position 2 of the lens 106 according to FIG. 14. The optical digital image shown on FIG. 58$c$ corresponds to position 3 of the lens 106 according to FIG. 14.

Figure 59:
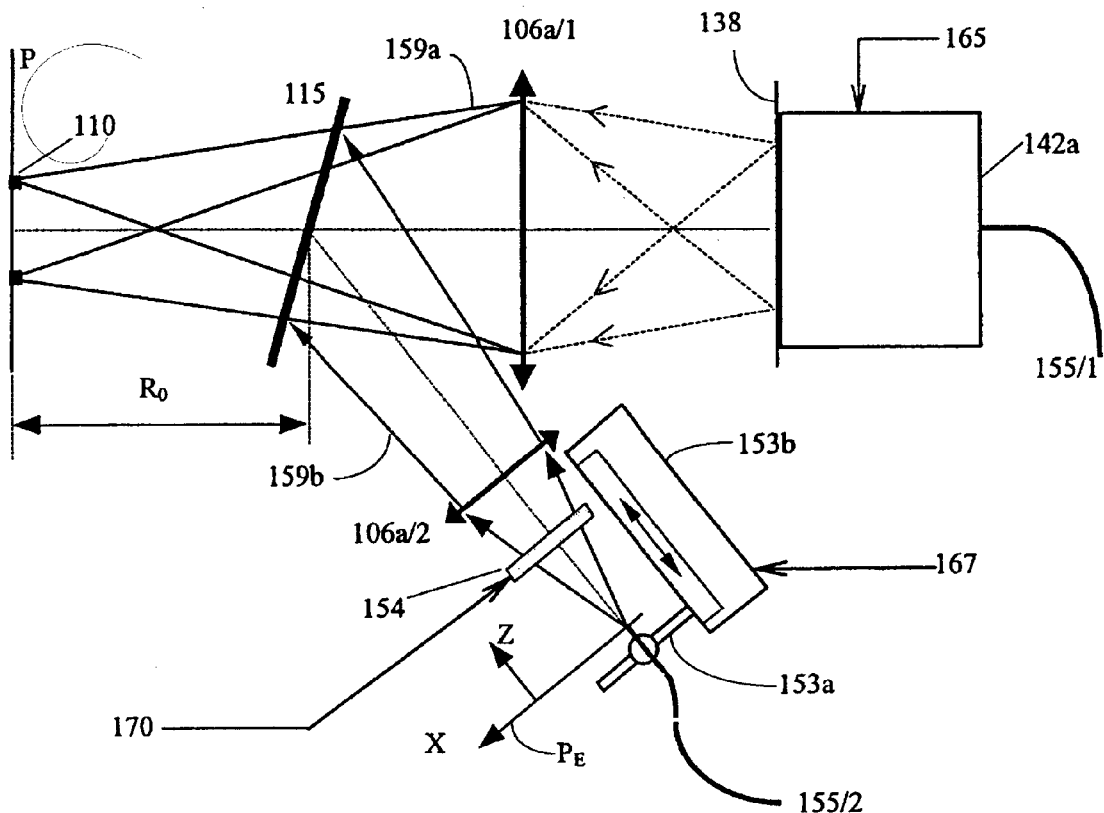

FIG. 59 schematically illustrates a configuration of a device according to the present invention for manufacturing the Optical Element.

Figure 60:
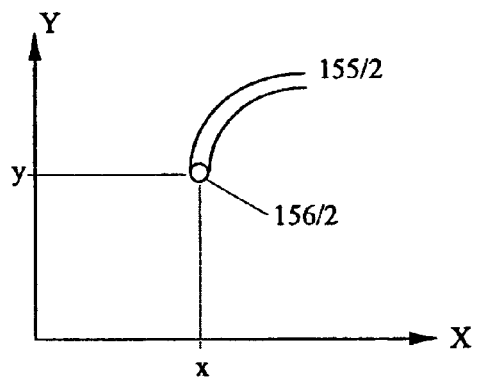

FIG. 60 illustrates the position of the fiber end.

Figure 61:
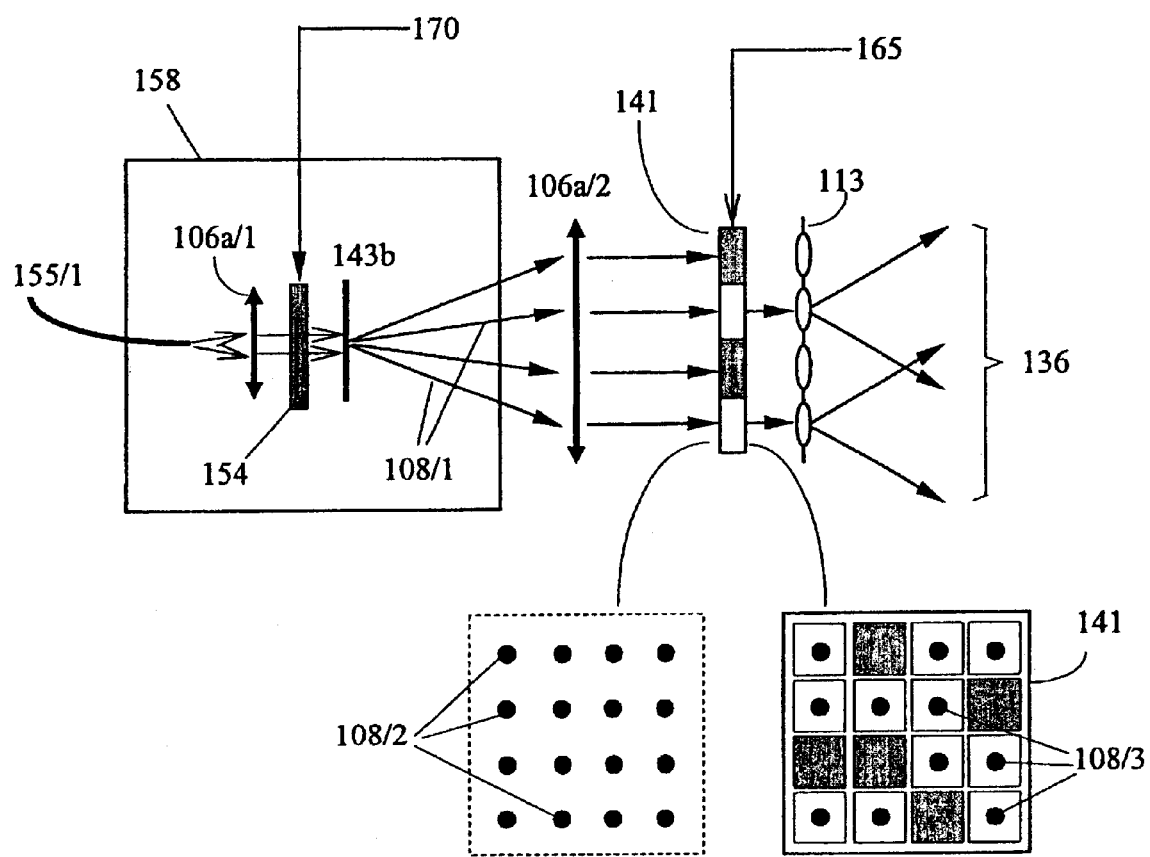

FIG. 61 schematically illustrates a DIFU according to the present invention employing a fiber and a transparent SLM.

Figure 62:
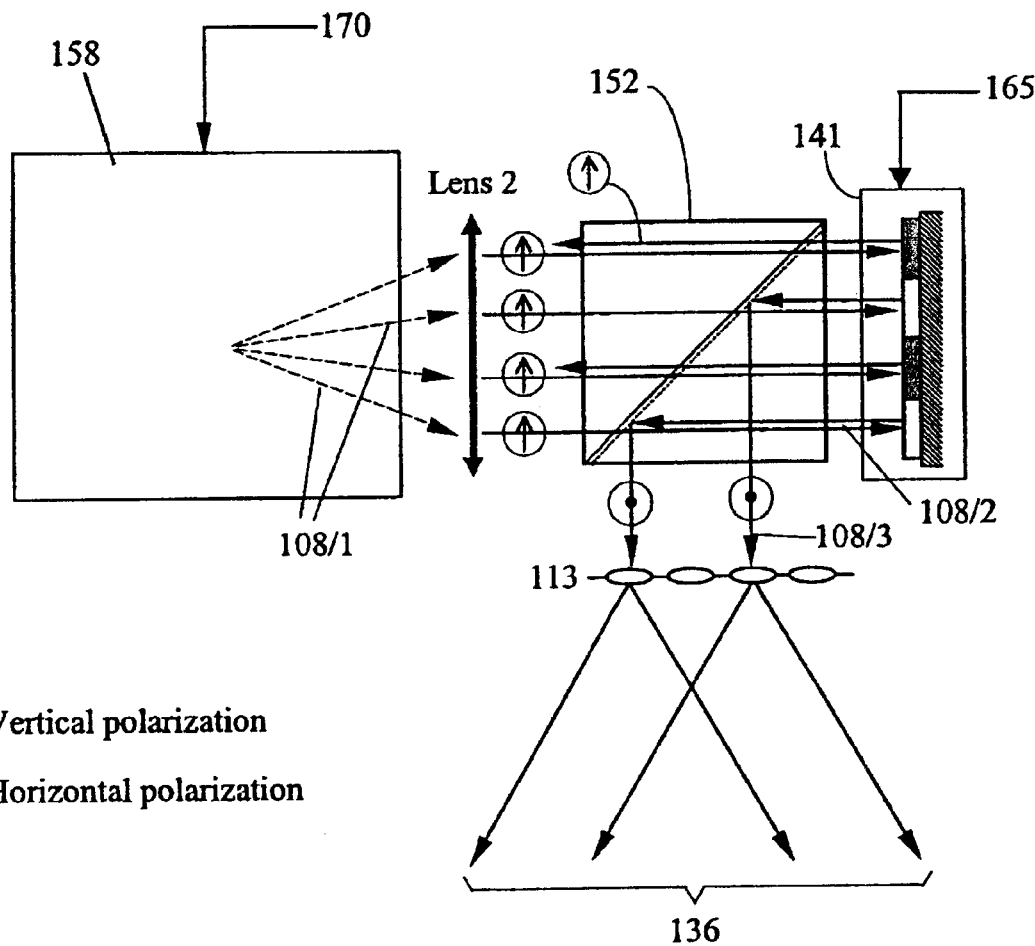

FIG. 62 schematically illustrates DIFU according to the present invention employing a fiber and a reflecting SLM.

Figure 63:
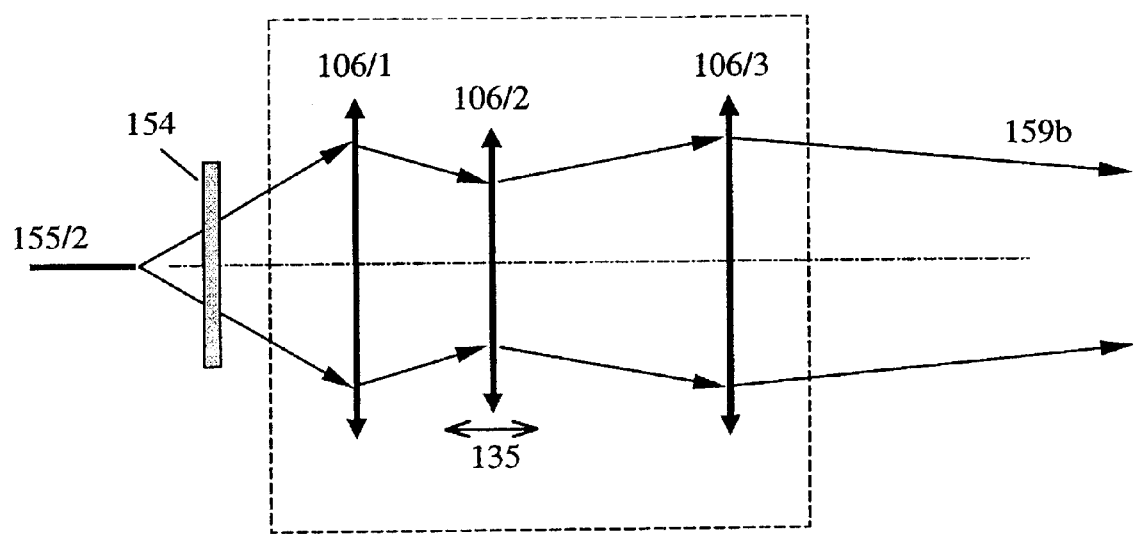

FIG. 63 schematically illustrates an optical system according to the present invention having variable focal length.

4. DETAILED DESCRIPTION OF THE INVENTION

For clarity of disclosure, and not by way of limitation, the detailed description of the invention is divided into the subsections which follow. Alphanumeric identifiers used to identify the; components of invention are used uniformly throughout the drawings. Where initial three-number identifiers are used, they should be construed as inclusive of all alphabetic or numeric subgroups. This, for example, the numeric identifier 101 should be understood as inclusive of 101$a$, 101$b$, 101$c$ and 101$d$.

4.1 Introduction

The present invention relates generally to the transformation of analogue information contained in a light wave front to digital information (OADC) and the conversion of digital information into analogue information (ODAC) embodied in a light have front. The invention provides an optical element ("OE") which can be configured in an OADC to convert to digital information, analogue information contained the radius of the curvature of a light wave front, the direction vector of distribution of the light wave front, or both the radius of curvature and direction vector of distribution of a light wave front. The information is preferably not contained solely in the intensity of the light. Conversely, the OE can be configured in an ODAC and can thereby convert digital light information into analogue information in the form of a light wave front. Furthermore, a single OE can, in appropriate circumstances, operate in a single device as both an OADC and an ODAC.

The function of the coding employed with the OE of the present invention can be either continuous or discrete. Discrete coding is advantageously employed for use in digital electronic applications. In digital applications, the OE can be used in an OADC to transform the input light wave into an optical digital image, which comprises an array of light shapes, or in an ODAC to transform digital information into analogue information contained in the parameters of an output light wave. Depending on the application, each spot of the output code of an OADC can be directed by means such as various lenses known in the art into a series of fiber-optic waveguides, for transmittal to a processing unit, such as a CPU. Further uses of the OE according to the present invention include use in a Range Finder device and use in a Holographic Display Unit (HDU), both of which are described in more detail below.

4.2 Optical Element

The various aspects of the present invention (OADC 144, ODAC 145, Range Finder and Holographic Display Unit 146) all employ a special Optical Element (the "OE") 101, which transforms input light 102 into output light 103 having a unique amplitude-phase structure. When illuminated by a light wave having the appropriate characteristics as described herein, the OE 101 produces a predetermined distribution of output light 103 in the form of light spots 110. The word "spot" is used broadly herein to refer to a discrete area of light of any shape, including, for example, shapes which are generally circular, generally linear, generally square, etc.

Figure 1A:
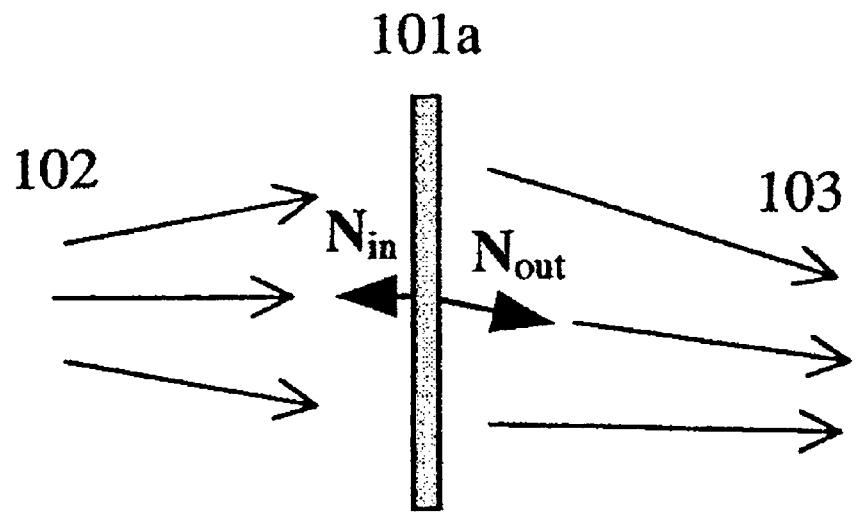
Figure 1B:
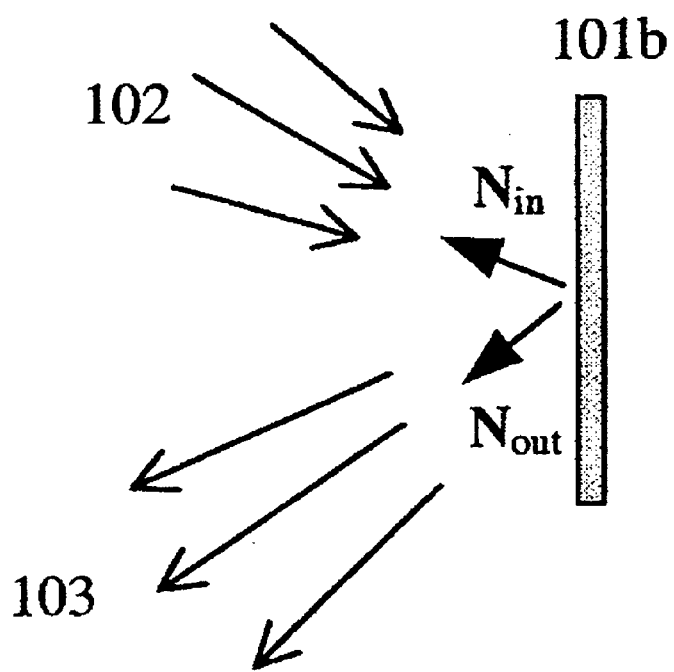

FIG. 1 schematically illustrates how a transparent OE 101$a$ of the present invention (FIG. 1$a$) and a reflected OE 101$b$(FIG. 1$b$) can redirect the vectors of input light 102 into a specific distribution of output light 103. $N_{in}$ represents the basic direction (vector) for input light 102, and $N_{out}$ represents the basic direction (vector) for the output light 103 or the optical digital image.

The OE 101 may be any component with the light distribution characteristics described herein; however, the OE 101 is preferably a hologram, a kinoform or a spatial light modulator. Most preferably, the OE 101 is a kinoform.

The OE 101 can be semitransparent (FIG. 1$a$) or reflecting (FIG. 1$b$). Reference herein to a transparent OE should be understood to refer to a semi-transparent OE. The OE 101 is manufactured such that the OE 101 is capable of transforming a wave front into a series of light shapes, such as spots, points, lines, shapes, etc. corresponding to the radius of the curvature of the wave front, the vector of distribution of the wave front, or both.

For example, a prototype OE described in the examples below transforms an input wave having wave front radius R=1007 mm into three converging waves of equal radius (r=−75 mm), forming three points, in a straight line. Each point corresponds to one binary bit; accordingly, these three points form a binary number 000000111. The distance between the points is preferably substantially identical [for example, $A_x$=10 μ (see FIG. 9a)]. If R=1008 mm, the response will consist of one converging wave that of radius r=−75 mm, focused in a single point, lying in the appropriate place (binary "000001000") on the same line.

An exemplary set of codes light is set forth in the following table:

| Incoming Wavefront | | Response of OE Spot Location |
|---|---|---|
| R (mm) | ΔR = R − $R_0$ (mm) | (code = digital bits) |
| 1001 | 1 | 000000001 |
| 1002 | 2 | 000000010 |
| 1003 | 3 | 000000011 |
| . . . | . . . | . . . |
| 1007 | 7 | 000000111 |
| 1008 | 8 | 000001000 |
| . . . | . . . | . . . |
| 1255 | 255 | 011111111 |
| 1256 | 256 | 100000000 |
| . . . | . . . | . . . |
| 1511 | 511 | 111111111 |

The foregoing table provides an exemplary set of codes which can be produced by an OE of the present invention; however, it will be appreciated by those skilled in the art that the OE of the present invention can be variously constructed as described here to enable the production of a wide variety of one- and two-dimensional code patterns.

The OE is preferably configured such that the wave front radius of the OE response for all converging waves is identical, and that the quantity of waves is equal to quantity of units in a code. The output waves will converge at predetermined points, preferably spaced substantially equally apart.

In the foregoing table it can be seen that a deviation $\Delta R = R - R_0$ of the wave front radius from a constant $R_0$=1000 mm is possible. The target code thus corresponds to binary bits of a number ΔR. It will be appreciated that the OE can be configured to produce a simple code, such as an 8 bit code, or an extremely complex code such as a 2D 100×100 (i.e., 100,000 bit) code.

This example illustrates how the OE transforms a light wave front according to predetermined parameters from analogue to digital information. To perform this operation, the amplitude-phase structure of the OE must have the ability to transform incoming light into a complex three-dimensional distribution of light.

The OE can be constructed using any element which can redirect incoming light according to predetermined properties, i.e., translating the wave front into a specific pattern of light shapes according to the parameters of the wave front, by redirecting the direction $N_{in}$ of incoming light to the direction $N_{out}$ for output light 103 (See FIG. 1a).

As mentioned above, preferred OEs according to the present invention are holograms and kinoforms. Holograms are particularly preferred at the design stage due to their ease of manufacture. Kinoforms (or digital holograms) are preferred in actual operation due to their high quality images. A kinoform is a phase hologram in which only the phase modulation of an object wavefront is recorded as a surface-relief profile. Kinoforms are typically constructed from glass, plastic, quartz, or various metals known in the art.

The OE can be a semi-transparent kinoform or hologram element, i.e., a glass plate, plastic film or other suitable material with an amplitude-phase profile on a surface; alternatively, the OE can be a kinoform or holographic plate with an additional reflecting layer.

4.3 Optical Analogue-to-Digital Converter (OADC)

The present invention also provides an OADC 144 comprising an OE 101. The OE 101 can be configured with other elements, such as a light source and a photodetector 111, to make the OADC 144. The OADC 144 is useful in a variety of applications, including digital computing applications and is also usefully employed in a Range Finder device.

The primary component of the OADC 144 is the OE 101, described in detail in Section 4.2 above. In addition to the OE 101, it is desirable for the OADC 144 to have a light source and a means for observing or recording the output digital light signal. Furthermore, the OADC may have a number of optional elements in addition to the light source and means for observing or recording the output digital signal, most notably including a variety of lenses.

The OE diffracts input light 102 according to the amplitude-phase relief of the OE 101. The diffracted light rays interfere among themselves and form a specific three-dimensional distribution of light. The intensity of the distribution of light in one or more predetermined planes results in a series of light intensity spots (or other images) which can be visually observed or read by a photodetector 111 for processing by a computer processor 122. The intensity distribution of light in the image depends on the parameters of the wave front of the light falling on OE 101. Accordingly, the distribution of the intensity of the light spot 110 changes with the parameters of the light incident on OE 101.

Thus the operation of the OE 101 can be described as spatially decoding the incoming light. Input light 102 is transformed into a three dimensional (3D) distribution of output light 103 (output optical digital image), the parameters of which depend on parameters (e.g., radius and/or direction of the incoming wave front) of the input light 102. The relationship between the input light 102 and the output light 103 is determined by the OE 101.

4.3.1 Light Source

While the ensuing discussion is with respect to the OADC 144, it will be appreciated that the light source requirements are generally the same with respect to the ODAC 145, Range Finder, and Holographic Display 146. Specific differences will be noted in sections 4.4, 4.5 and 4.6.

It is preferable for the OADC to have a light source. While the OADC may usefully employ a variety of light sources, the most preferred light for use with an OADC 144 of the present invention is a coherent light source, such as a laser light source.

The OADC can employ any type of laser, including, for example, light infrared, ultraviolet, and visible. Where the OADC is used to form visual images for human observation, it is necessary to use lasers emitting radiation in the visible spectrum. Where the OADC is used to form an optical digital image to be read by a photodetector, any type of laser may be used; however, practically speaking, the most useful lasers will be those which emit radiation in the near infrared or in the red area of visible light, because the majority of photodetectors have maximum spectral sensitivity in these areas of the spectrum (e.g., about 650 nm to about 1000 nm).

Furthermore, while laser light having any frequency may be used, it will be less expensive to manufacture a kinoform OE with a smaller frequency range, because where a small frequency range is used, achromatization of the kinoform is not necessary.

It will be appreciated that where the OADC 144 of the present invention employs a photodetector 111, it will be necessary to ensure that the level of photonic energy emitted by the laser 107 is coordinated with the power sensitivity of the photodetector 111. Alternatively, where the OADC is used to configure an optical digital image for human observation, the level of photonic energy should be selected to accommodate for the sensitivity of the human eye.

The spectrum of laser light is often confined to a narrow band centered about a certain frequency. The spectral width (or linewidth) is the width $\Delta\lambda$ of the spectral density. See Saleh et al., *Fundamentals of Optics*, p. 351, (1991) (the entire disclosure of which is incorporated herein by reference). In an OADC 144 according to the present invention, the laser light preferably has a linewidth $\Delta\lambda$ which approaches zero ($\Delta\lambda \to 0$), i.e., the minimum linewidth which it is possible to achieve in practice. Linewidths approaching zero provide the highest quality optical digital image.

While it is possible to use laser radiation wherein the linewidth $\Delta\lambda$ is greater than 0, a wide linewidth ($\Delta\lambda > 0$) results in defocusing of the optical digital image, changing of image scale, and/or change of a position of the optical digital image (see FIGS. 7a–d), particularly when using a reflecting OADC.

The consequences of a broader linewidth are most significant in optical computing operations. Where the optical digital image formed by the OADC is intended for human observation, the effects of broader linewidth may not be significant because, as is known in the art, a change of a position and scale of the image of up to approximately 13% typically does not influence the quality of the image—i.e., a human typically cannot detect the resulting geometrical distortions in the letters, figures, etc.

On the other hand, where the optical digital image is read by a multi-element photodetector 111, changes in the size and position of light spots 110 can prevent the light spots from falling within the sensitive area of the photodetector 111, leading to signal distortion.

As noted above, wider linewidths of input laser light can lead to defocusing of the optical digital image. Where the OE is a hologram recorded using a laser light with a wave length $\lambda_1$ and width $\Delta\lambda_1 \approx 0$, the distances from the hologram to the points of a basic beam $d_{ref}$, to object $d_{obj}$, to the illuminating beam $d_{ill}$ and to the restored image $d_{img}$ are related according to the formula:

$$\frac{1}{d_{ref}} - \frac{1}{d_{obj}} = \frac{\lambda}{\lambda_1}\left(\frac{1}{d_{ill}} - \frac{1}{d_{img}}\right)$$

[See: Handbook of Optical Holography. H. J. Caulfield, Academic Press, 1979].

Relative defocusing $\Delta d_{img}/d_{img}$ of the restored optical digital image is determined by the following equation:

$$\frac{\Delta d_{img}}{d_{img}} = \frac{\Delta\lambda}{\lambda}$$

Some deviation is allowable.
For example, if $$\frac{\Delta d_{img}}{d_{img}} = <1\%$$

is acceptable, then a semiconductor laser with a wavelength $\lambda=650$ nm and linewidth $\Delta\lambda \leq 6.5$ nm is permissible within the operation of the OADC 144 of the present invention. On the other hand, where the laser has a wavelength: $\lambda=650$ nm, and $\Delta\lambda > 6.5$ nm, for example, it is preferable to provide a laser having a linewidth $\Delta\lambda$ of approximately 10 nm) and where the condition $$\frac{\Delta d_{img}}{d_{img}} = <1\%$$

is required, then the kinoform should be achromatized to reduce or eliminate chromatic dispersion.

Kinoform achromatization is well known in the art, and is generally performed by increasing the thickness of the relief of the kinoform microstructure. For example, typically the height of the kinoform relief is less than the wavelength of light used to illuminate the kinoform. In contrast, the thickness of the relief of an achromatic kinoform is greater than the wavelength of the light used to illuminate the kinoform (for example, the thickness of the relief is approximately 15–20 micrometers or more for use with visual light). Furthermore, as is well known in the art, the microstructure of an achromatic kinoform is more complex than a standard kinoform.

Alternatively, the suitable parameters of the optical digital image and sizes can be accommodated by adjusting the parameters of the multi-element photodetector 111. The main criterion for selecting a multi-element photodetector 111 for use in an OADC 144 according to the present invention is that the position of each light spot 110 for each bit of the optical digital image should be placed within the sensitive area 109 of the appropriate element of the multi-element photodetector 111, as shown in FIG. 7a.

With regard to the spatial profile of a laser beam, a beam having a transverse electromagnetic mode 00 ($TEM_{00}$) is preferable, since such lasers form high quality optical digital images. However, it will be appreciated by one skilled in the art that it is possible to use laser light with any cross-sectional profile, i.e., with any TEM mode. The TEM mode to be used must simply be considered in the design and manufacture of the OE. In other words, it is preferable for the OE to be manufactured such that the contents of a single digital bit will fall within the sensitive area of the appropriate photodetector element 109. Where all or part of a spot of a digital bit does not fall in the correct photodetector element (e.g., the light bit may fall on an adjacent photodetector element) a faulty code may be produced.

The laser 107 used in the OADC 144 of the present invention can operate in continuous wave (CW) or pulsing mode. A CW laser typically emits a bright, continuous beam of a single, nearly pure color. A pulsed laser typically emits an extremely intense, short flash of light.

Where a pulsing laser is used, the important properties to be taken into account are the photoenergy in each pulse and the frequency of pulses . The energy in each pulse of the laser should be coordinated with the sensitivity of the photodetector reading the optical digital image or with the sensitivity of the human eye where the OADC is configured to produce images for human observation. Further, the frequency of pulses of the laser should be coordinated with frequency of interrogation of the photodetector—such that the photodetector does not interrogate the "blacked out" photodetector between pulses. These considerations are particularly important where the photodetector has very small time of photon accumulation.

The desirable duration of the laser pulse also varies with the application of the OADC. For example, where the OADC is used in a Range Finder (See Section 4.4 below) to measure the distance to a moving object with a speed V, the duration of the pulse T should satisfy the following condition: T<(d/V), where d=resolution of the Range Finder at the distance measurement. Where this condition is satisfied, the interval between pulses should be greater than the time of interrogation and reading of a signal from the photodetector.

The requirements to the laser coherence for a laser used with an OAPC according to the present invention are generally the same as the coherence requirements for a laser used in restoring a typical thin hologram. These requirements are based on the following considerations. The coherence length $\Delta L_H$ should be greater than the maximum difference of a course $\Delta L$ of beams coming from a source to the OE, i.e., $\Delta L_H > \Delta L$. The approximate value of $\Delta L$ is determined by the formula: $\Delta L \approx h \cdot \sin \Theta$, where h=the cross-section of the OE, $\Theta$=the angle of incidence of the laser beam 108 on the OE. For example, see R. Collier et al., Optical Holography, *Academ Press*, 1971 (the entire disclosure of which is incorporated herein by reference).

It is known, for example, that for the He-Ne laser, $\Delta L_H \approx 100$ mm, and for a one-frequency, one-mode semiconductor laser, $\Delta L_H = 10$ mm. Thus, He-Ne lasers, semiconductor lasers and other lasers having similar properties, may be usefully employed with an OE having a cross-section from approximately 10 mm up to approximately 100 mm.

4.3.2 Other Components Including Lenses

While the following discussion focuses on the OADC 144, it will be appreciated by one of skill in the art upon reading this disclosure that a number of optical components, most notably lenses, may be used in conjunction with the OE 101 in the OADC 144, ODAC 145, Range Finder and Holographic Display units 146 of the present invention in order to refine the operation thereof.

A variety of lenses can be usefully employed with an OE according to the present invention in accordance with general optics principles to refine the operation of the OE. Lenses can be used, for example, to reduce the spatial frequency of the phase structure of a kinoform OE, thereby decreasing the cost of manufacturing.

It will be appreciated by one of skill in the art that the OADC can be configured in a variety of ways. For example, the OADC 144 may employ a simple OE 101 [OE], as shown in FIGS. 2a–d (i.e., an OE without accompanying lenses); alternatively, the OE 101 may have one or more lenses 106 placed before the OE 101 [lens+OE] as shown in FIGS. 3a–d; or, the OE 101 may have one or more lenses 106, 107 placed behind the OE 101 [OE+lens] (FIG. 4); moreover, the OE 101 may have lens(es) 106 behind and before the OE 101 [lens+OE+lens] as shown in FIG. 5.

The word "before" or other such similar terms when used to describe the OE or other elements of the present invention refers to the side of the OE from which the light enters the OE. Conversely, the word "behind" or other such similar terms is used to describe the side of the OE from which the light exits the OE. However, it will be appreciated by those skilled in the art that a single lens may be used with a reflecting OE, such that the light enters and exits both sides of the lens (FIGS. 5f–g).

Figure 2A:
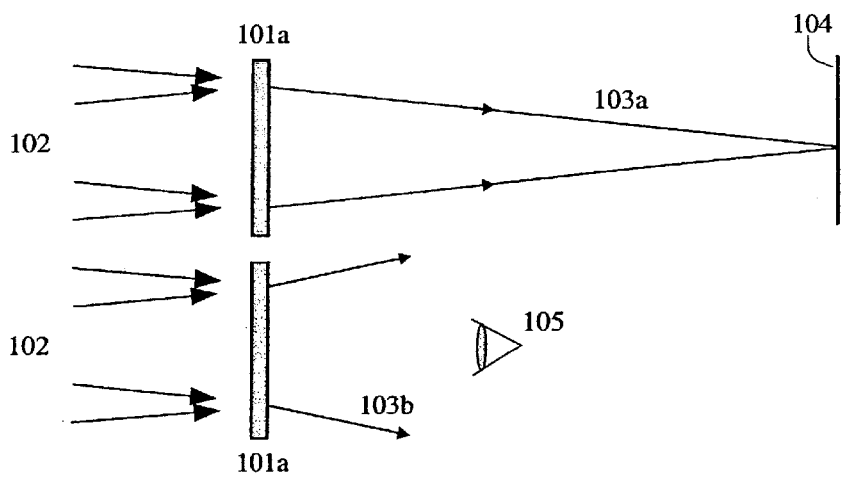
Figure 2B:
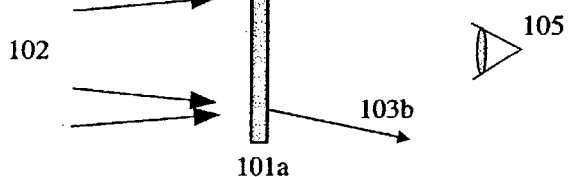
Figure 2C:
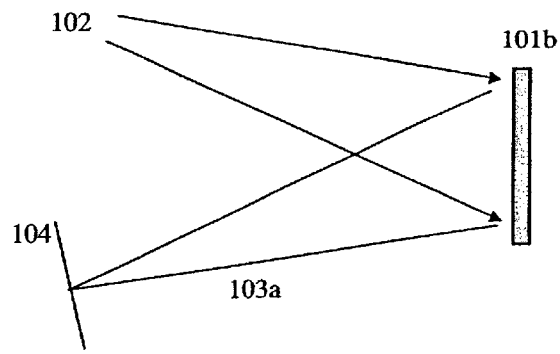
Figure 2D:
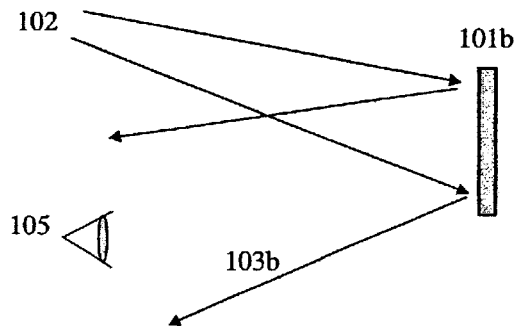

FIG. 2 schematically illustrates a configuration of an OADC 144 according to the present invention using a transparent OE 101a (FIGS. 2a, b) and reflected OE 101b (FIGS. 2c, d). The OADC 144 can be configured to transform incoming light waves 102 into converging output light 103a waves which form an optical digital image in the form of light spots 110, points, lines, etc. (FIGS. 2a and c) on a plane 104, or to form converging waves which form a visually observable virtual optical digital image (FIGS. 2b and d), i.e., an image observable by a human eye 105.

Figure 9A:
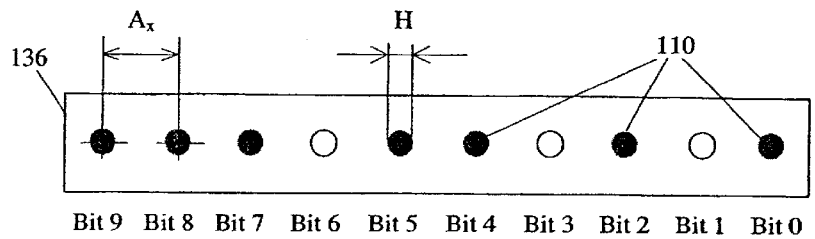
Figure 9B:
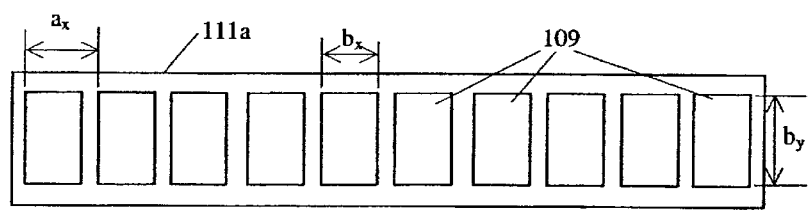
Figure 9C:
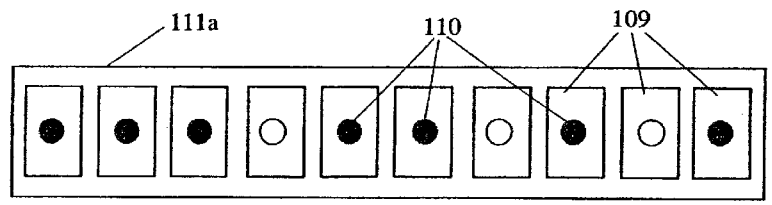

A multi-element photodetector, such as a linear or 2D CCD may be placed in the plane 104 of the optical digital image to read the digital code produced by the OE 101. Each pixel of the CCD corresponds to one bit of the optical digital image (see FIGS. 9a–c).

Where a multi-element photodetector 111 is used, the light spot 110 of any particular light bit must fall within the appropriate pixel area in order to produce the proper electronic signal, i.e., a binary "1" as shown in FIG. 9c. The width of the light spot 110 must therefore be less than the maximum size of the appropriate pixel area (see FIG. 9b). The light spot may have any shape (e.g., circle, square, star, etc.) and it may occupy any position inside the sensitive area 109 of the photodetector 111 element area as shown in FIGS. 9b, and c.

The OADC 144 according to the present invention may also comprise a comparator 125. The comparator 125 is configured such that the result $J_{rec}(t)$ of thresholding does not depend on the exact form and position of the light spot, but on the level of photonic energy delivered to the photodetector 111.

Figure 3A:
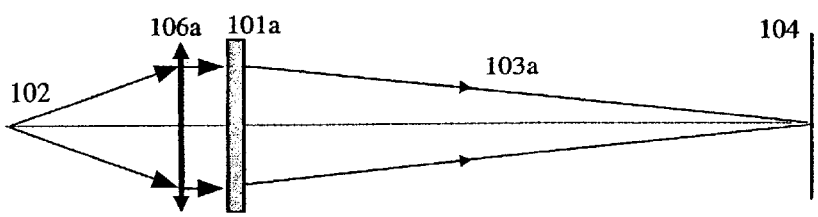
Figure 3B:
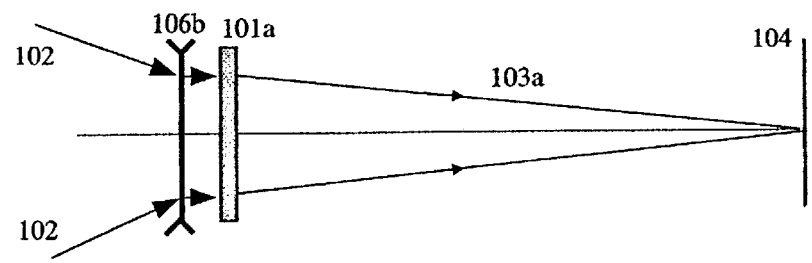
Figure 3C:
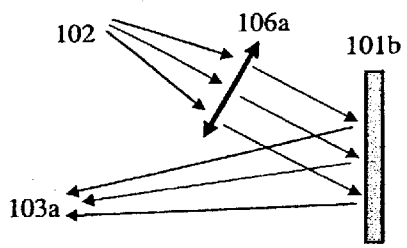
Figure 3D:
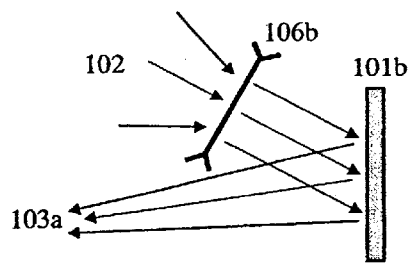
Figure 3E:
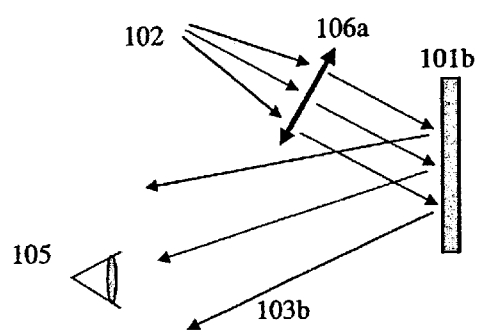

FIG. 3 schematically illustrates a sandwich configuration of the OADC 144 [lens+OE] for a transparent OE 101a (FIGS. 3a and b) and a reflected OE 101b (FIGS. 3c, d and e). The OE 101 can be configured to form converging waves 103a (FIGS. 3a–d), or to form diverging waves 103b which form a visually observable virtual optical digital image (FIG. 3e). It is possible to use a lens 106 with a positive focal length+F (FIGS. 3a, c and e) or a lens 106 with negative focal length $^-$F (FIGS. 3b and d).

Figure 4A:
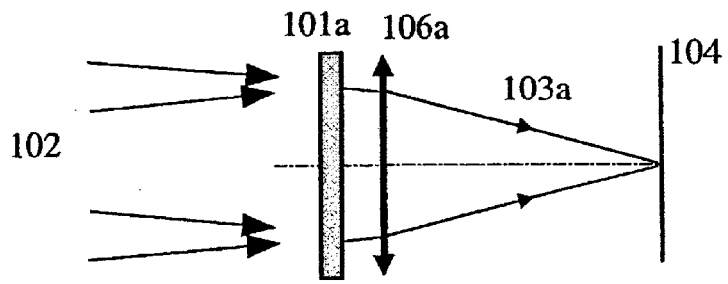
Figure 4B:
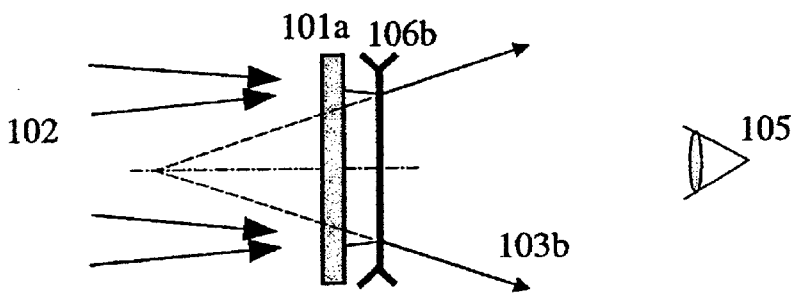
Figure 4C:
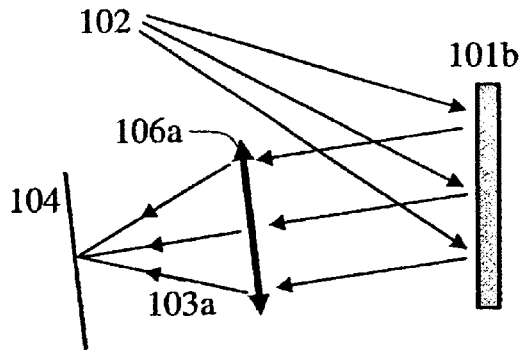
Figure 4D:
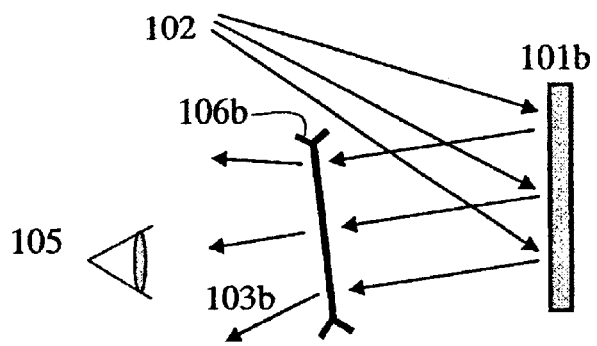

FIG. 4 schematically illustrates a sandwich configuration of an OADC 144 according to the present invention [OE+lens] for a transparent OE 101a (FIGS. 4a and b) and a reflected OE 101b (FIGS. 4c and d). The OADC 144 can be configured to form converging waves 103a which form a real optical digital image (FIGS. 4a and c), or to form diverging waves 103b which form a visually observable virtual optical digital image (FIGS. 4b and d). It is possible to use a lens 106 with a positive focal length $^+$F (FIGS. 4a and c) or a lens 106 with negative focal length $^-$F (FIGS. 4b and d).

FIG. 5 schematically illustrates a sandwich configuration [lens+OE+lens] of an OADC 144 according to the present invention for a transparent OE 101a (FIGS. 5a, b and c) and a reflected OE 101b (FIGS. 5d, e, f, and g). The OADC 144 can be configured to form converging waves 103a to form a real optical digital image (FIGS. 5a, b, d and f) or to form diverging waves 103b which form a visually observable virtual optical digital image (FIGS. 5c, e and g). It is possible to use lens(es) 106 with a positive focal length $^+$F (FIGS. 5a and d), lens(es) 106 with a negative focal length $^-$F (FIG. 5c) or a combination of such lenses (FIGS. 5b and e). Where the OE 101 is a reflected OE, it is also possible to use a unique lens 106 which acts on both on incoming light 102 and on output light 103 (FIGS. 5f and g).

Figure 6A:
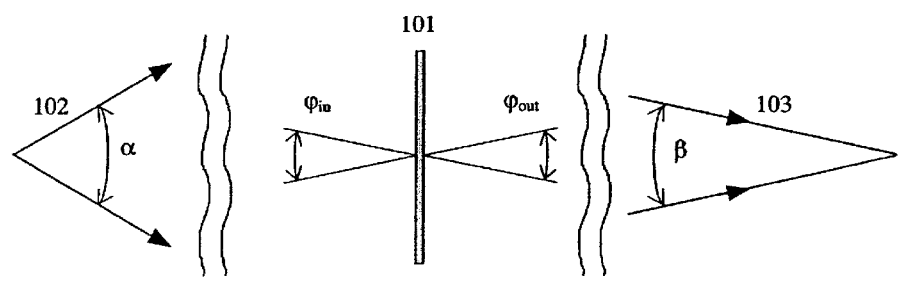
Figure 6B:
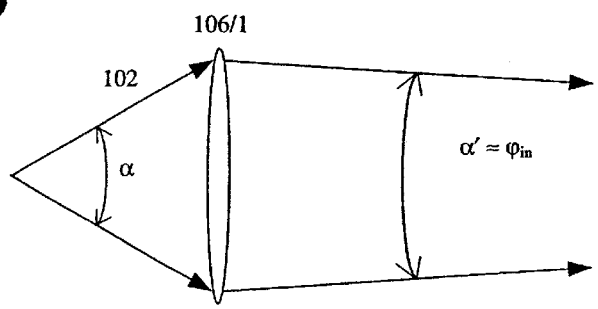
Figure 6C:
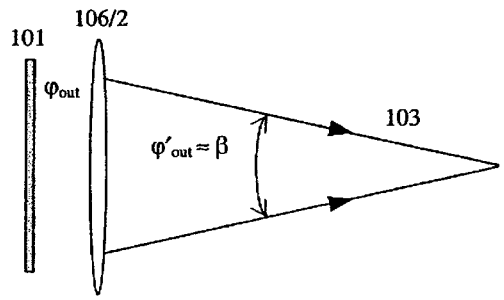

FIG. 6 schematically illustrates the coordination of the angular aperture a of incoming light 102, the incoming aperture $\psi_{in}$ 129a of the OE 101, the output aperture $\psi_{out}$ 129b of the OE 101 and the required angular aperture $\beta$ of the output light 103 (output image) (FIG. 6a). The lens 106/1 established before OE 101 transforms the angular aperture $\alpha$ of incoming light to $\alpha'$ such that $\alpha' \approx \psi_{in}$ (FIG. 6b). The lens 106/2 established behind the OE 101 transforms the angular aperture $\psi_{out}$ of OE 101 output to $\psi'_{out}$ such that $\psi'_{out} \approx \beta$ (FIG. 6c).

A lens 106/1 may be placed before the OE 101 to match the angular aperture $\alpha$ of incoming light 102 and input OE 101 aperture $\psi_{in}$ (see FIG. 6). For example, if the OE 101 has the small input angular aperture $\psi_{in}$ (e.g., the OE works with quasi-parallel beams of light), and the incoming light 102 has a large aperture $\alpha > \psi_{in}$ (i.e., incoming light 102 is caused by a dot source, located a small distance from the OE), a collimating lens 106/1 may be placed before the OE 101.

A lens 106/2 may be placed behind the OE 101 to coordinate the output OE 101 aperture $\psi_{out}$ 129b and required angular aperture $\beta$ of output light 103 (optical digital image). For example, if the OE 101 has the small output angular aperture $\psi_{out}$ 129b (i.e., the OE forms quasi-parallel beams of light), the OADC 144 requires a large aperture $\beta > \psi_{out}$ (for example, to permit placement of the photodetector near the OE), a focusing lens 106/2 is placed behind the OE 101. Alternatively, where the output image is intended for human observation, an eyepiece may be placed behind the OE 101.

4.3.3 Configuration Considerations

The distances between various components (lenses, OE, etc.) are determined according to the laws of classical geometrical optics. (See, Born, et al., Principles of Optics, (1968) (the entire disclosure of which is incorporated herein by reference.).

In a preferred embodiment, the configuration of the OADC 144 is [lens+OE+lens] (FIGS. 5a, b, c) and the distance between all elements is as close as possible to zero (i.e., all elements are located as close to one another as is physically feasible).

In the [lens+OE+lens] configuration, the center of the input light 102 wave front should be placed at a distance from d near to focus $F_1$, (see FIG. 8), and $d_{min} < d < d_{max}$, where:

$$d_{min} = F_i \frac{\tan\frac{\alpha}{2}}{\tan\frac{\alpha}{2} + \tan\frac{\varphi_{in}}{2}}; \quad d_{max} = F_i \frac{\tan\frac{\alpha}{2}}{\tan\frac{\alpha}{2} - \tan\frac{\varphi_{in}}{2}}$$

The plane 104 of the optical digital image is preferably located in the back focal plane ($F_2$) of the second lens 106/2.

Where the OE is an imposed hologram, it is preferable to use a simple OE (i.e., without the accompanying lenses), because holographic plates have high spatial resolution which permits a broad range of input parameters depending on the input and output apertures, light wavelength, etc. These calculations are within the skill of one of ordinary skill in the art.

The OE is preferably a kinoform, and the preferred configuration where the OE is a kinoform is a sandwich, i.e., [lens+OE+lens], or [lens+OE], or [OE+lens] (see FIGS. 3–5). However, the choice between the three configurations depends on the required input and output parameters of the OADC. Where the required input aperture is small (for example, less than 5 degrees), and the output aperture large (for example, more than 40 degrees), the preferred configuration is: [OE+lens]. If the input and output apertures of the OADC are large (for example, more than 40 angle degrees), the preferred configuration is: [lens+OE+lens].

The [lens+OE+lens] configuration permits the use of a large angular aperture. On the other hand, using a kinoform made with the help of a special system (for example, a laser photo-plotter) provides higher spatial resolution, but the kinoform is more expensive. Mass production of a kinoform is less expensive where the kinoform has low resolution.

4.3.4 Means for Reading the Digital Signal

The OADC 144 of the present invention preferably includes an optical detector to read the digital signal. The digital signal may be read by any means known in the art capable of detecting photonic energy, such as a photon detector or a thermal detector. Photon detectors rely on the action of quanta of light energy to interact with electrons in the detector material and generate free electrons. See Ready, Industrial Applications of Lasers (1997) (the entire text of which is incorporated herein by reference). To produce this effect, it is necessary for the quantum of light to have sufficient energy to free an electron. Thermal detectors respond to the heat energy delivered by the light. Id. The response of these detectors typically involves a temperature-dependent effect, like a change of electrical resistance. Id. Since thermal detectors rely on the amount of heat energy delivered, their response is independent of wave length. Id. Typical photodetectors include photodiodes, photoemissive detectors, and photoconductive detectors. See Ready, *Industrial Applications of Lasers*, pp. 155–161 (1997). Alternatively, the signal may simply be visually observed by a human observer. In a preferred embodiment, the signal may be read by a 2D or 3D multi-element photodetector, such as a charge coupled device (CCD) or a photodiode array.

Figure 9D:
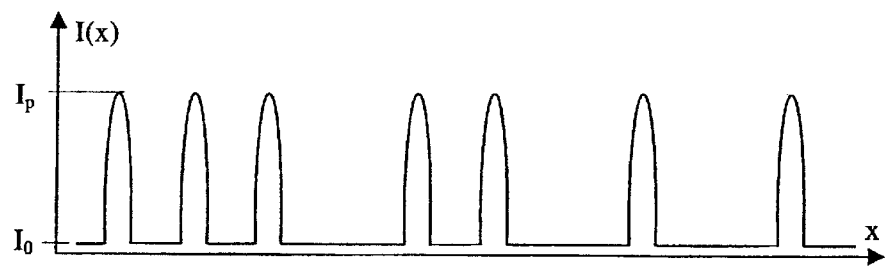
Figure 9E:
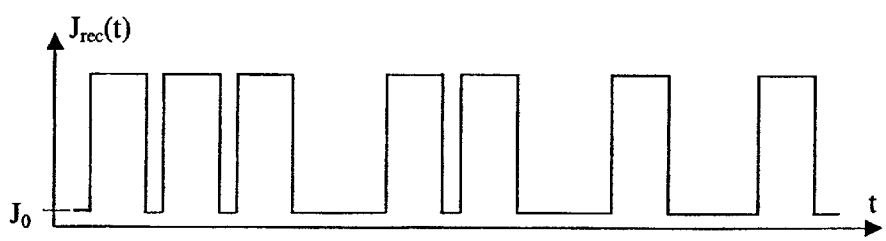
Figure 10A:
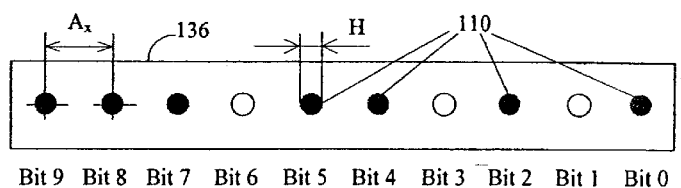
Figure 10B:
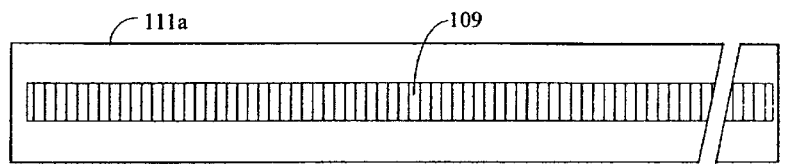
Figure 10C:
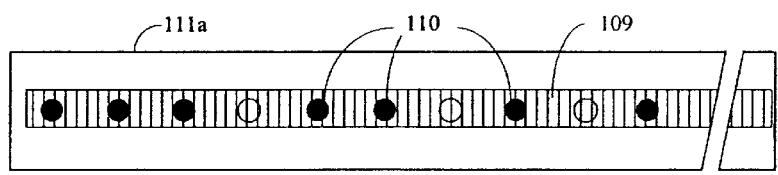
Figure 10D:
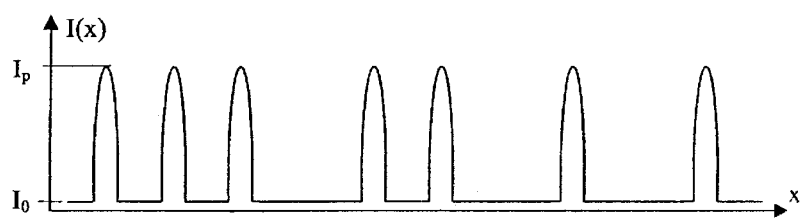
Figure 10E:
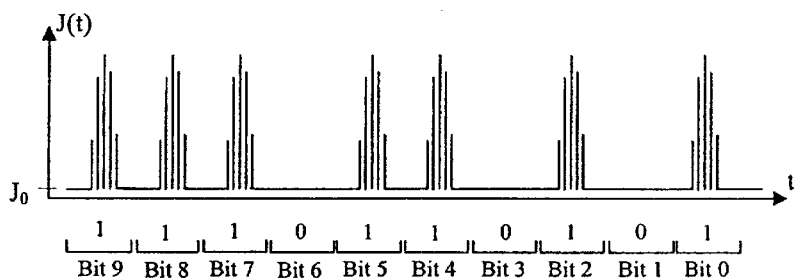

The choice of the multi-element photodetector depends on the parameters of the system. The basic parameters of the optical digital image, which influence the choice multi-element photodetector are as follows:

1D or 2D image;

number of bits N (or N×M)=the maximum number of the light spots 110 in the optical digital image (see FIG. 9a);

distance (center to center) between the light spots $A_x$ (or $A_x$, $A_y$) (see FIG. 9a);

diameter H of each light spot 110 (see FIG. 9a);

intensity of each light spot $I_p$;

level of optical noise (level of "black") $I_0$ (FIG. 9d), and wavelength of the optical digital image $\lambda_0$.

The basic parameters of the multi-element photodetector (common parameters for CCD and photodiode receivers) are as follows:

1D or 2 D (linear or matrix);

a number of pixels n (or n×m);

pixel distance $a_x$ ($a_x$, $a_y$);

sensor area $b_x \times b_y$;

spectral sensitivity $S(\lambda)$; and minimum sensitivity $S_0$.

The values of the parameters selected from the above list depend on the intended use of the OADC. For example, the following parameters are useful for a one-dimensional output optical digital image:

1D (light spots are located in a line);

number of bits is N=10;

distance (center to center) between light spots is $A_x=13\mu$;

diameter of light spots is $H=6\mu$;

wavelength is $\lambda_0=630$ nm;

intensity of light in a spot is $I_p$;

level of optical noise is $I_0$.

Suitable parameters for use with a photon detector, such as a multi-element photodetector are as follows (see FIG. 9):

1D (linear);

number of pixels is $n \geq N=10$;

pixel distance is $a_x=A_x=13\mu$;

sensor area is $b_x > H=6\mu$, $b_y > H=6\mu$;

spectral sensitivity is $S(\lambda_0) \geq I_p$;

minimum sensitivity is $S_0 \approx I_0$.

Another example of 1-dimensional output optical digital image:

1D (light spots are located in a line);
number of bits is N=10;
distance between light spots is $A_x=130\mu$;
diameter of each light spot is $H=50\mu$;
wavelength is $\lambda_0=630$ nm;
intensity of light in a spot is $I_p$;
level of optical noise is $I_0$;

A multi-element photodetector suitable for reading such a digital image would preferably have the following properties:

1D (linear);
number of pixels is $n \geq N=10$;
pixel distance is $a_x=A_x=130\mu$;
sensor area are $b_x>50\mu$, $b_y>50\mu$;
spectral sensitivity is $S(\lambda_0) \geq I_p$; and
minimum sensitivity is $S_0 \approx I_0$.

Figure 11A:
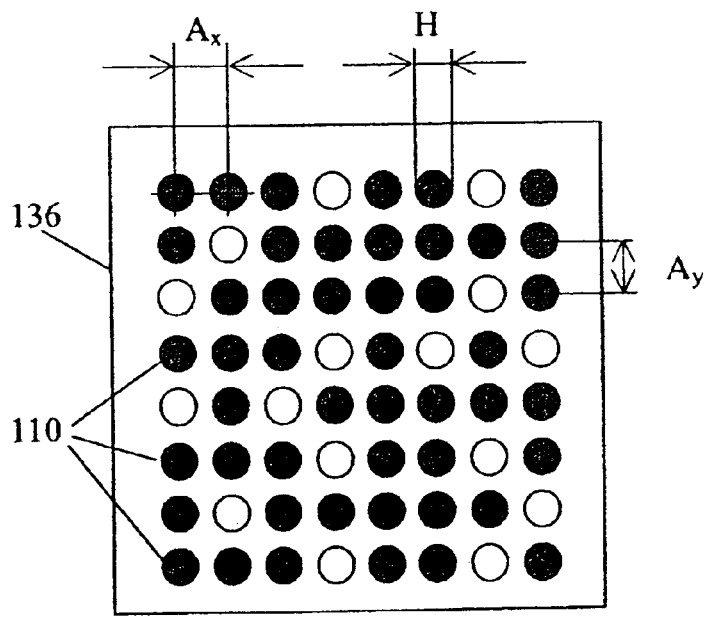

It is possible to use the Linear CCD TH7806A or CL-E2-0512 provided that the OADC is configured such that each light spot strikes its corresponding pixel of the photodetector 111, as it is illustrated in FIG. 10. Where the TH7806A is used, one light spot 110 of the optical digital image will be read out at once by several pixels of the linear CCD, as shown in FIG. 10c. In one configuration, only 100 pixels from the entire set of 256 pixels are necessary for reading the optical digital image.

Where a two dimensional (2D) digital image is desired, the following parameters may be used (FIG. 11a):

2D (light spots are located into units of a grid);
number of bits are N=8, M=8;
distance between light spots are $A_x=16\lambda$, $A_y=16\mu$;
diameter of light spot is $H=8\mu$;
length of light wave is $\lambda_0=630$ nm;
intensity of light in spot is $I_p$; and
level of optical noise is $I_0$.

Figure 11B:
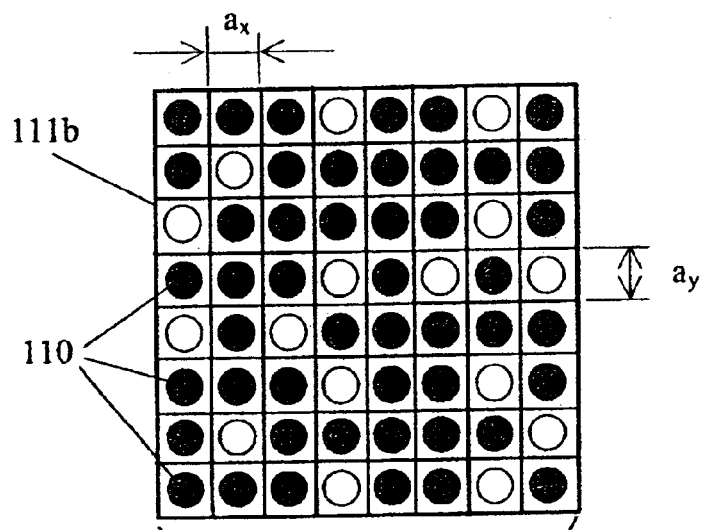
Figure 11C:
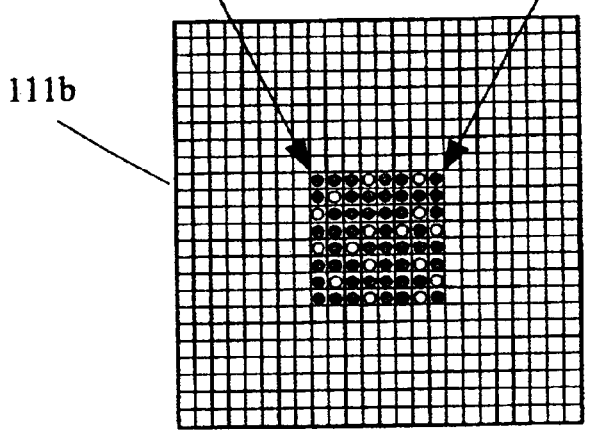

Furthermore, a matrix photodetector for operation according to the present invention can have the following suitable parameters for producing the specified optical digital image (see FIG. 11):

2D (matrix);
numbers of pixels are $n \geq N=8$, $m \geq N=8$;
pixel distances are $a_x=A=16\mu$, $a_y=A_y=16\mu$;
sensor area is $b_x \times b_y$: $b_x>8\mu$, $b_y>8\mu$;
spectral sensitivity is $S(\lambda_0) \geq I_p$; and
minimum sensitivity is $S_0 \approx I_0$.

Preferred two dimensional (2D) CCD cameras are CA-D1-0032 and CA-D1-0128 manufactured by Dalsa Inc.:

CA-D1-0032 (old model): 32×32 pixels, 16×16$\mu$ only 1/16 of photosensitive area is required (see FIG. 11c); and CA-D1-0128 (new model): 128×128 pixels, 16×16$\mu$ only 1/256 of the photosensitive area is required.

The following are examples of multi-element photodetector types that can be used with an OADC of the present invention and the conditions under which each would be selected:

| 1D or 2D (linear or matrix) | Number of Pixels n (or n × m) | Pixel distance $a_x$ ($a_x$, $a_y$) | Sensor area $b_x \times b_y$ | Spectral Sensitivity $S(\lambda)$ | Minimum sensitivity $S_o$ |
|---|---|---|---|---|---|
| 1D (linear) | n ≥ N = 10 | $a_x = A_x = 13\mu$ | $b_x > H = 6\mu$, $b_y > H = 6\mu$ | $S(\lambda_o) \geq I_p$ | $S_o \approx I_o$ |
| Linear CCD TH7806A[1] | 256 | 13 × 13 $\mu$ (i.e. $a_x = 13\mu$) | About 10 × 10 $\mu$ (i.e. $b_x = b_y \approx 10\mu$) | | |
| CL-E2-0512[2] | 512 | 13 × 13 $\mu$ (i.e. $a_x = 13\mu$) | 10 × 10 $\mu$ (i.e. $b_x = b_y = 10\mu$) | | |
| 1D (linear) | n ≥ N = 10 | $A_x = 130\mu$ | $B_x > 50\mu$, $b_y > 50\mu$ | $S(\lambda_o) \geq I_p$ | $S_o \approx I_o$ |
| Two dimensional (2D) (matrix) | n ≥ N = 8, m ≥ N = 8 | $a_x = A_x = 16\mu$, $a_y = A_y = 16\mu$ | $b_x > 8\mu$, $b_y > 8\mu$ | $S(\lambda_o) \geq I_p$ | $S_o \approx I_o$ |

4.3.5 Comparator

A comparator is a circuit designed to detect correlation or disagreement between the signal from the photodetector and a predetermined threshold level. Where a comparator is employed with an OADC of the present invention, its purpose is to distinguish between true and false signals. Where the photodetector signal exceeds a predetermined threshold, it is read as a true signal, i.e., a digital "1." Where a signal does not exceed a predetermined threshold level, it is read as a false signal like logical "zero" (i.e., as no signal).

The output from the Comparator is electrical binary signals, signifying "ones" and "zeros." This output can then be transmitted by a variety of means known in the art to a computer processor for additional downstream processing.

Comparator circuits are used in the present invention to detect a voltage referred to as a reference potential. When the voltage to be detected exceeds a predetermined value (the threshold value), a signal indicating the satisfaction of the threshold value is output from the comparator. Conversely, if the input voltage of the comparator fails to attain the threshold value, the comparator outputs a different output signal, so that the failure to attain the threshold value is unambiguously signaled at the output of the comparator. The comparator is coupled to a circuit and can be integrated with the circuit into a single comparator/circuit device as taught in U.S. Pat. No. 5,834,954 (the entire disclosure of which is incorporated herein by reference). The comparator can also be employed with an amplifier as taught in U.S. Pat. No. 5,821,780 (the entire disclosure of which is incorporated herein by reference).

Furthermore, the present invention may also employ an integrator circuit as described in U.S. Pat. No. 5,773,816 (the entire disclosure of which is incorporated herein by reference). The integrator circuit provided in the '816 patent is coupled to a photodetector, such as a photodiode, which produces photocurrent responsive to incident illumination. The photodetector is coupled to an integrator stage which converts the photocurrent into voltage and integrates the voltage over an integration period to provide an output signal. A window comparator in the circuit receives the output signal from the integrator stage and compares the output signal to a first threshold and a second threshold to provide, as a measurement signal, a pulse having a width which corresponds to the time interval over which the output signal increases from the first threshold to the second threshold. In the window comparator, the second threshold is greater than the first threshold. The integrator stage has two inputs coupled across the photodetector which are biased by a bias voltage below the first threshold, and a switch, preferably a mechanical relay, coupled to the integrator stage which when enabled resets the integrator stage to provide its output signal substantially equaling the bias voltage. A programmed microcontroller may also be provided for controlling the switch to reset the integrator stage, determining the time interval corresponding to the width of the pulse, and measuring the photocurrent produced by the photodetector responsive to the determined time interval.

The circuit is coupled to a photodetector which produces a photocurrent responsive to incident illumination. The photodetector is coupled to an integrator stage which converts the photocurrent into voltage and integrates the voltage over an integration period to provide an output signal. A window comparator in the circuit receives the output signal from the integrator stage and compares the output signal to a first threshold and a second threshold to provide, as a measurement signal, a pulse having a width which corresponds to the time interval over which the output signal increases from the first threshold to the second threshold. In the window comparator, the second threshold is greater than the first threshold.

The integrator stage may further have two inputs coupled across the photodetector which are biased by a bias voltage below the first threshold, and a switch, preferably a mechanical relay, coupled to the integrator stage which when enabled resets the integrator stage to provide its output signal substantially equalling the bias voltage. A programmed microcontroller, for example, provides means for controlling the switch to reset the integrator stage, determining the time interval corresponding to the width of the pulse providing the measurement signal, and measuring the photocurrent produced by the photodetector responsive to: the capacitance of an integrating capacitor in the integrator stage; the difference between the second and first thresholds; and the reciprocal of the determined time interval.

4.4 Range Finder

The above-described OADC can be employed as a "Range finder" device for measuring the distance to an object and providing a direct readout of the distance. The measurement is based on dynamic coding of the curvature radius of a wave front of a light wave from the object. The value of the distance from the Range Finder to the object can be formed as a symbolic image or as an optical digital image. The content of the optical digital image depends on the size of the radius of curvature of wave front of a light wave coming from the object.

It is known in the art that the radius of wave front is proportional to the distance to a dot source of light. In a Range Finder according to the present invention a laser beam 108 is "focused" on a surface of object 118 and the resulting light spot 110 provides a "source of light" for the OADC of the Range finder. The size of this "source of light" is very small in comparison with the distance from a source to the Range Finder. Therefore it is possible to assume that the light spot is a "dot" source of light for most practical uses of the Range Finder.

The OE 101 of the Range Finder can be configured to form a symbolical image of luminous figures and letters designating distance in a determined system of units (for example, in centimeters, inches, etc.).

Alternatively, the Range Finder may configure an optical digital image in the form of a set of light spots, points, lines, etc., for example, each light spot may correspond to a determined binary bit of distance. The optical digital image can then be read by a photodetector, such as a multi-element photodetector, and may be transmitted from the multi-element photodetector to a computer processor for further processing.

Range Finders according to the present invention may be configured to measure microdistances, such as micrometers, as well as macrodistances, such as thousands of kilometers. The microdistances which can be measured by a Range Finder according to the present invention are limited by the size of the OE 101 and by the wavelength of light employed by the Range Finder. As a general rule, the cross-section size (h) of the OE 101 must be less than $L_{min}$ (i.e. $h<L_{min}$) (where $L_{min}$ is the minimum measured distance) and h or $L_{min}$ cannot be micrometers where the laser light is in the visual light range. However, even where visual light is used, the difference between two measured distances $L_i$ and $L_j$ ($\Delta L = L_i - L_j = d_i - d_j$) may be as small as micrometers. In other words, the resolution of a Range Finder according to the present invention using light in the visual wavelength range may be as small as micrometers.

All currently practiced optical methods for measuring distance use indirect transformation of distance to the digital form. For example, the laser triangulation method requires consecutive performance of several operations: (1) illumination of the object by a laser beam; (2) formation of the image (with the help of a lens) light spot using scattered light from the object); (3) reading the light spot by the photodetector (4) processing a signal of the photodetector: (amplification, digitizing or comparation, etc.); (5) calculation of the coordinates of the light spot on the photodetector; and, (6) calculation of the distance to the object.

In contrast, the present invention permits an accurate determination of distance using a smaller number of operations: (1) illumination of the object 118 by a laser beam 108; (2) formation of the optical digital image by the OADC 144 (using scattered light 117 from the object 118 ); (3) reading the optical digital image by the photodetector 111; and, (4) processing the signal of the photodetector 111 (amplification and comparison). The result is an electrical digital signal which is determined by the distance from the Range Finder to the object 118. Accordingly, the laser Range Finder according to the present invention provides a simpler apparatus for determining distances, and is usefully employed in operations such as automatic focusing mechanisms in cameras.

Furthermore, the laser triangulation method of distance measurement employs a multi-element photodetector (or position-sensitive photodetector). The number of elements of the photodetector must be equal (or directly proportional) to number of resolution positions of the distance. In other words, if the number of resolution positions is 1024, it is necessary to use a multi-element photodetector with a number elements N=kn, where k=factor (if k=1, then N=1024).

In contrast a Range Finder based on an the OADC 144 according to the present invention permits use of a multielement photodetector 111 with a comparatively smaller number elements $N=\log_2 n$ (if n=1024, then $N=\log_2 1024=10$). Thus, the Range Finder according to the present invention, can be smaller than a standard triangulation range finder, an attribute which is useful in the configuration of small instruments such as hand held cameras.

The OE 101 and OADC 144 employed in a Range Finder of the present invention are described respectively in Sections 4.2 and 4.3 above.

A Range Finder of the present invention can be used as an "optical tape-measure" for surveying large distances (tens of meters) with an instrument having a size which can easily be held in one hand for simple measurements; for example, for measurement distance from the Range Finder to a wall or to a ceiling. Use of such a device will be similar to the use of a standard pointer. As noted above, existing devices, such as triangulation type devices, must be much larger, since the triangulation method requires a separation between the light source and the photodetector of at least a few cm.

Furthermore, it is possible to incorporate the basic design of Range Finder into a more complex device for topographical measurement of three dimensional (3D) objects as described below in Section 4.4.4.

4.4.1 Light Source

The Range Finder according to the present invention may use a wide variety of light sources and, in addition to the immediately following considerations, the light source is generally selected using the considerations described in Section 4.3.1 herein.

The frequency range for the laser light used by the Range Finder depends on the application for which Range Finder is employed. For example, in some circumstances it will be desirable for the light spot on the object surface to be visible to the human eye. In such circumstances, desirable frequencies range from about 650 nm to about 690 nm. If maximum sensitivity is required, the frequency range for laser light should be equal to frequency range of maximum spectral sensitivity for the photodetector.

The Range Finder according to the present invention may also employ a broad range of photon energy levels. Practically speaking, the level of photon energy should not be large enough to damage the surface of the object. Furthermore, the level of photon energy of the laser should be adjusted to account for power losses of light between the laser and the object and back to the OADC, for power efficiency (diffractive efficiency) and, power sensitivity of the photodetector.

It is possible to use laser light in a Range Finder according to the present invention with any intensity structure in cross-section, i.e. with any mode. However, it should be kept in mind that each light spot of the optical digital image will have a complex structure of intensity. If the light spot falls on the wrong portion of the photodetector, an inaccurate optical digital image can result. To eliminate these negative effects, it is necessary to configure the OADC to take into account the mode structure of the radiation as well as the type of laser to be used with the Range Finder, and the type of photodetector that will be used.

Furthermore, because the surface of the object is included in the optical circuit of the Range Finder, it is necessary to take into account the optical properties of the object surface and the size of the light spot which will be formed on the object surface upon illumination by the laser beam. The optical properties of the object surface (e.g., factor of reflection, dispersion of light, rotation of polarization, etc.) influence the amplitude of the scattered light entering the aperture of the Range Finder. It is therefore necessary to ensure that the intensity of the optical digital image is not lowered below the optical sensitivity of the photodetector or the binarization threshold of the comparator.

Figure 18A:
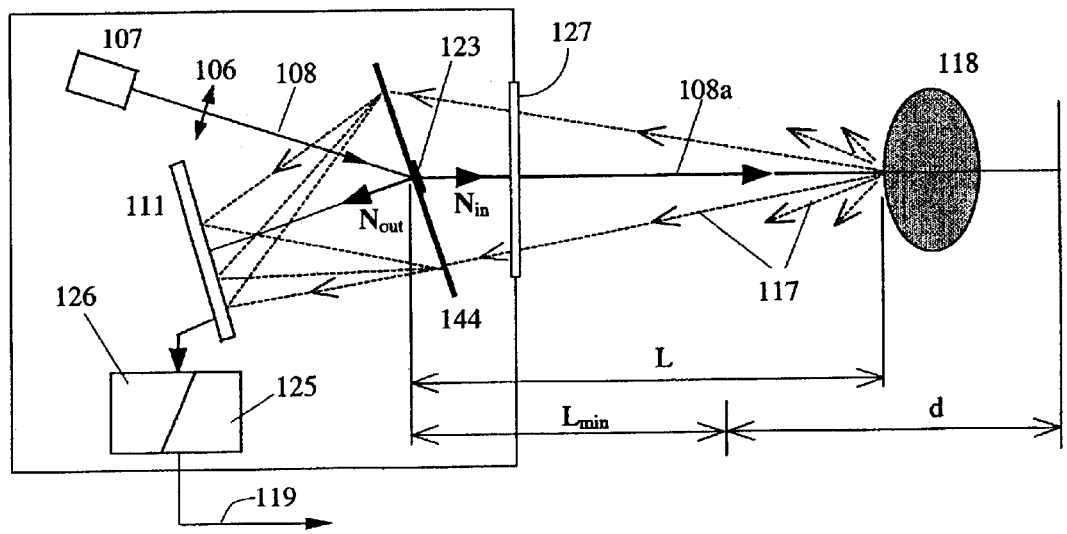
FIG. 18a shows a general configuration of a Range Finder according to the present invention employing a Kinoform prism.
Figure 18B:
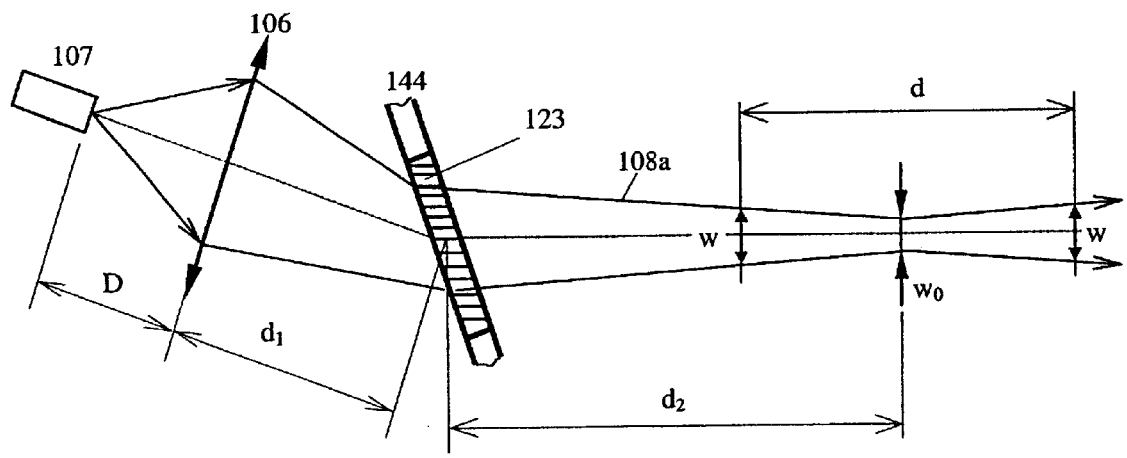

The object surface can influence of the size of a light spot in the optical digital image because the cross-section of incident laser beam is changed from $w_0$ to w along the line of measurement (see FIG. 18b). The light spot on the object surface is the input light source for the OADC which forms the optical digital image. The angle size of such source of light is $\Omega=w/L$, where w=the diameter of a light spot on the object surface and L=the distance from the OE 101 to the object 118 FIG. 18a).

The OE 101 of the Range Finder must be configured such that the size of a light spot (1 bit of the optical digital image) is equal to $\Omega_0=H_0/L_0$, where $H_0$ is the diameter of the spot and $L_0$ is the distance from the OE 101 to a plane of the optical digital image. If a light source is not a dot, the angular size $\Omega_0$ of the spot (i.e., the angle of view of the light spot from the OE 101) is increased by size of the angle of incidence of the source $\Omega$ (i.e., the angular size of the spot is as big as $\Omega_0+\Omega$). Thus the diameter of a light spot of the optical digital image is equal $H=H_0+wL_0/L$. For example, if $H_0=0.05$ mm, $L_0=50$ mm and the maximum diameter of a light spot on an object surface is w=0.5 mm at L=500 mm, and as a result H=0.1 mm. In this example, the diameter of a light spot of the optical digital image H has been doubled in comparison with an ideal $H_0$. In general, the size of the sensitive area b of the photodetector must be greater than H.

As noted in Section 4.3.1, the laser 107 employed with an OADC 144 of the present invention can be used in either continuous or in a pulsing mode. Where the laser 107 is used in a pulsing mode, the duration of laser pulse is particularly important where the Range Finder measures the distance to a moving object with a speed V. The duration of the pulse T should satisfy the condition: $T<(\epsilon/V)$, where $\epsilon$ is the resolution of the Range Finder at the specified distance measurement. The interval between pulses should be more than the time of interrogation and the reading of a signal from the photodetector 111 in the Range Finder.

4.4.2 Optional Elements

It will be appreciated by one of skill in the art upon reviewing this disclosure that a wide variety of elements may be employed to refine and optimize the operation of the Range Finder of the present invention, including, for example, lens elements for focusing the laser beam 108 on the object 118 surface, as well as the elements described in Section 4.3.2 herein.

The Range Finder preferably includes (see. FIGS. 15 and 16) a light source 107 (as described in Section 4.3.1 herein), and an OADC 144 (as described in Section 4.3 herein), including an OE 101 (as described in Section 4.2 herein), and preferably includes a multi-element photodetector 111 (as described in Section 4.3.4 herein), and an electrical circuit comparator 125/126 (as described in Section 4.3.5 herein).

Figure 17A:
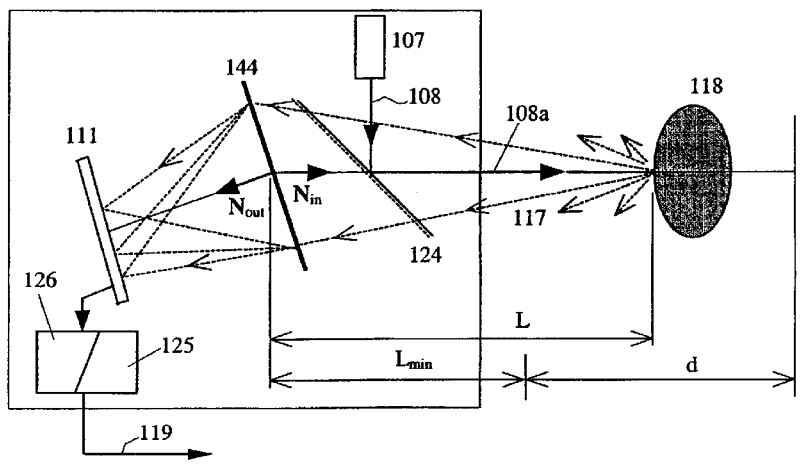
Figure 17B:
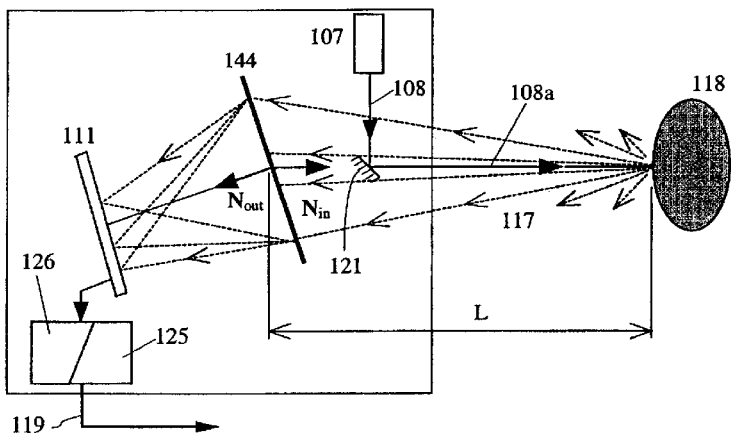

The Range Finder optionally includes a transparent element and/or a redirecting element (e.g., light splitter, mirror, prism, etc.). For example, FIG. 20 illustrates a configuration having a transparent element consisting of a hole 120. FIGS. 17b, and 22a–b illustrate a configuration having a redirecting element consisting of a mirror 121. FIGS. 18a–b, 19, and 21, show a redirecting element consisting of a kinoform prism 123. FIG. 17a shows a redirecting element consisting of a light splitter 124.

The Range Finder may also include a comparator 125 controlled by an electrical circuit 126 which is operationally coupled to the photodetector 111 as described in Section 4.3.5 above. The comparator/electrical circuit may be an integrated device.

Other elements may include mirror, prism and/ or half-translucent elements (e.g., cubes) to facilitate a compact arrangement of all elements of the Range Finder, as well as a light filter 127 (see FIG. 20) to decrease the influence of extraneous light on the photodetector 111.

4.4.3 Configuration Considerations

It will be appreciated by one of skill in the art that a Range Finder according to the present invention, may usefully employ a wide range of alternative configurations.

Figure 15A:
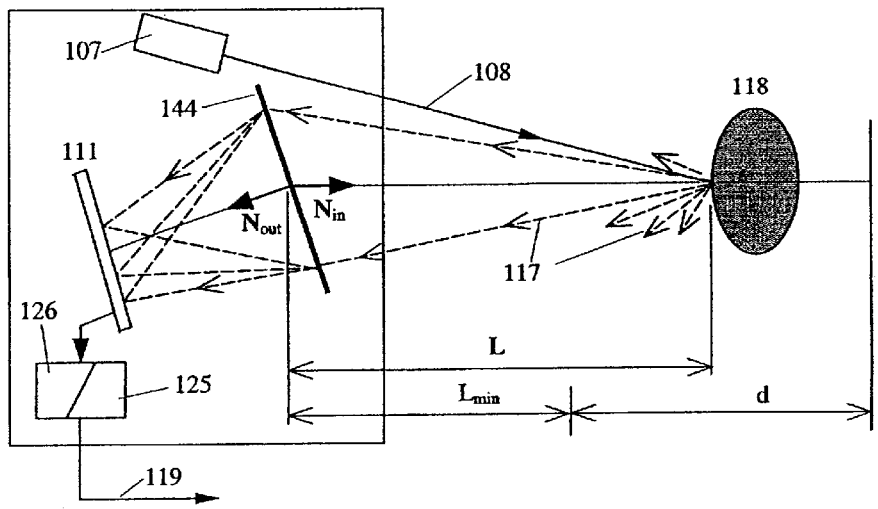
Figure 15B:
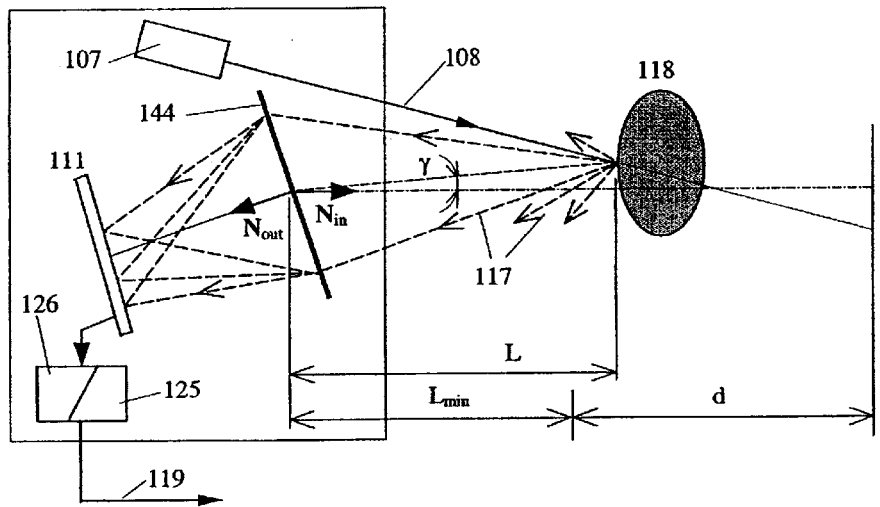
Figure 16:
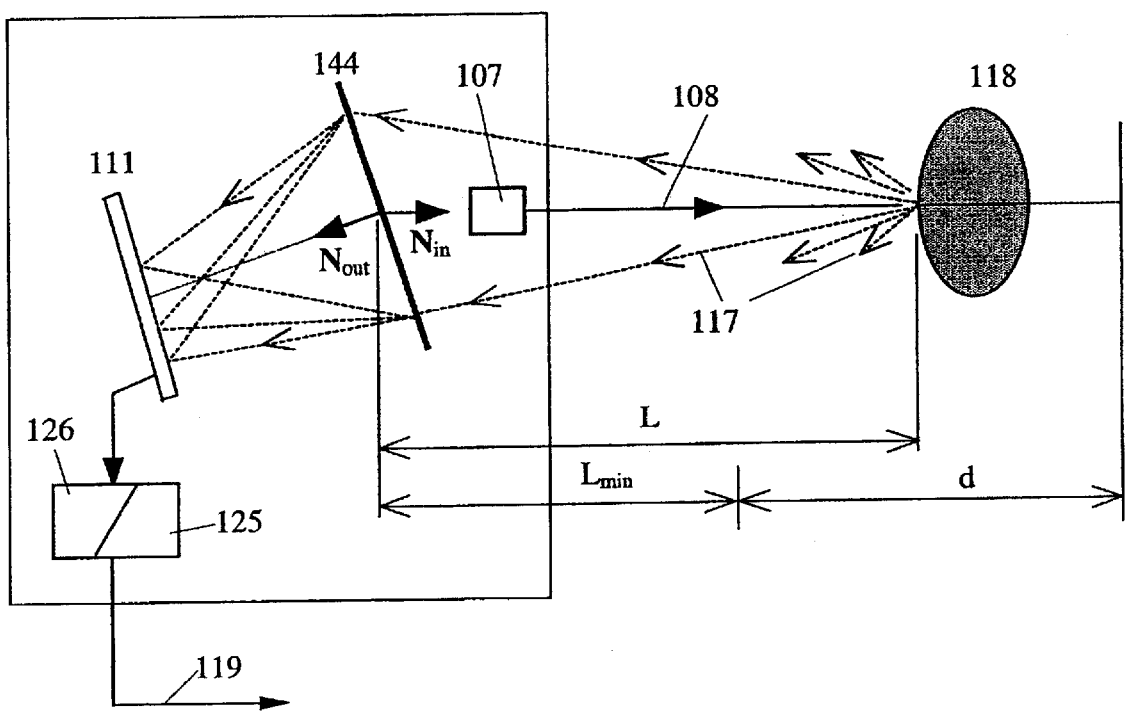

FIG. 15a schematically illustrates a simple configuration of a Range Finder according to the present invention where the direction of the laser beam 108 emitted by the laser 107 does not coincide with vector $N_{in}$ of the OADC 144. FIG. 15b shows that angle γ between the vector $N_{in}$ of the OADC 144 and the angle at which the laser beam 108 impacts the object 118 varies with the distance of the OADC 144 to the object 118.

This configuration includes the laser 107, the OADC 144, the multi-element photodetector 111, and the electrical circuit 126 coupling the photodetector 111 with a comparator 125.

The laser 107 and the OE 101 may be arranged such that the direction of the laser beam 108 does not coincide with a vector $N_{in}$ (the basic direction for incoming light of the OE 101). The distance between the OE 101 and the object 118 should lay within a range of distances for which the OE 101 has been designed and manufactured.

The plane of sensitive elements of the photodetector 111 is located orthogonal to a vector $N_{out}$ of the basic direction on the optical digital image of the OE 101. The distance between the photodetector 111 and the OE 101 should be equal to the distance for which the OE 101 has been designed and manufactured.

The Range Finder of FIGS. 15a–b functions as follows. The laser beam 108 is directed to the object 118, which scatters light 117 from the laser beam 108. Part of this light enters the aperture of the OE 101. The OE 101 forms the appropriate optical digital image on the multi-element photodetector 111. The signal of the photodetector 111 is read out under the control of the electrical circuit 126 and is transmitted to the comparator 125 for analysis. The output from the comparator 125 is an electrical digital signal 119 indicating the distance from the Range Finder to the object 118.

The foregoing configuration has the disadvantage that the direction of the laser beam 108 does not coincide with a vector $N_{in}$. As shown in FIG. 15b, the angle γ (between the vector $N_{in}$ and the point at which the laser beam 108 impacts the object 118) changes with the position of the object 118. As a result, the input light 102 varies not only by the curvature radius of wave front, but also by the direction vector of the incoming light. Accordingly, the OADC 144 must be configured to compensate for these changes in the direction of distribution of incoming light.

The Range Finder configuration shown in FIG. 16 overcomes this problem because the direction of the laser beam 108 coincides with the vector $N_{in}$ of the OE 101. Accordingly, the requirements for calculating and manufacturing this configuration are much simpler in comparison with configuration of FIGS. 15a and b.

Figure 17C:
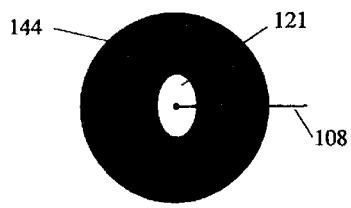

FIGS. 17a–b schematically illustrate two simple configurations of a Range Finder according to the present invention. FIG. 17a schematically illustrates a configuration of a Range Finder according to the present invention employing a splitter 124. FIG. 17b schematically illustrates a configuration of a Range Finder according to the present invention, employing a small mirror 121. The arrangement of the mirror 121 is shown in FIG. 17c.

The configuration of the Range Finder shown in FIG. 17a includes: laser 107, splitter 124, OADC 144, multi-element photodetector 111, comparator 125 and an electrical circuit 126 coupling the photodetector 111 with a comparator 125.

The laser 107, splitter 124 and the OADC 144 are located in such manner that the direction of the reflected laser beam 108 from the splitter 124 coincides with a vector $N_{in}$ of the OADC 144. The OADC 144 must be manufactured to measure a predetermined range of distances. The distances between the laser 107 and the splitter 124, and between the OADC 144 and the splitter 124 should be such that the cross-section of the laser beam 108 in the whole range of distances will not exceed the maximum allowable width.

The plane of sensitive elements of the photodetector 111 is preferably located orthogonal to a vector $N_{out}$ of the OADC 144. The distance between the photodetector 111 and the OADC 144 should be equal to the distance for which the OADC 144 is designed and manufactured.

This configuration (FIG. 17a) functions as follows: The laser beam 108 is directed to the splitter 124, the reflected laser beam 108 falls on the object 118, which scatters the light. Part of this light 117 returns, passes the splitter 124 and enters the aperture (not shown) of the OE101. The OE 101 redirects the incoming light and forms the appropriate optical digital image on the multi-element photodetector 111. The signal from the photodetector 111 is read out under the control of the electrical circuit 126 and is interpreted by the comparator 125. The output of the comparator 125 is an electrical digital signal indicating the distance from the Range Finder to the surface of the object 118.

A disadvantage of this configuration is that a large part of the light of the laser 107 is lost on the splitter. The full losses on splitter may exceed 75%.

To decrease these losses, the Range Finder can be constructed according to a configuration shown on FIG. 17b, where instead of a splitter, a small mirror 121 is used. The arrangement of the mirror 121 is shown on FIG. 17c (frontal view of Range Finder from the object 118). The size of this mirror 121 should be large enough to prevent deformation of the laser beam 108; however, the size of the mirror 121 should be small in comparison with the entrance aperture (not shown) of the OE 101 so that a minimal amount of light is lost. The distance between the OE 101 and the mirror 121 should also be as small as possible. Ideally, the distance between the OE 101 and mirror 121 is equal to zero, i.e., the OE 101 and mirror 121 are concurrent in one plane.

FIG. 18a shows an alternative configuration of a Range Finder according to the present invention. FIG. 18b shows a close-up view of the configuration of the laser path of the Range Finder shown in FIG. 18a.

The Range Finder configuration of FIG. 18a includes a laser 107, lens 106, kinoform prism 103, OE 101, light filter 127, multi-element photodetector 111, comparator 125, and electrical circuit 126 coupling the photodetector 111 with the comparator 125.

The kinoform prism 123 redirects light in a manner analogous to the redirection of light by a glass prism. The OE 101 and the kinoform prism 123 are nearly concurrent in one plane. It will be apparent to one of skill in the art that the kinoform prism 123 may have a wide variety of microstructure profiles.

The laser 107, the kinoform prism 123 and the OADC 144 are located in such a manner that the direction of a refracted laser beam 108 exiting the kinoform prism 123 coincides with a vector $N_{in}$ of the OADC 144. The distance between the OADC 144 and the object 118 should lie within the range of distances for which the OADC 144 is designed. The distances between the laser 107 and lens 106 should be such that width w (see. FIG. 18b) of the cross section does not exceed allowable width for which the OADC 144 is designed. The parameters of the lens 106 are calculated on the basis of the general laws of optics. The point of minimum beam waist of the laser beam 108 (i.e., that point in the beam where the wavefront is flat and the beam diameter is a minimum wo) is preferably located in center of the distance range.

Accordingly $d=L_{max}-L_{min}$ (see FIGS. 18a–b). The variable d represents the range of distances for which the OADC 144 is designed. The lower end of the range d is located at a distance $L_{min}$ from the Range Finder. Thus, where d=500 m, the waist should be located at distance $X=(L_{max}+L_{min})/2=L_{min}+d/2$ from Range Finder (i.e., $X=d_1+d_2$, see FIG. 18b). If $L_{min}$=10 meters, d=500 m, then X=10+500/2=260 meters. If $L_{min}$<<d, then X≈d/2=250 m.

Where $L_{max}$=500 meters and $L_{min}$=10 meters, then X=255 m. If $L_{min}$<<$L_{max}$, for example, $L_{min}$=1 meter, then $X \approx L_{max}/2$=250 meters.

A preferred light filter is a bandpass filter (color filter) with a width transparent of light $\Delta\;\delta \geq \Delta\lambda$ (where $\Delta\lambda$ is the linewidth of the laser 107). Outside this bandpass, the transparency of the filter is low (≈0).

This embodiment of the Range Finder shown in FIG. 18a functions as follows: The beam 108 of the laser 107 is directed on a lens 106 and then on the kinoform prism 123. A refracted laser beam 108 passes through the light filter 127 and falls on the object 118, which scatters light 117. Part of this light returns, passes through the light filter 127, and enters the aperture (not shown) of the OADC 144. The OADC 144 forms the appropriate optical digital image on the multi-element photodetector 111. The signal of the photodetector 111 is read out under the control of the electrical circuit 126 and interpreted by the comparator 125. This interpretation is. preferably "thresholding," i.e., the input signal from the photodetector 111 is compared with a predetermined threshold level, and the output from the comparator 125 is a "1" if the signal exceeds the threshold value and "0" if the signal is less than the threshold value. The resulting output is an electrical digital signal 119 indicating the distance from the Range Finder to the surface of the object 118.

Figure 19:
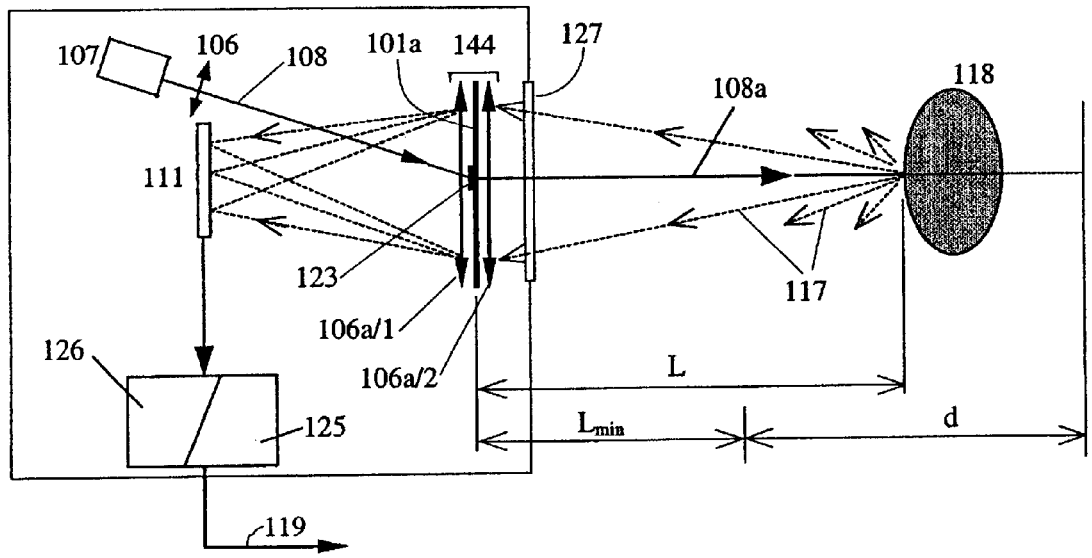
FIG. 19 shows an alternative embodiment of a Range Finder according to the present invention wherein the OADC is configured as a sandwich [lens+OE+lens] and employs a Kinoform prism.
Figure 20:
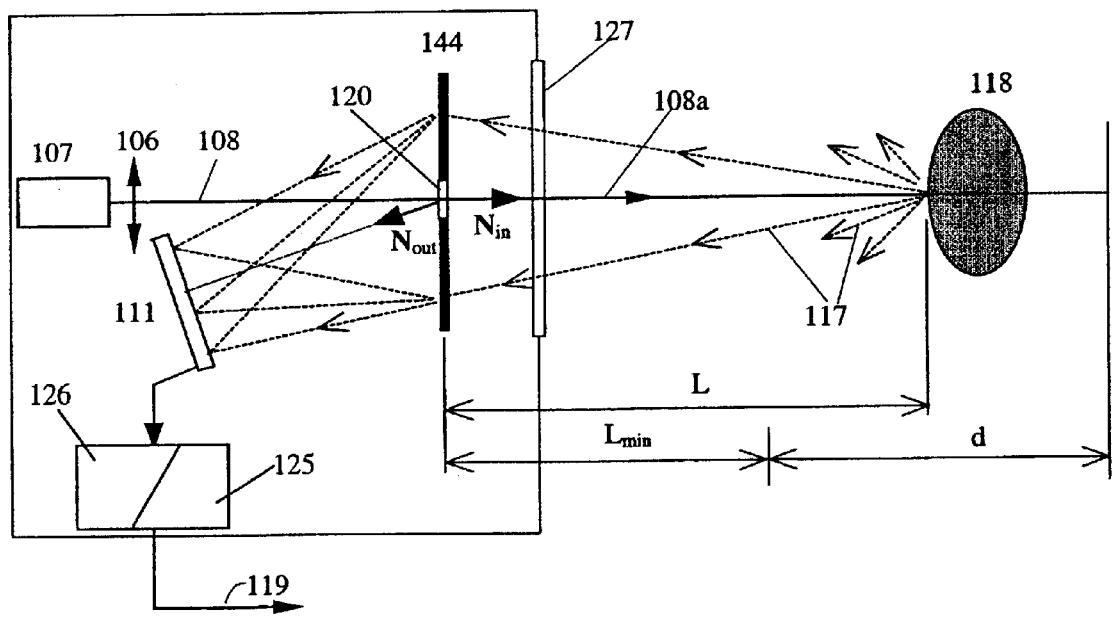
FIG. 20 shows an alternative embodiment of the Range Finder wherein the OADC comprises an OE with a "hole" for the passage of the laser beam.

FIG. 19 shows an alternative embodiment of a Range Finder according to the present invention, based. on the configuration of FIG. 18 wherein the OADC 144 is configured as a sandwich [lens+OE+lens] and employs a kinoform prism 123. Further, the OADC 144 is configured as a transparent element, and the vectors $N_{in}$ and $N_{out}$ lay on a single line.

FIG. 20 shows an alternative embodiment of the Range Finder using a hole 120 for permitting passage of the laser beam 108 through the OADC 144 so that the laser beam 108 is parallel to the vector $N_{in}$.

Figure 21A:
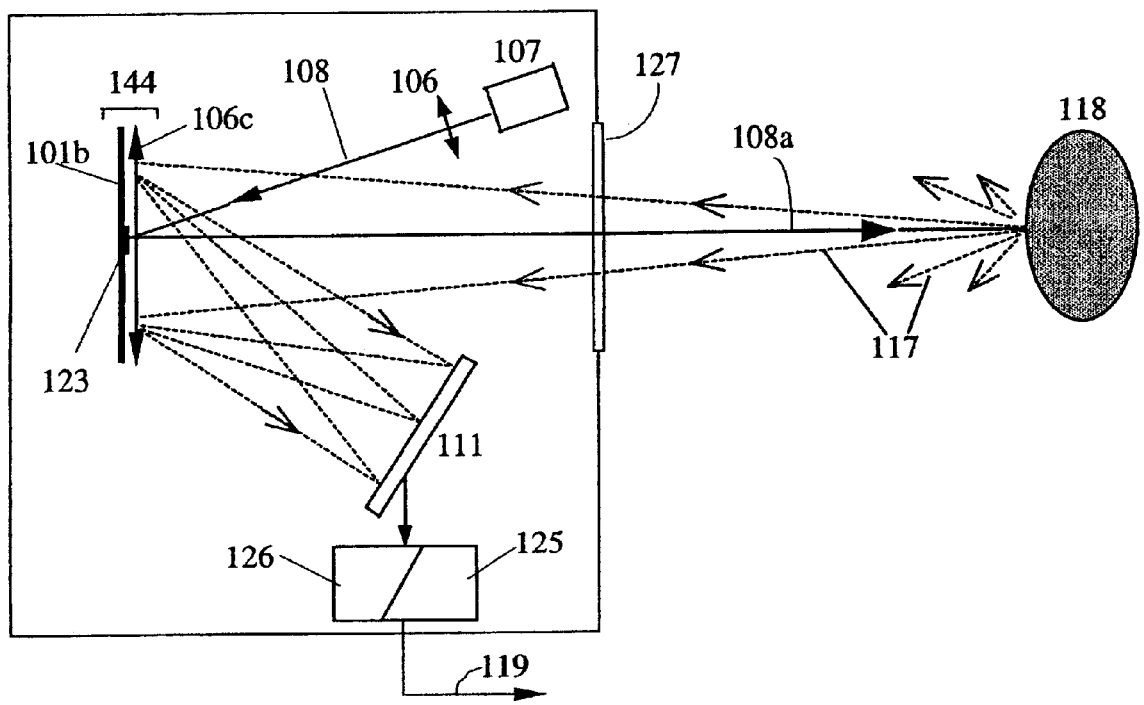
FIG. 21 shows an alternative embodiment of the Range Finder according to the present invention using a reflecting OE in a sandwich configuration [lens+OE+lens].

FIG. 21 shows an alternative embodiment (based on a configuration on FIG. 18a) of a Range Finder according to the present invention using a reflecting OADC 144b in a sandwich configuration [lens+OE+lens]. The kinoform prism 123 is also made as a reflecting element and is concurrent with the OADC 144 of the OADC 144. The laser 107, the lens 106, kinoform prism 123 and the OADC 144 are located such that the direction of the laser beam 108 after reflection from a kinoform prism 123 coincides with a vector $N_{in}$ of the OADC 144.

4.4.4 Configuration of Range Finder for Measuring Topography of Three Dimensional Objects FIG. 22 shows a configuration of a Range Finder device according to the present invention for measuring the topography of three-dimensional (3D) objects. This device essentially operates as an array of single Range Finders closely located to each other (along an axis Y). FIG. 22a shows projection of the device to a plane XZ. FIG. 22b shows a projection of the device to a plane YZ. FIG. 22c shows an arrangement of the mirror 121 and the OADC 144. FIG. 24d shows an arrangement of the 2D optical digital image on the matrix photodetector 111b.

This device (FIG. 22) includes a laser 107, an anamorphic optical system 130 (e.g., an optical system with different focal lengths or magnification levels in perpendicular planes to the optical axis), a mirror 121, an OADC 144, a matrix photodetector 111b, a comparator 125 and an electrical circuit 126 for controlling the photodetector 111b.

The laser 107, anamorphic optical system 130, mirror 121 and the OADC 144 are located in such manner that the direction of a reflected beam of the laser 107 from a mirror 121 coincides with a vector $N_{in}$ of the OADC 144. The arrangement of the mirror 121 is shown on FIG. 22c, where the frontal face of the device is shown.

The matrix photodetector 111 has I elements along axis X and N elements along axis Y (see FIG. 22d). The plane of sensitive elements of the matrix photodetector 111 is located orthogonal to a vector $N_{out}$ of the OADC 144. The distance between the photodetector 111 and the OADC 144 depends on various parameters of the system, but in general the distance should permit the digital light spots 110 to lie in the appropriate sensitive regions the individual photodetector elements.

This device (FIG. 22) operates generally as follows. The laser beam 108 is directed on the anamorphic optical system 130, which forms "light knife" 131. A light knife 131 is a light strip, extending along the axis Y and moving along the axis Z. This light strip 131 is reflected from the mirror 121 and impinges upon the surface of the object 118. The object surface 118 disseminates and scatters light 117, part of which returns and enters the aperture 129 of the OADC 144. The OADC 144 forms a corresponding optical digital image 136 on the matrix photodetector 111. The line (elements along axis X) of the optical digital image 136 is a binary code corresponding to the distance $L_y$. Each line of the code (located at a level y) corresponds to a certain point of the object surface 118 located at the same level y at the axis Z (the optical magnifier is equal to 1 in this example).

The matrix photodetector 111 reads out the optical digital image 136 (see FIG. 22d). The signal of the photodetector 111 is interpreted by the comparator 125. The output is an electrical digital signal 119 corresponding to the geometrical structure of object as sectioned by the "light knife" 131.

It will be appreciated that such a topographical Range Finder will find a wide variety of industrial and other uses. In one aspect, the topographical Range Finder according to the present invention can be configured to map terrain or identify objects from an airplane or satellite.

In another aspect, the topographical Range Finder can be used in any circumstance in which it is desirable to quickly and accurately determine whether a manufactured item meets a predetermined structural profile and to translate information corresponding to this determination into a computer-readable code for further processing by a computer processor, e.g., an automated manufacturing assembly line. The OADC can provide the computer processor system controlling the manufacturing line with a series of binary signals corresponding to the 3D structural profile of a manufactured item. If the signals do not meet specified criteria, the computer processor can direct the rejection of the faulty item. This process can be used with any manufactured item that requires a high degree of conformity between units, e.g., auto parts, airplane parts, pharmaceutical tablets, and other manufactured items. An OE can be specifically manufactured to work with a specific product, or a standard OE can be employed with a computer processor which is programmed to recognize the digital code which corresponds to the structural profile of the object. In either case, the computer processor is programmed to respond to a specific predetermined set of binary signals received from the topographical Range Finder. Further, depending on the specific profile of the item, the computer processor can send appropriate error messages to system operators or automatically make adjustments to the upstream processing parameters to bring the items into conformity with the required structural profile.

4.5 Optical Digital to Analogue Converter (ODAQ

The OE 101 of the present invention can also be usefully employed in an optical digital to analogue converter (ODAC). The ODAC 145 operates by transforming information contained in a optical digital image into information present in a light wave front.

The optical "digital images for input into the ODAC 145 (input light) is a 1D, 2D or 3D set of coherent light waves 140 (or sources of light), which represent a code, such as binary code. The OE 101 of the ODAC 145 redirects the input light 102 into a specific 3D distribution of light 160 (see FIG. 25) or output optical digital image 136 (see FIG. 26) and thereby transforms the binary information into information carried in the physical properties of the output light 103 wave front.

Pure optical digital to analogue transformation occurs where the output of the ODAC is an analog 3D distribution of light, the essence of this decoding is optical digital to analog transformation.

Where the ODAC is configured to configure an optical digital image, the ODAC transforms an input optical digital image into an output optical digital image. Thus, this configuration essentially performs optical digital to digital transformation (or code conversion). The terms "digital image," "output digital image" and the like are used herein to indicate that the output is similar to classical digital coding.

The ODAC 145 according to the present invention functions generally as follows:

The OE 101 for use in the ODAC 145 is manufactured to configure a specified output distribution of light which depends on the specified input light, i.e., either the form of the 3D distribution of the output light 103 or the meaning of the output optical digital image depends on the contents of the input optical digital image.

When the OE 101 of the ODAC 145 is configured to output an analogue 3D distribution of light, it is similar to an art hologram. An input dot source of light can be used to form an output hologram for human observation. The output light distribution depends on what is recorded on the hologram.

The imposed hologram, which is recorded using several reference waves (with dot sources of light), is also a primitive ODAC. This method of hologram recording is generally referred to as "recording of the hologram with a coded reference wave." In classical holography the coded reference wave is formed with the help of a diffuser (see R. Collier et al., Optical Hollography, Academ Press, 1971 (the entire disclosure of which is incorporated herein by reference). However, the method of recording the hologram permits the use of multiple reference waves from dot sources of light.

A primitive ODAC can be formed by using reference waves generated by a set of coherent light sources such as dots to record the imposed hologram. The set of coherent sources of light is the input optical digital image, and images (light fields) which had been imposed against each other at the recording of the hologram are the output analog 3D distribution of light.

When the hologram is restored using one of the optical digital images used to record the hologram, the image restored will be the appropriate image from the set of the recorded imposed images.

When an OE 101 of the ODAC 145 is prepared to form an output optical digital image, it also has some similarity to an ordinary diffractive grating which is used to divide an incident beam into multiple output beams. When a dot source of light is used as input into a diffractive grating (i.e., an input optical digital image consisting of a single bit), then the output of the diffractive grating can be a 1D or 2D set of diffraction orders. However, unlike the pure optical digital image 136 of the present invention, this output set of diffraction orders results only in a quasi-digital image 137 consisting only of "ones." The quasi-digital image 137 comprises gray "ones" and "zeros," i.e., the intensity of all light spots 110 ("ones"), varies among the light spots.

The quasi-digital image 137 and the pure optical digital image 136 of the present invention are compared in FIG. 27. The pure optical digital image 136 of the present invention is shown in FIG. 27a, and the distribution of intensity of light of the pure optical digital image 136 is shown on FIG. 27b ($I_p$=maximum intensity, $I_0$=level of optical noise, It =preferred threshold level of intensity). The quasi-digital image 137 is shown in FIG. 27c, and the distribution of light intensity in the quasi-digital image 137 is shown on FIG. 27d. Because the OE 101 of the present invention permits the formation of a pure optical digital image 136, the OE 101 of the present invention provides superior results compared to the quasi-digital image 137 of the prior art.

The digital light signal produced by an ODAC 145 of the present grating 143 can be compared to the operation of a diffraction grating; however, the diffraction grating produces only a quasi-digital signal, while the OE 101 of the present invention produces a pure digital signal. When a set of coherent dot sources of light is input into a diffractive grating, the output diffraction orders interfere with each other, such that some diffraction orders "extinguish" each other, and other diffraction orders "strengthen" each other. The result is an output quasi-digital image 137 such as shown in FIG. 27c.

A diffraction Dammann grating is also like a primitive ODAC. A Damman diffraction grating is a periodic binary phase grating where every period can have a highly complex structure. See: H. Dammann and K. Gortler, "High-efficiency in-line multiple imaging by means of multiple phase holograms", *Opt. Communication*, N. 3, 312–315 (1971)(incorporated herein by reference).

If the input of the Dammann grating is a dot source of light (i.e., a single light bit); the output is a 1D or 2D set of M diffraction orders of equal intensity (i.e., an output optical digital image consisting of only "ones"). The intensity of light in all "ones" is similar to the distribution intensity of "ones" shown in FIG. 27b; however the grating produces no zeros.

If the input of a Dammann grating is a set of N coherent dot light sources, the output is N sets of optical digital images, which interfere with each other. As result of the interference some diffraction orders can "extinguish" each other and other diffraction orders can "strengthen" each other. The result is quasi-digital image 137 in which the quantity of bits is not equal to M and the intensity of the "one" bits is not identical.

The ODAC employs an OE, such as the OE described in Section 4.2 above. The OE 101 of the ODAC 145 is manufactured to exhibit a special amplitude—phase structure. The functioning of the OE 101 is comparable to a hologram or kinoform in that illumination of the OE 101 by the light waves from a coherent source of light results in a determined light distribution, either an output optical digital image or an output 3D distribution of light.

The specific amplitude—phase structure of the OE depends on the specific output which is desired. The amplitude—phase structure of the OE transforms input light into a complex three-dimensional distribution of light which varies according to the parameters of the wave front of the incoming light.

The amplitude—phase structure is calculated using standard mathematical principles for the operation of kinoforms or digital holograms.

FIG. 28 shows how various configurations of the input optical digital image 140 can affect the output distribution of light. The input optical digital image 140 is formed by a set of coherent laser sources 139, which are located along a direct line on a plane P 131. If the first source is ON, it corresponds 1 (octal), if the second source is ON, it corresponds 2, etc.

The input optical digital image 140 will be transformed into a converging wave 103$a$ with a wave front radius $D_n$ and all waves are distributed along a vector $N_{out}$. Depending on the code of the optical digital image, these waves converge at various distances ($D_1, D_2, D_3, \ldots, D_n$) from the OE 101 ($D_n = D_0 + n\Delta$, where n=1, 2, 3, ..., N, $\Delta$=step of coding (resolution of transformation), and $D_0$ is a known constant).

It will be apparent to one of skill in the art that a wide variety of functions of coding an OE 101 according to the present invention are possible, for example: the input optical digital image can be transformed to several converging waves; the input optical digital image can be transformed to diverging waves; or the input optical digital image can be transformed to converging waves and diverging waves, which are distributed along various directions.

While the ODAC is essentially a digital-to-analogue converter, it will be appreciated that the ODAC can also perform digital-to-digital conversion, i.e., the ODAC can operate as an optical switch. Digital to digital transformation (coding) is illustrated on FIG. 29, showing a configuration of the ODAC 145 having an input optical digital image 140 and an output optical digital image 136. The input optical digital image 140 (plane P 138) is formed by a set of coherent laser sources. The coherent laser sources are preferably dot sources. The target optical digital image is formed in a plane P 162.

The OE 101 of FIG. 29 operates bit-by-bit by inverting logic (NOT) of the entrance code m. Thus, the code NOTm is present in plane P'.

Like the OE 101 of the OADC 144, the OE 101 of the ODAC 145 can be a transparent (semitransparent) and/or a reflecting element having varied amplitude—phase profiles.

Like the OE 101 of the OADC 144, the OE 101 for use in an ODAC 145 can be a typical holographic plate (film) with an imposed hologram, or a kinoform element (glass plate or plastic film with phase profile on a surface).

Both the kinoform and hologram OE's may have an additional reflecting layer. Furthermore, the OE may be a spatial light modulator controlled by a computer processor.

The ODAC 145 may further comprise one or more lenses 106, as described in Section 4.3.2; a spatial light modulator 141, as described below; a unit for formation of the optical digital image 142; and/or a multi-element photodetector 111.

Various lenses may be used in the manufacture of the OE 101 for use in an OADC 144 and/or an ODAC 145. For example, lens(es) 106 can be used to permit reduction in the spatial frequency of the phase structure of the kinoform element to reduce manufacturing costs.

FIG. 28 shows a general configuration of an ODAC 145 of the present invention wherein the input is an optical digital image 140 and the output is a three dimensional display for human observation. FIG. 29 shows an ODAC 145 according to the present invention wherein the input is an optical digital image 140 invented from a plane P 138 and the output is an output optical digital image 136 located on plane 104.

FIG. 31 schematically illustrates various configurations of the ODAC 145 of the present invention using a transparent OE 101$c$ (figures a and b), as well as a reflected OE 101$b$ ($c$ and $d$).

FIGS. 32 schematically shows a configuration of the ODAC 145 of the present invention using a sandwich configuration [lens+OE] using a transparent OE 101$c$ (FIGS. 32$a$–$b$) and a configuration using a reflected OE 101$d$ (FIGS. 32$c$–$d$).

FIGS. 33 schematically shows a configuration of the ODAC 145 of the present invention using a sandwich configuration [OE+lens] using a transparent OE 101$c$ (FIGS. 33$a$–$b$) and a configuration using a reflected OE 101$d$ (FIGS. 33$c$–$d$).

FIGS. 34$a$–$d$ schematically shows a configuration of the ODAC 145 of the present invention using a sandwich configuration [lens+OE+lens] using a transparent OE 101$c$ (FIGS. 34$a$–$b$) and a configuration using a reflected OE 101$d$ (FIGS. 34$c$–$d$).

FIG. 35 shows a special configuration of the ODAC 145 of the present invention using a sandwich configuration [lens+OE+lens] using only a single lens 106 and a reflected OE 101$c$.

FIG. 36 shows an ODAC 145 according to the present invention further comprising an SLM 141.

FIG. 37 of the present invention shows ODAC 145 further comprising a multi-element photodetector 111.

FIG. 38 shows ODAC 145 according to the present invention further comprising both an SLM 141 and a multi-element photodetector 111.

FIGS. 39$a$–$b$ show configurations of the present invention further comprising a unit for formation of the optical digital image 142. Such unit for formating an optical digital image is described in more detail in Section 4.6.1.

FIG. 40 shows a configuration of an ODAC 145 according to the present invention further comprising both a unit for formating an optical digital image 142 and a multi-element photodetector 111.

Appropriate multi-element photodetectors 111 are generally as described in Section 4.3.4. Where a multi-element photodetector 111 such as a CCD array, is employed, it is preferable to have an electrical circuit 126 for controlling the photodetector 111 and a comparator 125 for comparing each signal from the photodetector 111 with a predetermined threshold value. Various electrical circuits and comparators for operation with multi-element photodetectors are well known in the art.

The input of the multi-element photodetector 111 is an optical digital image 140 and the output of the multi-element photodetector 111 (after processing by the comparator) is an electrical digital signal 119 which is transmitted to the comparator 125 for comparison with a predetermined threshold value. The output from the comparator 125 is a digital binary code which is transmitted to the computer processor 122 for further processing.

Furthermore, the ODAC 145 of the present invention can be used together with an OADC 144 of the present invention to configure a new generation of lens testing devices. For example, it is possible to configure the device for measurement of optical element parameters, as shown in FIG. 41. This device comprises an ODAC 145, OADC 144 and computer processor 122.

The device operates generally as follows. The computer processor 122 sends a signal to the input light 102 source for the ODAC 145. The ODAC 145 transforms the input light 102 source into the appropriate 3D distribution of light. This light impinges upon the optical element being tested, resulting in deformation of the wave front. The deformed wave front then impinges upon the OE 101 of the OADC 144, resulting in an optical digital image which is transmitted to the computer processor 122 for comparison with a predetermined signal, i.e., the computer processor can compare the digital code representing the deformed wave front with a digital code representing an ideal (theoretical) wave front. Where the signal does not match the predetermined signal, the optical component is defective. Further, where the optical element matches an alternative predetermined signal, the computer can determine that the optical element has a particular known defect. In an assembly line, the computer processor can be programmed to send a signal to a reject mechanism to reject all lenses which do not satisfy specified criteria, and/or the computer can modify upstream processing parameters to correct the detected defect.

Presently used lens testing systems use light having a very simple structure for illuminating the optical element. For example, the light is a flat wave or spherical wave. In contrast, the present invention enables the use of a wave front having any form for illuminating the optical component.

The ODAC 145 according to the present invention can also be usefully employed as a means for teaching students about the characteristics of light and optical elements in universities, college etc.

4.6 Hollographic Display Unit

The ODAC 145 of the present invention can be used to configure a holographic display unit (HDU) 146.

The HDU 146 generally comprises an ODAC 145 and an optical digital image formation unit (DIFU) 142. The DIFU 142 may be controlled by a computer processor 122. (See FIG. 42); however, the DIFU 142 may also be directly connected toga data storage device 147, such as a CD-ROM drive.

Figure 31A:
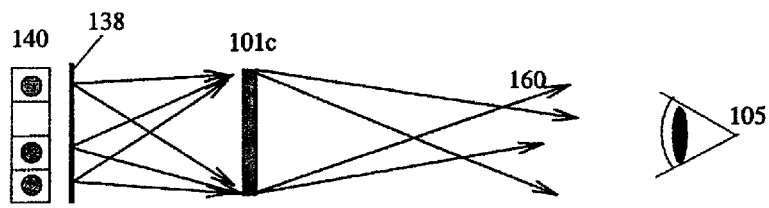
Figure 31B:
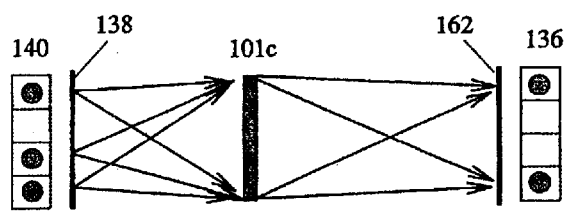
Figure 31C:
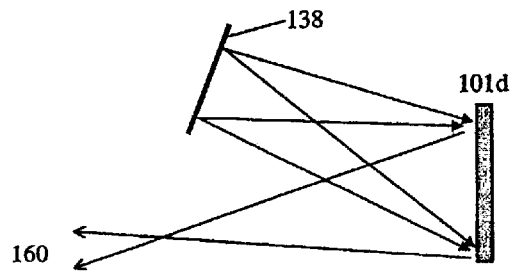
Figure 31D:
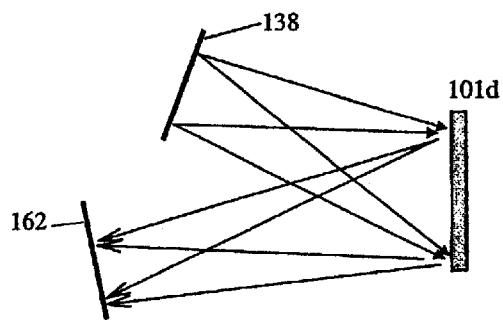

Like the OADC 144, the ODAC 145 for use into the HDU can be configured with a sole OE 101 (i.e., without lenses 106) or with lenses 106 before and/or after the OE 101. FIGS. 31a,c show configurations of the ODAC 145 employing a sole OE 101. FIGS. 32a,c show a [lens+OE] configuration. FIGS. 33a and c show a [OE+lens] configuration, and FIGS. 34a and c and 35 show [lens+OE+lens] configuration. (See FIGS. 45–46 also.) It will be appreciated that in each of the foregoing configurations, it may be desirable to use more than one lens 106 before and/or behind the OE 101.

The DIFU 142 can quickly form an appropriate optical digital image from an electrical digital image. The electrical digital image is generated by a computer or from another internal or external data source (e.g., CD-ROM, recorder, etc.). The electrical digital image includes both 3D video signal and synch-signals.

The 3-D image which can be shown using an HDU is represented in the computer by primitives: a dot or a side (2-D or 3-D side). The term "primitive" is used herein to denote a fundamental unit of image formation, and can include basic structures such as a point or more complex structures such as 2D or 3D shapes, including triangles, squares, cubes, etc. The level of complexity of a primitive depends on the particular application of the DIFU 142 and on the level of graphical detail which is required.

Each primitive has appropriate parameters. For example, a set of parameters of dot-primitive are coordinates X, Y, Z and brightness A. The meaning of a code of the optical digital images corresponds to the coordinate parameters of the primitive. The brightness A of the image dot is determined by the power of the radiation of the light source (laser), which is controlled by a signal of brightness of the image.

The 3D display restores the 3D image by formating a sequence of primitives. When a code of the optical digital image impinges upon the ODAC, one or several 3D wavefronts are formed. The wavefronts are the visual representation of the appropriate primitive. The sequence of the optical digital images acting on the ODAC forms a sequence of visual primitives which are integrated by the eye (in approximately ¹⁄₂₄ second). As a result, the observer sees a uniform 3D image.

Considering the space of the images (X,Y,Z) (volume of the frame) which consists of dot-primitives, where the quantity of dots in the volume of the frame is equal, the cross-section 480×640 (NTSC), depth 500 dots, and 9+10+9=28 bits of the information per dot, the number of the gray gradations is 256 (8 bits). Thus, each dot is described by 28+8=36 bits of the information. The coordinates of a dot X, Y, Z and the brightness A of a dot act on different channels: the coordinates of a dot X, Y, Z act on the ODAC, and the signal of brightness A acts on the radiation power control unit of the light source (laser). A wide variety of radiation power control units are known in the art.

Thus, to form a 3D image in a frame volume (X, Y, Z) consisting of dot-primitives, it is necessary to make an ODAC, having the following properties (FIG. 43):

(a) the first 9 bits form a converging wave on the appropriate distance along an axis X;

(b) the second 10 bits move the converging wave in a cross direction along an axis Y;

(c) the third 9 bits move the converging wave in a cross direction along an axis Z.

The physical structure of such a kinoform ODAC is a very complex set of phase "grooves" similar to strips in holographic emulsion of any hologram.

To generate a 3-D image which fills in the whole frame volume (480×640×500 dots) with a speed of 30 frames/sec., it is preferable to transfer the data from the computer at a speed of approximately 16 Gbytes/sec. A 3-D surface (like the function Z=f (X,Y)) of a 3-D object contains much less information than a 3-D volume, and a 3-D surface (480×640 dots) may be displayed at a speed of 30 frames/sec by transferring the data from the computer at a speed of 32.2 Mbytes/sec.

To form a 3D image using side-primitives (see FIG. 44), it is necessary to make an ODAC which can form sides at any position of the 3D frame volume.

A simple configuration of and HDU is shown in FIG. 45. The HDU includes an ODAC 145, a DIFU 142, a housing 148, and a protective glass 149. The ODAC 145 and the DIFU 142 are located such that a plane of the optical digital image (which is formed by the unit) is at a distance from the ODAC 145 for which the ODAC 145 is designed. For example, the plane of the optical digital image is located in a focal plane of the first lens 106/1 (focal length F) of the ODAC 145. Transparent glass 116 is located between the ODAC 145 and the observer. The glass transmits light without distortion. The glass can have an anti-reflective covering. The housing 148 includes all elements of the HDU 146.

A configuration of the HDU 146 using ROM (CD-ROM) is shown in FIG. 46. In this configuration, the HDU 146 can be used to view 3D video. Other types of ROM are known in the art, i.e., hard disk, magnetic tape, etc.

The preferred configuration of HDU 146 is shown in FIG. 47. The HDU 146 includes the ODAC 145, DIFU 142, housing 148, and a kinoform lens 150. The ODAC 145 and the DIFU 142 are located in such a manner that a plane of the optical digital image (formed by the DIFU 142) is at the distance from the ODAC 145 for which the ODAC 145 is designed. The optical digital image formation is described in more detail in Section 4.6.1. The kinoform lens 150 is located on the optical path between the ODAC 145 and the observer. The kinoform lens 150 magnifies the angular sizes of the 3D image for convenient human observation. The distance between the kinoform lens 150 and the ODAC 145 is determined by the parameters of the ODAC 145 (i.e., the ODAC together with the kinoform lens 150 can be designed using ordinary computer programs to accomplish the tasks described herein). The housing 148 preferably contains all elements of the HDU 146.

In one aspect of the present invention an HDU 146 can be employed as a diagnostic tool for evaluating the quality of a subject's depth perception. A schematic representation of such a device is depicted in FIG. 52.

The device operates generally as follows. The computer processor 122 sends a digital signal 119 to the HDU 146, which forms an appropriate 3D distribution of light (i.e. wave front of having specified parameters). This light is observed by the subject who communicates to the operator and/or to the computer what is seen.

The operator and/or computer can show the patient a variety of special stereo-images, and the patient's responses can inform the operator about the quality of the patient's stereo-vision and/or can be processed by the computer into data which indicates the state of the patient's depth perception. Where the subject inputs data into the computer in response to various 3D images, it may also be desirable to permit the patient to provide input into the computer which modifies the image in order to provide additional information concerning the state of the subject's depth perception. For example, the computer can be programmed to permit the subject to adjust the image until it appears to have the appropriate depth or until it has no depth. Thus employed, the ODAC 145 of the present invention provides an important advance in depth perception diagnostics.

4.6.1 Optical Digital Image Formation Unit DIFU

While the DIFU 142 is described herein in an exemplary fashion, it will be appreciated by one skilled in the art that the DIFU 142 of the present invention can be configured in a wide variety of ways using various optical components known in the art.

One simple configuration of the DIFU is depicted in FIG. 48. The DIFU generally comprises a source of light 139, a lens 106, and an SLM 141 controlled by a computer processor (not shown).

A preferred configuration of the DIFU 142 is depicted in FIG. 49. The comprising a laser projector 107, lens 2 106a/2, and an SLM 141 controlled by a computer processor (not shown), a microlens array 113, and a circuit which controls the power of the laser 107.

The laser projector comprises a semi-conductor laser 107, lens 1106a/1, a Dammann grating 143b. The laser beam 108 is collimated by lens 1106/1 and then it falls on the Dammann grating 143 which splits the laser light to a number of 2D arrays of laser beams 108/2. All beams preferably have a mutual coherence function much greater than zero. The beams produced by the laser projector are preferably transformed by a lens 2 106/2 to a number of parallel or converging beams 103a.

An exemplary laser projector for use with the DIFU 142 of the present invention is the SFN-507X dot matrix laser diode manufactured by Lasiris Inc., St. Laurent, Quebec (see http://www.lasiris.com).

These beams impact the SLM 141 which is controlled by the computer processor 122. Each cell of SLM 141 transmits or blocks an individual beam of light 157 as directed by the computer processor 122. The beams of light exiting the SLM 141 are preferably directed to a matrix of microlenses 11 3 which expands beams of light to form the optical digital image.

The circuit controls the brightness of the laser radiation, and permits the operator to adjust the brightness of the 3D image. This unit works as follows:

The synch-signal is transmitted to the circuit controlling the light source, and the light source radiates light. An optical digital image is formed and impinges upon the ODAC 145 which transforms it to a primitive (e.g., luminous dot or side) as determined by the optical digital image code. Then the light passes through the glass 151 and the primitive becomes visually observable.

Then the synch-signal is transmitted to the circuit which controls the light source, and the next optical digital image is transmitted to the DIFU 142. As a result, the next primitive becomes visually observable. Sequences of visual primitives are integrated by the eye and as a result the observer sees the 3D image uniformly.

The laser 107 can be used in either continuous or a pulsing mode. If a continuous laser is used, the DIFU 142 should be employed with an optical shutter 154 (FIG. 50), e.g., an acoustic-optical modulator or other similar device. If the laser is used in a pulsing mode (see FIG. 49), the laser should provide the necessary frequency of light pulses [for example, 19 MHz for formation of a 3-D surface (480×640 dots) at speed of 60 frames/sec].

It is also possible to use a reflecting SLM 141. An exemplary reflecting SLM is the electrically addressed 256× 256 reflective SLM manufactured by Displaytech, Inc. (see http://www.displaytech.com/devtools.htm).

FIG. 51 shows an alternative embodiment of an DIFU 142 according to the present invention employing reflecting SLM 141 and a polarization cube 152. The polarization cube 152 can be configured to permit polarized light to impinge upon the SLM 141, the various cells of which either simply reflect or reflect and rotate the polarization of the light which is incident upon them. Thus, for example, the incoming light may be vertically polarized, and a the various cells of the SLM 141 may, as directed by the computer processor, either simply reflect the vertically polarized light or reflect and rotate the vertically polarized light to yield horizontally polarized light. As the variously polarized light passes through the polarization cube 152, light having one direction of polarization passes through the polarization cube 152, while light having the other direction of polarization is redirected by the polarization cube 152 to the microlens array 113. Thus, for example, horizontally polarized light may be permitted to pass through the cube 152, while vertically polarized light may be redirected to the microlens array 113.

4.6.2 Spatial Light Modulators

A variety of SLMs are known in the art which can be usefully emplyed according to the present invention. A preferred SLM for use with an ODAC 145 of the present invention is the controlled liquid-crystal spatial light modulator, fabricated by Boulder Nonlinear Systems, Inc. (Boulder, Colo. 80301). Another useful SLM is SLM-256 (electrically addressed 256×256 reflective SLM fabricated by Displaytech; see http://www.displaytech.com/devtools.html).

4.7 Device for Manufacturing the Optical Element

The optical element (OE 101 ) can be manufactured as an imposed hologram using a device such as the device described below. The device is intended for manufacturing an OE according to the present invention, which dynamically codes the radius of curvature and/or direction vector of distribution of a light wave front.

4.7.1 Description of the Device for Manufacturing the Optical Element

Referring now to FIG. 59, a laser beam (not shown) is divided by splitter into two beams (not shown), which are directed into the first fiber 155/1 and the second fiber 155/2. The first fiber 115/1 enters the DIFU 142a and the second fiber 155/2 is fixed on the control stage (X, Y) 153a. Control stage (Z) moves the second fiber 155/2 along an axis Z under the control of signals 167 which come from the computer processor (not shown). The controlled stage (X, Y) 153a moves the second fiber 155/2 in a plane $P_E(X, Y)$ (see FIG. 60) under the control of signals 167 which come from the computer processor. The end face 156/2 of the second fiber 155/2 radiates a diverging beam of light 157 which passes through the shutter 154 and impinges upon the second lens 106a/2. The second lens 106a/2 forms an object beam 159b for the hologram.

The shutter 154 is controlled by signal 170 from the computer processor to control the light intensity and the time of an exposure of the hologram to the object beam 159b.

The object beam can have various radii of curvature depending on a position of an end face 156/2 of the second fiber 155/2 along the axis Z. The object beam 159b can have a various direction vectors of distribution depending on the position of the end face 156/2 of the second fiber 155/2 in the plane $P_E$.

The object beam can also be formed by other means. For example, the object beam 159b can be generated using an optical system having a variable focal length, as represented in FIG. 63.

The DIFU 142a forms the optical digital image under the control of signals 165 from the computer processor 122. A plane of the optical digital image 104 is presented in a plane P using an appropriate lens. The light distribution of the optical digital image is a reference light beam 159a for the hologram 115.

The DIFU 142a can be be employed using a variety of configurations.

A configuration of a DIFU 142a using a transparent spatial light modulator (SLM 141) is represented in FIG. 61. The Unit 142a generally comprises: a fiber laser projector 158, a second lens 106a/2, an SLM 141 (which is controlled by the computer), and a lens raster 113.

The fiber laser projector 158 comprises a first lens 106a/1, a shutter 154, 2D Dammann grating 143b.

The end face 156/1 of the first fiber 155/1 radiates light, which is collimated by a first lens 106a/1. The light passes through the shutter 154 and impinges upon the Dammann grating 143, which splits laser light into multiple laser beams 108/1. The shutter 154 is controlled by signal 170 from the computer to control the time of an exposition of the hologram 115 by the reference beam 159a.

The fan of laser beams 108/1 impinges upon a second lens 106/2 which transforms the beams into parallel beams. SLM 141 modulates these beams under the control of signal 165 from a computer processor. The microlens raster 113 expands beams of light, and forms the optical digital image.

A configuration of a DIFU according to the present invention using a reflected SLM 141 is schematically illustrated in FIG. 62. This configuration can, for example, employ an electrically addressed 256×256 reflective SLM produced by Displaytech, Inc. (http://www.displaytech.com/devtools.html ).

The SLM has the capacity to rotate the direction of polarization of incoming light. Thus, when a laser beam 108/1 with a vertical polarization impinges upon a cell of SLM 141, the beam which is reflected from the cell will have horizontal polarization if an electrical signal 165 is sent to the cell, and vertical polarization if no electrical signal is sent to the cell.

A polarizing cube 152 (FIG. 62) which has a reflecting polarizing layer can be used to divide the optical beams with various vectors of polarization. This cube 152 permits passage of a laser beam 108/2 with vertical polarization and reflects a laser beam 108/3 with horizontal polarization. Thus, laser beams 108/3 reflected by the cube 152 will be directed to the microlens raster 113, which expands light beams and forms the optical digital image.

4.7.2 Recording the Hollogram

First, the desirable function of coding of the radius curvature and/or direction vector of distribution of the wave front is determined.

It is within the ordinary skill in the art to program a computer to perform this function and to control the device described above. The software must perform the following basic operations:

1) The first coding function, i.e. the optical digital image and appropriate coordinates (X, Y, Z) of end face 156/2 of the second fiber 155/2 is calculated.

2) The digital image is transmitted to the DIFU 142a.

3) The computer processor 122 sends the signals (X, Y, Z) 167 to the controlled stage (X,Y) 153a and controlled stage (Z) 153b.

4) The computer processor 122 sends control signals 170 to the shutter 154 (FIG. 59) and to the DIFU 142a (to Shutter, see FIG. 61).

5) The reference beam and object beams interfere with one another and impinge upon the holographic plate 115 resulting in the recordation of the hologram.

6) The discrete coding function (i.e. digital image corresponding to a desirable optical digital image" and appropriate coordinates (X, Y, Z) of an end face 155/2 of the second fiber 155/2) is calculated.

7) Operations 2–6 are repeated for all required points of the coding function resulting in the recordation of all imposed holograms on the holographic plate 115.

The holographic image is then fixed on the holographic plate by ordinary means known in the art, for example, by ordinary chemical processing.

5. EXAMPLES
5.1 Creation of the OADC Prototypes
5.1.1 Recordation of the First OE Prototype The first hologram prepared to test the concepts of the present invention was an imposed hologram.

FIG. 53, is a schematic representation of the components used to record the imposed hologram. A He-Ne laser ($\lambda=0.6328\mu$, 10 mW) and photoshutter (not shown) were used. The laser beam 108 was divided by a beam splitter (not shown) into two beams 108/1 and 108/2.

The first lens 106a/1 and the third lens 106a/3 each had a short focal length ($F_1=8.4$ mm), and the second lens 106a/2 had a focal length $F_2=85$ mm. The third lens 106a/3 was capable of being placed at three positions along laser beam 108/2 (FIG. 53). The second lens 106a/2 was capable of being placed at four positions in the (X,Y) plane as represented in FIG. 54. The changes in positions were $\Delta X=\Delta Y=3$ mm.

Formation of a reference beam. The laser beam 108/1 was extended by a first lens 106a/1 and then focused to light spots 110 in a plane P by the second lens 106a/2. Simultaneously, converging light from the second lens 106a/2 impinged upon the emulsion of the holographic plate 115 which was positioned between the lens 106a/2 and plane P at a distance $R_0=90$ mm.

Formation of the object beam. The laser beam 108/2 was extended by the third lens 106a/3 and the diverging light wave impinged upon the emulsion of the holographic plate 115, where the holographic image was recorded.

The hologram was recorded as follows;

The third lens 106a/3 was placed at position 1 (FIG. 53). The distance from the lens to the holographic plate was $R_1=67$ mm.

The second lens 106a/2 was placed at position 1 (FIG. 54). The light spot 110 was directed to plane P as shown on FIG. 55a. The photo-shutter 154 was opened to permit light from the laser 107 to pass for 10 seconds.

The second lens 106a/2 was placed at position 2 (FIG. 54), such that the light spot 110 was directed to a different position as shown on FIG. 55b. The photo-shutter was opened to permit light from the laser 107 to pass for 10 seconds.

The result was a recording of imposed hologram having an image consisting of spots as depicted in FIG. 55c.

The third lens 106a/3 was then placed at position 2 (FIG. 53). The distance from the lens to the holographic plate was $R_2=90$ mm.

The second lens 106a/2 was placed at position 1 (FIG. 54). The light spot 110 was directed to plane P as shown in FIG. 56a. The photo-shutter 154 was opened to permit light from the laser 107 to pass for 10 seconds.

The second lens 106a/2 was placed at position 2 (FIG. 54), directing the light spot 110 to a different position on the holographic plate as shown on FIG. 56b. The photo-shutter 154 was opened to permit light from the laser 107 to pass for 10 seconds.

The second lens 106a/2 was placed at position 3 (FIG. 54), directing the light spot 110 to a different position on the holographic plate as shown in FIG. 56c. The photo-shutter 154 was opened to permit light from the laser 107 to pass for 10 seconds.

The result was a recording of imposed hologram where the recorded image consists of a series of light spots as depicted FIG. 56d.

The third lens 106a/3 was then placed at positions 3 (FIG. 53). The distance from the lens to the holographic plate was $R_3=120$ mm.

The second lens 106a/2 was placed at position 1 (FIG. 54). The light spot 110 was directed to plane P as shown on FIG. 57a. The photo-shutter 154 was opened to permit light from the laser 107 to pass for 10 seconds.

The second lens 106a/2 was placed at position 2 (FIG. 54). The light spot 110 occupied other place as shown on FIG. 57b. The photo-shutter 154 was opened to permit light from the laser 107 to pass for 10 seconds.

The second lens 106a/2 was placed at positions 3 (FIG. 54). The light spot 110 occupied another position on the holographic plate as shown in FIG. 57c. The photo-shutter 154 was opened to permit light from the laser 107 to pass for 10 seconds.

The second lens 106a/2 was placed at position 4 (FIG. 54). The light spot 110 was focused on another position on the holographic plate as shown in FIG. 57d. The photo-shutter 154 was opened to permit light from the laser 107 to pass for 10 seconds.

The result was an imposed hologram where the recorded image consists of a series of spots as depicted FIG. 57e.

After all exposures of the hologram, the holographic plate 115 was exposed to standard chemical processing.

5.1.2 Experimental Testing of the First OE Prototype

Figure 14:
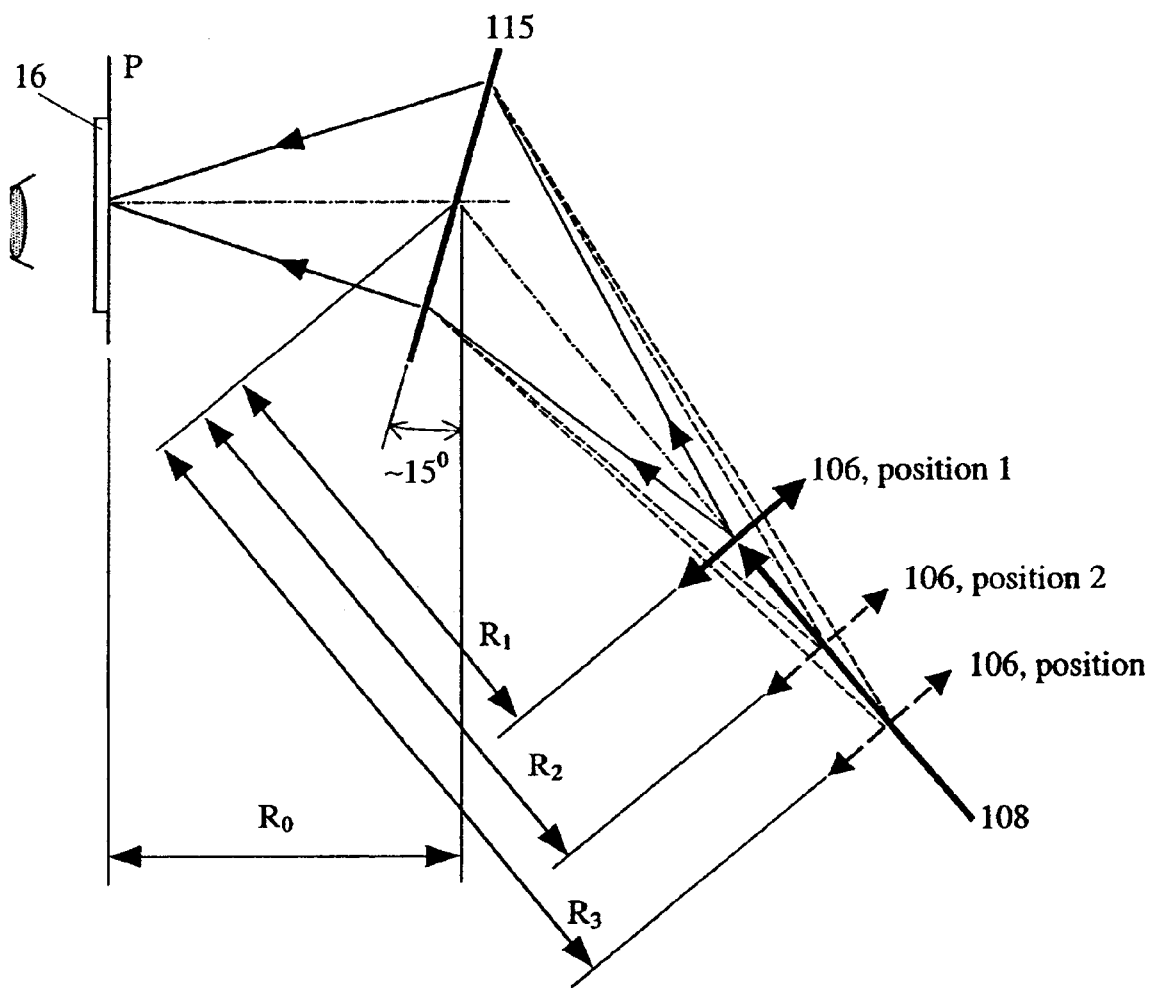

The optical circuit for testing the prototype was configured as shown in FIG. 14. The same He-Ne laser 107 ($\lambda=0.6328\mu$, 10 mW) used in recording the hologram was used to test the hologram. A lens 106 (f=8.4 mm) was also used.

The radius of curvature of the incoming light entering the hologram was approximately equal to distance $R_i$ (i=1,2,3 according to the position of a lens). The diverging laser light restored the hologram, and in a plane P a set of light spots 110 was formed. For observation of the image a dim glass 116 was positioned in plane P.

The lens 106 was then placed at position 1 ($R_1$67 mm), resulting in the formation of two visually observable bright spots on the dim glass 116. When the light spot 110 fell onto rough surface of the dim glass 116, it scattered the light, permitting human observation of the spots as represented on FIG. 58a. Each of the spots was surrounded by a weak halo.

Then the lens 106 (FIG. 14) was placed in position 2 ($R_2=90$ mm), resulting in 3 visually observable bright spots on the dim glass like represented spots on FIG. 58b. Finally, the lens 106 (FIG. 14) was placed at position 3 ($R_3=120$ mm), resulting in 4 visually observable bright spots in the dim glass as represented in FIG. 58c.

The number of light spots and their position in the image precisely corresponded to the function of transformation incorporated in the holographic recording.

5.1.3 Recordation of the Second OE Prototype

An hologram prepared to test the concepts of the present invention an imposed hologram, i.e. multiple holograms (in this case, 3) were recorded on one holographic plate.

Figure 12:
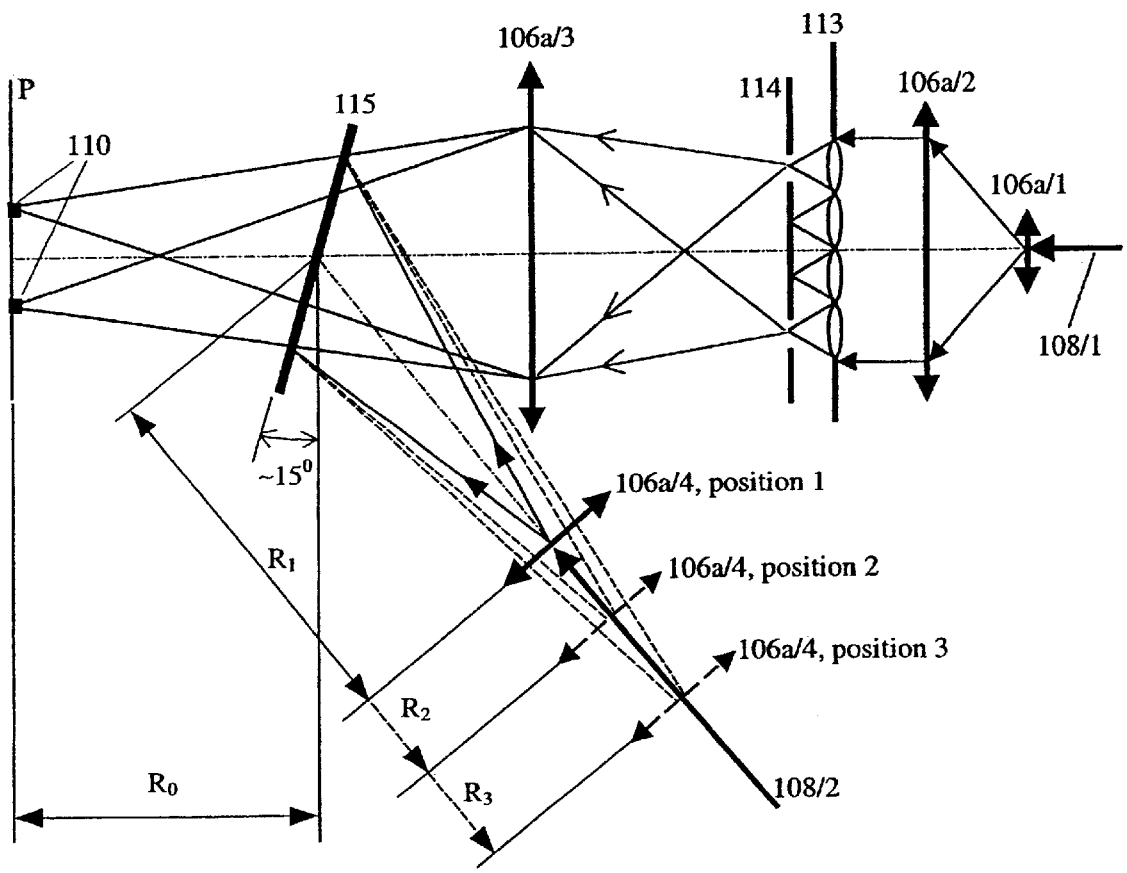

FIG. 12, is a schematic representation of the components used to record the hologram. A He-Ne laser 107 ($\lambda=0.6328\mu$, 10 mW) and photo-shutter (not shown) were used. The laser beam 108 was divided by a beam splitter (not shown) into two beams 108/1 and 108/2.

Lenses 106a/1 and 106a/4 had a short focal length ($F_1=8.4$ mm), and second lens 106a/2 had a focal length $F_2=100$ mm, and the lens 106a/3 had a focal length $F_3=85$ mm.

The lens raster 113 consisted of four lenses located 2 mm apart; each lens had a diameter of 1.8 mm, focal length f=16 mm.

Three various masks 114 (Mask I, Mask II, Mask III) were used. Each mask 114 represented the opaque screen, in which there were a series of 2 or 3 apertures (see FIGS.

Figure 13A:
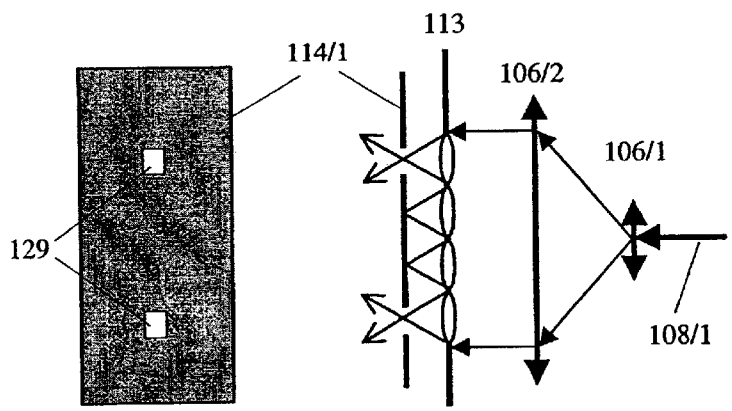
Figure 13B:
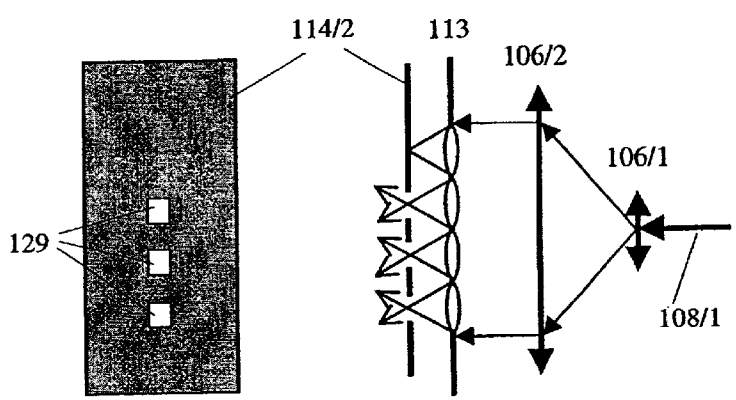
Figure 13C:
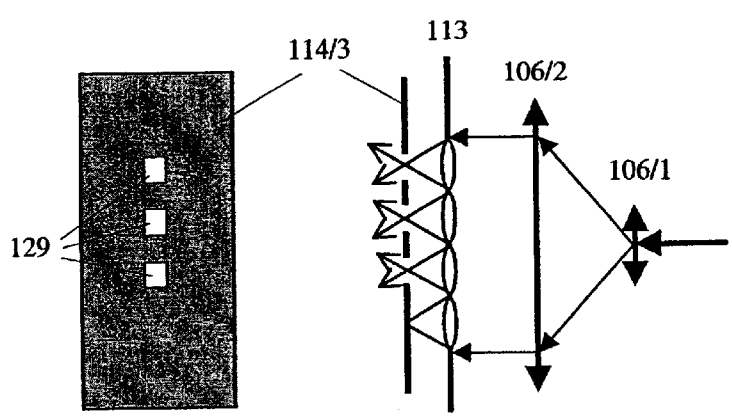

13a–c), through which light focused by the raster 113 could pass. Mask I 114/1 (FIG. 13a) had two apertures, and Mask II 114/2 (FIG. 13b) and Mask III 114/3 (FIG. 13c) each had three apertures.

The hologram was recorded as follows:

The photo-shutter 154 was opened to permit light from the laser 107 to pass for 20–30 seconds (the time of hologram exposition).

Formation of a reference beam. The laser beam 108/1 was extended by a first lens 106a/1 and then collimated by second lens 106a/2, resulting in a wide parallel light beam (FIG. 12). This beam entered the lens raster 113. Each of the raster lenses focused light. Mask I 114/1 was established in a focal plane of the lens raster 113, permitting light from the first and fourth raster lenses to reach the holographic plate 115. Light passing through Mask I 114/1 entered lens 106a/3, which formed the image, two appropriate light spots 110 in a plane P. Simultaneously, converging light from lens 106a/3 was recorded on the emulsion of the holographic plate 115 which was positioned between the lens 106 and plane P at a distance $R_0=90$ mm.

Formation of the object beam. The laser beam 108/2 was extended by lens 106a/4 ($R_1\approx 90$ mm) and the diverging light wave was recorded in the emulsion of the holographic plate 115, where the holographic image is recorded.

Recording of the imposed holograms. After recording of the first hologram, Mask I 114/1 (FIG. 13a) was replaced with a Mask II 114/2 (FIG. 13b) and lens 106a/4 (FIG. 12) moved to 10 mm ($R_2\approx 100$ mm). The hologram was then recorded by opening the shutter 154. After recording the second hologram the Mask II 114/2 was replaced with Mask III 114/3 (FIG. 13c), and lens 106a/4 (FIG. 12) was moved to 20 mm ($R_3\approx 120$ mm). Then with the help photo-shutter 154 the hologram was exposed.

After three exposures of the hologram, the holographic plate 115 was exposed to standard chemical processing.

5.1.4 Experimental Testing of the Second OE Prototype

The optical circuit for testing the prototype was configured as shown in FIG. 14. The same He-Ne laser 107 ($\lambda=0.6328\mu$, 10 mW) used in recording the hologram was used to test the hologram. A lens 106 (f=8.4 mm) was also used.

The holograms provided an output optical digital image 116 (formed in plane P) corresponding to the radius of curvature of wave front of the incoming laser light. The optical digital image of the hologram consists of a set of light spots 110 located along a direct line, and the quantity and positions of the spots in the optical digital image were "1001", "0111", 1110", depending on the radius of curvature of wave front of the incoming laser light.

The radius of curvature of the incoming light entering the hologram was approximately equal to distance $R_i$ (i=1,2,3 according to the position of a lens). The diverging laser light restored the hologram and in a plane P a set of light spots 110 was formed. For observation of the image a dim glass 116 was positioned in plane P.

The lens 106 was then placed in position 1, resulting in the formation of two visually observable bright spots on the dim glass 116 (i.e., a glass plate approximately 2 mm thick, having a smooth surface and a rough surface wherein the depth of the roughness is on an order of a few micrometers). When a light spot fell onto rough surface, it scattered the light, permitting human observation of the spots. Each of the spots was surrounded by a weak halo.

Then the lens 106 was then placed in position 2, resulting in 3 visually observable bright spots on the dim glass 116. Finally, the lens 106 was established at position 3, resulting in 3 visually observable (differently located) bright spots in the dim glass 116.

The number of light spots 110 and their position in the image precisely corresponded to function of transformation incorporated in the holographic recording. The presence of a light spot in the appropriate location is designated as a binary "1", and the absence of a spot in appropriate place is designated as a binary "0." At the first position ($R_1=90$ mm), the combination of spots 1001 was formed. At the second position ($R_2=100$ mm) the spots correlated to the binary number "0111". At the third position ($R_3=120$ mm) the spots correlated to the binary number "1110".

This simple form of coding ("1001", "10111", "1110") permitted the use of a simple hologram. The diffractive efficiency of the hologram was about 5%. Efficiency can be improved by varying the time of exposure of the hologram.

5.2 Experimental Testing of the Range Finder

The prototype Range Finders described below were tested using the Hollogram from OADC prototype 11 described above in Section 5.1.3 above.

5.2.1 Experimental Testing of the First Prototype of the Range Finder

FIG. 23 schematically illustrates a configuration of the first prototype of a Range Finder according to the present invention including an He-Ne laser 107 ($\lambda=0.6328\mu$, power 1 mW); a lens (F=30 mm) which focuses a laser beam 108 on the object 118 surface; a splitter cube 128 (having a coefficient of transmission and reflecting about 0.5); a hologram (prototype of the OE); a dim glass placed in the plane P of the digital image; a magnifying lens; a CCD camera 133 as Sony XC-77; and a Frame grabber 134 (SELICON VIDEO MUX from EPIX Inc.).

This prototype (FIG. 23) functioned as follows: the laser light was directed to the lens 106 which focused (through Splitter cube 128) the laser light in a spot on the object 11.8 surface. Scattered light 117 returned to the splitter cube 128 and the light was reflected by it to the hologram. The hologram transformed the incoming light to configure a digital image (as a set of light spots) in plane P on the surface of the dim glass. The magnifying lens 106 transformed the image from the plane P to the plane of the CCD camera 133, which acted as an input frame grabber 134 and transferred the image to the computer processor 122.

The images from the CCD camera 133 at various positions of the object 118 were recorded in the computer processor's 122 memory and were observed on the monitor screen (see FIG. 24) and then were saved in a file.

FIG. 24 shows the digital images (negatives) which resulted from the initial testing of the prototype Range Finder. Image 200 (FIG. 24) was observed at distance $D_1=30$ mm ($L_1\approx 95$ mm) (FIG. 23), the digital image 201 was observed at $D_2 42$ mm ($L_2\approx 107$ mm), image 202 was observed at $D_3\approx 65$ mm ($L_3\approx 130$ mm).

There is complete correspondence between the resulting experimental data to the code table used in recording hologram.

5.2.2 Experimental Testing of the Second Prototype of the Range Finder

FIG. 30 schematically illustrates the configuration of the second prototype of the Range Finder of the present invention using a semiconductor laser 107 (LTG50BAOFH103 $\lambda=0.65\mu$, power 13 mW).

FIG. 30a shows drawings of the optical digital images which resulted from the testing of the second prototype at various positions of object 118 ($L_1=90$ mm, $L_2=100$ mm, $L_3=120$ mm).

The second prototype of the Range Finder is a semiconductor laser module (LTG5OBAOFH103) ($\lambda=0.65\mu$, output power 13 mW). The complete circuit of this prototype is shown in [the top part of] FIG. 30. The prototype includes semiconductor laser module, three mirrors, the hologram described in section 5.1.1 above, and entrance and exit windows.

For experimental testing of this prototype: a magnifying lens 106, CCD camera 133 (Sony XC-77), frame grabber 134 and computer processor 122 were also used. The tested was metal a cube from an aluminum alloy D16T with a dim surface. The object was tested at various distances ($D_i$) from the Object 118 to the Splitter and distances from the object 118 to the hologram ($L_i=L_0+D_i$, where i=1,2,3; $L_0 \approx 65$ mm is constant).

Prototype II works as follows. The laser beam 108 is reflected by two small mirrors 121 and is directed to the object 118 through the window. The surface of the object 118 scatters the light. A portion of the scattered light 117 returned to the Range Finder and was transformed by the hologram into an optical digital image. The resulting optical digital image was reflected by a mirror 121 and was focused on the exit window. The image was then transferred by a magnifying lens 106 to the CCD 133 (a matrix CCD camera). Then the image was captured by a frame grabber 134 and transferred to the computer processor 122.

At various positions of the "Object" 118 ($L_1=90$ mm, $L_2=100$ mm, $L_3 120$ mm) the appropriate optical digital images resulted and are shown in the bottom part of FIG. 30. These images were almost identical to the optical digital images from Prototype I (see FIG. 24). The primary differences consist in a small change of the image scale. This change of scale was caused by three factors: different wavelength of the laser 107 $\lambda=0.65\mu$, different set-up of the optical circuit, and different position of magnifying lens 106.

These experiments completely confirm the operation of a Range Finder using the OADC.

What is claimed is:

1. An apparatus for determining the distance from the apparatus to an object, the apparatus comprising an optical element having the capacity to transform information contained in a light wave front from the object into a 1D, 2D or 3D digitally encoded array of signals corresponding to the distance from the apparatus to the object.

2. The apparatus of claim 1, further comprising a light source for impinging light upon the object.

3. The apparatus of claim 2, wherein the light source comprises a laser.

4. The apparatus of claim 3 wherein the laser emits light in the red or infrared spectra.

5. The apparatus of claim 3 wherein the laser is an He—Ne laser.

6. The apparatus of claim 1 further comprising a dim glass positioned in a receiving relationship to the light signals formed by the optical element.

7. The apparatus of claim 1 further comprising a means for monitoring the light signals.

8. The apparatus of claim 7 wherein the means for monitoring the light signals comprises a means which permits human observation of the light signals.

9. The apparatus of claim 7 wherein the means for monitoring the light signals comprises a multi-element photodetector.

10. The apparatus of claim 9 further comprising a comparator operationally coupled to the multi-element photodetector, wherein the comparator is configured to interpret a signal from the multi-element photodetector exceeding a predetermined threshold as a digital one (1) and to interpret a signal not exceeding such predetermined threshold as a digital zero (0).

11. The apparatus of claim 10 further comprising a computer processor operationally coupled to the comparator.

12. The apparatus of claim 7 wherein the means for monitoring the light signals comprises a 1D multi-element photodetector.

13. The apparatus of claim 7 wherein the means for monitoring the light signals comprises a 2D multi-element photodetector.

14. The apparatus of claim 1 wherein the optical element is a hologram.

15. The apparatus of claim 1 wherein the optical element is an imposed hologram.

16. The apparatus of claim 1 wherein the optical element is a computer generated hologram.

17. The apparatus of claim 1 wherein the optical element is a kinoform.

18. The apparatus of claim 1 wherein the optical element is a spatial light modulator.

19. An apparatus for determining the distance from the apparatus to multiple three dimensionally arranged points on a surface, the apparatus comprising one or more optical elements having the capacity to transform information contained in a light wave front from each point into a 2D or 3D digitally encoded array of signals corresponding to the distance from the apparatus to the point.

20. The apparatus of claim 19 further comprising a light source which can be directed at the surface, and wherein the optical element is in a receiving relationship to light reflected from the surface.

21. The apparatus of claim 20, wherein the light source comprises a laser.

22. The apparatus of claim 2 wherein the laser emits light in the red or infrared spectra.

23. The apparatus of claim 2 wherein the laser is an He—Ne laser.

24. The apparatus of claim 2 further comprising a dim glass positioned in a receiving relationship to the light signals from the optical element.

25. The apparatus of claim 2 further comprising a means for monitoring the light signals.

26. The apparatus of claim 25 wherein the means for monitoring the light signals is a means which permits human observation of the light signals.

27. The apparatus of claim 26 wherein the means which permits human observation of the light signals comprises a dim glass.

28. The apparatus of claim 25 wherein the means for monitoring the light signals comprises a multi-element photodetector.

29. The apparatus of claim 28 further comprising a comparator operationally coupled to the multi-element photodetector, wherein the comparator is configured to interpret a signal from the multi-element photodetector exceeding a predetermined threshold as a digital one and to interpret a signal not exceeding such predetermined threshold as a digital zero.

30. The apparatus of claim 28 further comprising a computer processor operationally coupled to the comparator.

31. The apparatus of claim 25 wherein the means for monitoring the light signals comprises a 1D.

32. The apparatus of claim 25 wherein the means for monitoring the light signals comprises a 2D multi-element photodetector.

33. The apparatus of claim 28 wherein the surface is on an article of manufacture.

34. The apparatus of claim 33 wherein the surface is on an article of manufacture on a production line.

35. The apparatus of claim 34 wherein the computer is programmed to control a reject mechanism on the production line, rejecting all articles which do not satisfy specified three-dimensional criteria.

36. A manufacturing line quality control system comprising the apparatus of claim 19 and further comprising:

(a) a circuit operationally connecting the comparator to the means for monitoring the light signals; and (b) a computer processor operationally connected to the comparator, and operationally connected to a reject gate, wherein the computer processor is programmed to activate or deactivate the reject gate upon receipt or non-receipt of a predetermined code.

37. The apparatus of claim 36 wherein the computer processor is programmed to adjust upstream pressing parameters based receipt or non-receipt of a predetermined code.

38. The apparatus of claim 19 wherein the one or more optical elements comprise a hologram.

39. The apparatus of claim 19 wherein the one or more optical elements comprise an imposed hologram.

40. The apparatus of claim 19 wherein the one or more optical elements comprise a computer generated hologram.

41. The apparatus of claim 19 wherein the one or more optical elements comprise a kinoform.

42. The apparatus of claim 19 wherein the one or more optical elements comprise a spatial light modulator.

* * * * *

UNITED STATES PATENT AND TRADEMARK OFFICE
CERTIFICATE OF CORRECTION

PATENT NO.   : 6,476,943 B1
DATED        : November 5, 2002
INVENTOR(S)  : Vertoprakhov It is certified that error appears in the above-identified patent and that said Letters Patent is hereby corrected as shown below:

<u>Title page,</u>
Item [75], please correct the spelling of the inventor from "Victor Yertoprakhov" to -- Victor Vertoprakhov --.

Signed and Sealed this

Eighteenth Day of February, 2003

JAMES E. ROGAN
*Director of the United States Patent and Trademark Office*